United States Patent
Matsuoka et al.

(10) Patent No.: US 7,039,253 B2
(45) Date of Patent: May 2, 2006

(54) IMAGE DISPLAY DEVICE, IMAGE DISPLAY METHOD, PROGRAM, AND PROJECTION SYSTEM

(75) Inventors: Takeshi Matsuoka, Kanagawa (JP); Shinichi Matsui, Tokyo (JP); Nobuo Iizuka, Tokyo (JP); Tsuyoshi Kasahara, Niigata (JP); Takashi Matsuda, Tokyo (JP); Kouichi Nakagomi, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 790 days.

(21) Appl. No.: 10/201,371

(22) Filed: Jul. 23, 2002

(65) Prior Publication Data

US 2003/0021492 A1    Jan. 30, 2003

(30) Foreign Application Priority Data

Jul. 24, 2001   (JP)   ............ 2001-222377

(51) Int. Cl.
*G06K 9/32*   (2006.01)

(52) U.S. Cl. ............ 382/295; 382/312; 345/183; 65/392

(58) Field of Classification Search .......... 382/154, 382/266, 295, 293, 312, 276; 348/183, 761; 349/2, 25; 358/471; 359/250, 252; 65/102, 65/106, 392, 30.13; 345/2.2, 156, 157, 661, 345/175, 180–183

See application file for complete search history.

(56) References Cited

U.S. PATENT DOCUMENTS

| | | | | |
|---|---|---|---|---|
| 5,115,230 A | * | 5/1992 | Smoot | ............................. 345/9 |
| 5,504,501 A | * | 4/1996 | Hauck et al. | ............... 345/158 |
| 5,515,079 A | * | 5/1996 | Hauck | ......................... 345/157 |
| 5,572,251 A | * | 11/1996 | Ogawa | ................... 348/207.99 |
| 5,914,783 A | * | 6/1999 | Barrus | ......................... 356/614 |
| 6,798,926 B1 | * | 9/2004 | Hiramatsu | ................... 382/291 |

FOREIGN PATENT DOCUMENTS

JP       2622620 B2    4/1997

* cited by examiner

*Primary Examiner*—Sheela Chawan
(74) *Attorney, Agent, or Firm*—Frishauf, Holtz, Goodman & Chick, P.C.

(57) ABSTRACT

A data processing apparatus includes a central control section, an image analysis section, a RAM (Random Access Memory), an external memory section and a user operation input section. The central control section is connected to the image analysis section, the RAM and the external memory section via a bus. Based on image data prepared by an image input section, the image analysis section performs a process of specifying where on the display screen of a display section a portion specified by the image input section lies.

41 Claims, 57 Drawing Sheets

$(x_{spot}, y_{spot})$
DISPLAY ARE BEFORE CONVERSION $(x_{disp}, y_{disp})$
DISPLAY ARE AFTER CONVERSION

:RED      :GREEN      :BLUE

FIG.29A FIG.29B FIG.29C
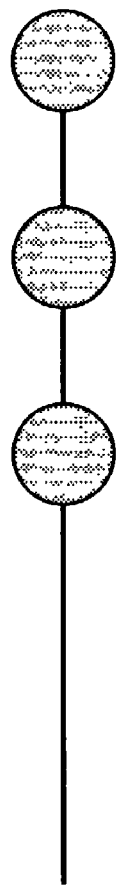 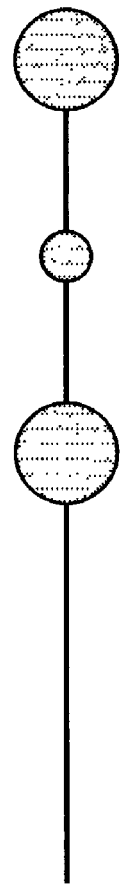 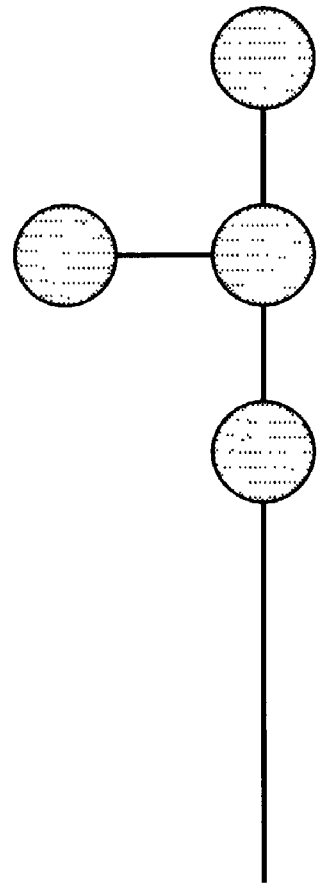
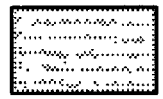 :RED

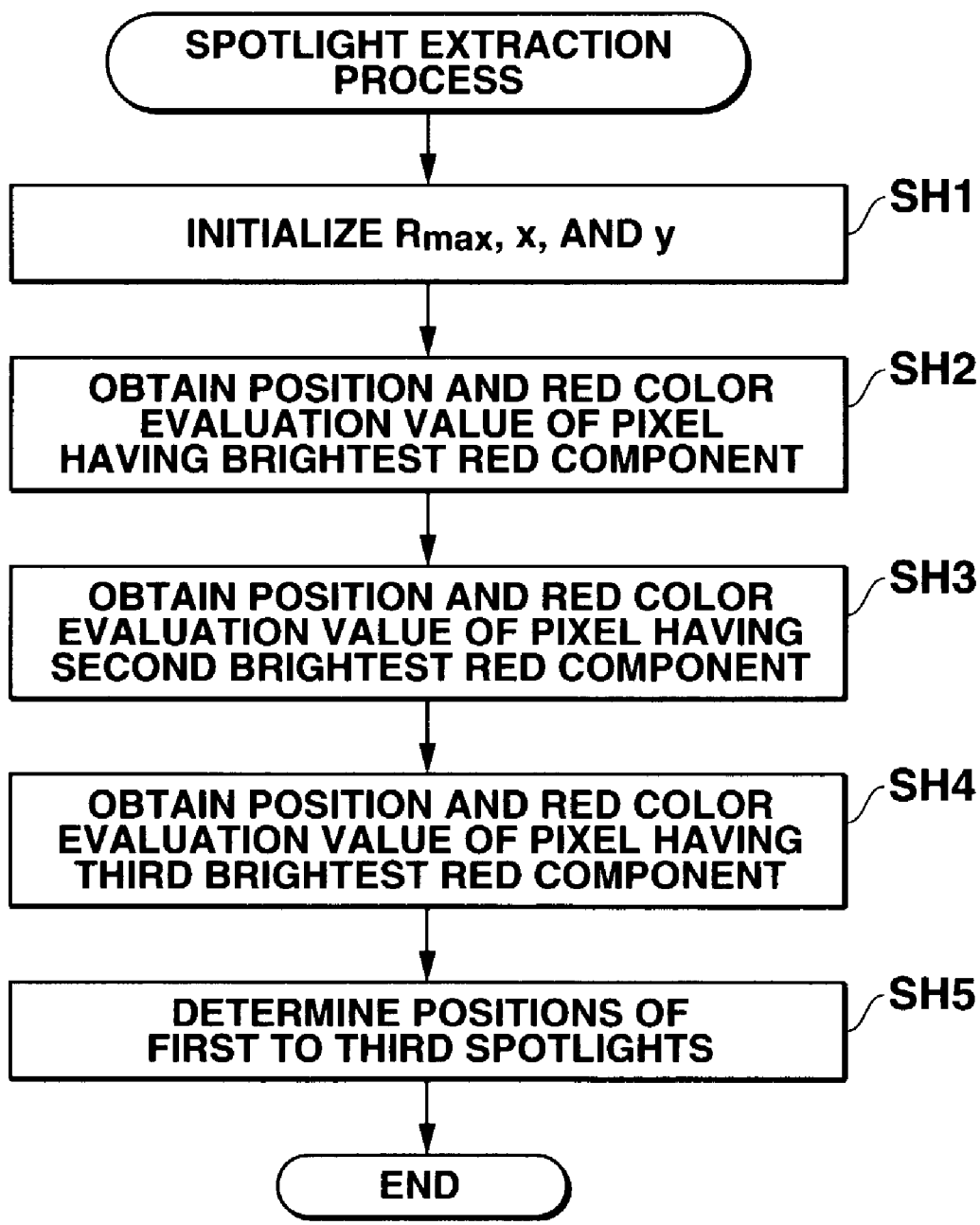

| DEGREE OF ANGLE / DISTANCE | EQUAL TO OR GREATER THAN 75° AND EQUAL TO OR SMALLER THAN 90° | EQUAL TO OR GREATER THAN 60° AND SMALLER THAN 75° | EQUAL TO OR GREATER THAN 45° AND SMALLER THAN 60° | EQUAL TO OR GREATER THAN 30° AND SMALLER THAN 45° | SMALLER THAN 30° |
|---|---|---|---|---|---|
| SMALLER THAN 10mm | ⊙ | ⊙ | ⊙ | ⊙ | ⊙ |
| EQUAL TO OR GREATER THAN 10mm AND SMALLER THAN 20mm | ⊙ | ⊙ | ⊙ | ⊙ | ⊙ |
| EQUAL TO OR GREATER THAN 20mm AND SMALLER THAN 30mm | ⊙ | ⊙ | ⊙ | ⊙ | ⊙ |

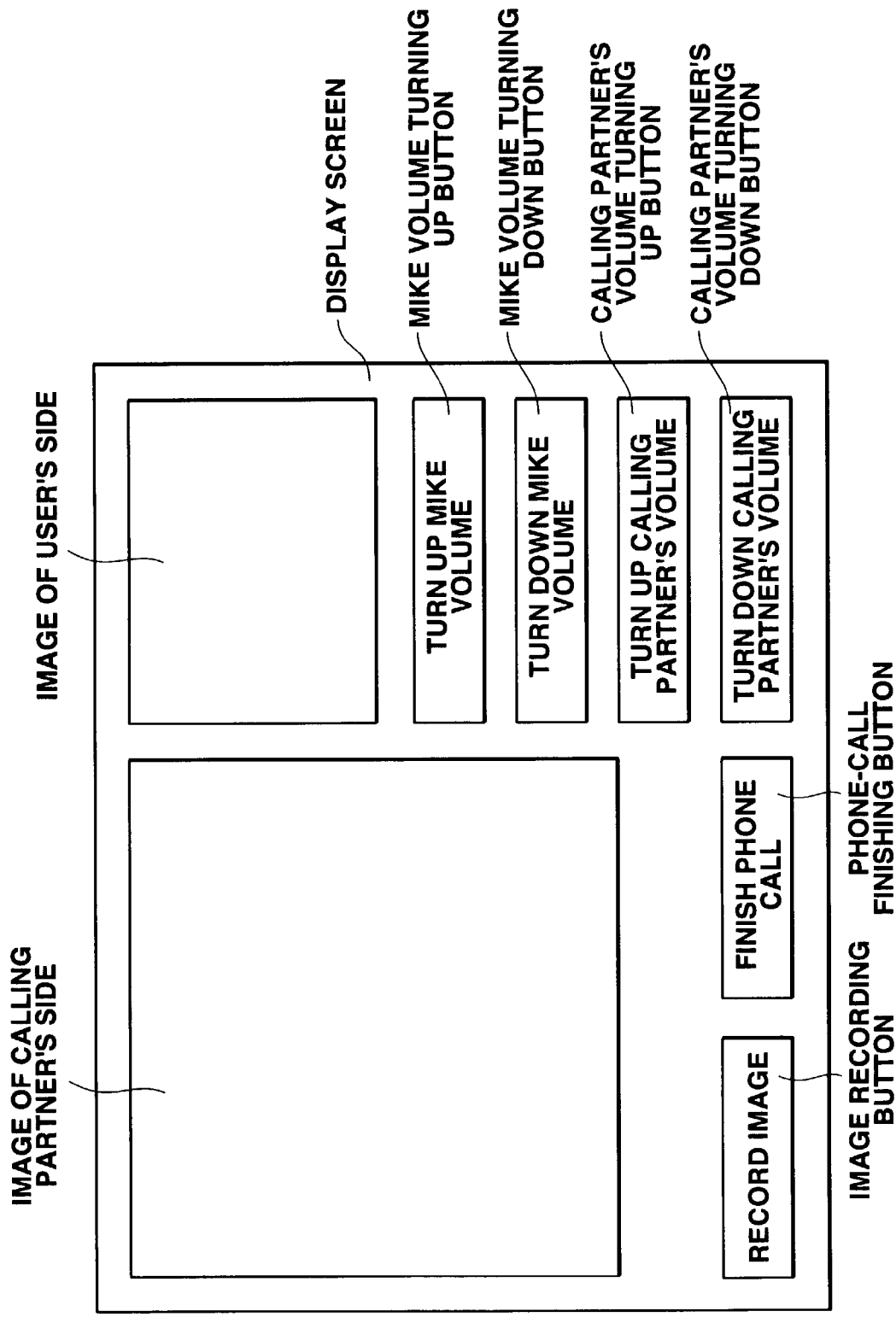

IMAGE DISPLAY DEVICE, IMAGE DISPLAY METHOD, PROGRAM, AND PROJECTION SYSTEM

BACKGROUND OF THE INVENTION

1. Field of the Invention

The present invention relates to an image display device, an image display method, a program, and a projection system for drawing an image in accordance with an operation of an operator, on a display screen.

2. Description of the Related Art

When an image is projected on a screen and supplementary light is further projected on this screen, a technique for detecting the position of the supplementary light emitted from a laser pointer, etc. is used in order to make a change to the point which corresponds to the position of the image where the supplementary light is projected. Japanese Patent No. 2622620 discloses such a technique.

However, according to the technique of Japanese Patent No. 2622620, when taking an image of the supplementary light (spot) projected on the screen in order to detect the position of the supplementary light, an image pickup device for taking an image must face its light receiving surface straight toward the screen. Otherwise, it is impossible to detect the position of the supplementary light appropriately.

Accordingly, the position where the image pickup device is to be placed is restricted, and the position where the operator of the laser pointer, etc. stands, is also restricted. Thus, the operator experiences the difficulty in operating the laser pointer, etc. Further, it is difficult to set the image pickup device in the right position. Especially, in a case where the optical system of the image pickup device causes aberration, it is extremely difficult to determine the right position. Furthermore, if the positional relation between the image pickup device and the screen is fixed where the image pickup device is set in the right position, it is impossible to change the position of the image pickup device. Thus, the image pickup device cannot be used for other purposes.

SUMMARY OF THE INVENTION

The present invention was made in view of the above circumstance, and an object of the present invention is to provide an image display device, an image display method, a program, and a projection system realizing excellent operational characteristic, and capable of displaying an appropriate image regardless of the position of an image pickup device and capable of appropriately projecting the position of a spot (supplementary light), whose image is taken, on the display screen.

To accomplish the above object, an image display device according to a first aspect of the present invention comprises:

an image pickup section which picks up a spot and an area including the spot from an arbitrary position;

a generation section which generates image data of the area picked up by the image pickup section;

a display section which displays an image based on the image data generated by the generation section;

a processing section which processes the image data in such a way that the image data is adequately displayed on a display screen of the display section;

a measuring section which measures positional coordinates of the spot in the area; and a coordinate conversion section which converts the positional coordinates of the spot measured by the measuring-section to positional coordinates that are reflected on post-processing image data acquired as a result of a process performed by the processing section.

According to this image display device, an image picked up by an image pickup section which is set in an arbitrary position is adequately displayed on a display screen. A picked-up spot is adequately displayed on the display screen after the position of the spot is converted by the coordinate conversion section. Accordingly, operational characteristic of this image display device is excellent.

The image pickup section may pick up the display screen from an arbitrary position.

The area may be constituted by a projected image and the spot may be a dot of light on the projected image, which has a specific wavelength and whose luminance is set equal to or higher than a luminance of an other portion of the projected image.

The area may be an area surrounded by at least four points whose positional coordinates have been set beforehand.

The processing section may have an area setting section which inputs information designating the at least four points surrounding the area and sets a region surrounded by the points indicated by the input information as the area. This area setting section may specify at least four spots included in an image represented by image data before processing and set the specified spots as points surrounding the area.

The display section may have a section which displays a figure for extracting an area surrounded by at least four points in an area to be picked up by the image pickup section.

In this case, the area setting section of the processing section may extract at least four points from the figure for extracting the area represented by image data before processing and set the extracted points as points surrounding the area.

Let it be assumed that an area before processing represented by image data before processing is a quadrangle and an area after processing represented by image data after processing performed by the processing section is a rectangle.

In this case, the processing section may acquire a first pair of lines that pass through a spot in the area after processing and perpendicularly intersect opposite two sides of the rectangle, which defines the area after processing, acquire a second pair of lines that internally divide opposite two sides of the quadrangle, which defines the area before processing, by an interior division ratio by which the first pair of lines internally divide the opposite two sides of the rectangle, and may process the image data in such a way that a spot at a point of intersection of the second pair of lines comes to a point of intersection of the first pair of lines after processing.

Or, in this case, the processing section may perform a process of determining in which one of four quadrangles obtained by quadrisecting the quadrangle that defines the area before processing by two lines each connecting a point of intersection of one of two sets of opposite two sides of the quadrangle that defines the area before processing to a point of intersection of diagonal lines of the quadrangle the spot is included, and then moving a point lying in the rectangle that defines the area after processing in a direction of a vertex equivalent to a vertex, among vertexes of a quadrangle determined as including the spot, that also serves as a vertex of the quadrangle defining the area before processing by a predetermined amount which becomes smaller as a number of times quadrisecting of the quadrangle is performed becomes larger, and process the image data in such a way that in a case where the process is repeated further until the point lying in the rectangle that defines the area after processing converges to substantially a given position, regarding the quadrangle determined as including the spot as a quadrangle defining the area before processing, a position of the point which reaches convergence becomes a position of a spot represented by the image data after processing.

The area may be comprised of a plurality of regions.

In this case, the measuring section may specify a region in which the spot is included, and measure the positional coordinates of the spot in the area by measuring positional coordinates of the spot in the specified region.

The display section may have a section which displays a curve indicating a track along which a spot has moved, over an image based on image data after processing.

The processing section may have a section which specifies one of plural levels to which a luminance of a spot represented by image data before processing corresponds.

In this case, the display section may display a spot having the luminance whose level has been specified by the processing section.

The measuring section may detect a spot identification pattern comprised of a plurality of spots from image data before processing and measure positional coordinates of the detected spot identification pattern as positional coordinates of a spot.

The measuring section may have a section which specifies positions and velocity of a spot at two times based on plural pieces of image data before processing.

In this case, the processing section may determine an estimated position of the spot between the two times based on the positions and velocity of the spot at the two times specified by the measuring section, and process image data before processing in such a way that an image having the spot positioned at the determined estimated position is shown.

The measuring section may specify positions of a spot at a plurality of times based on plural pieces of image data before processing, determine a representative position representing a position of the spot in a time zone including the plurality of times based on the specified positions, and treat positional coordinates of the determined representative position as results of measuring positional coordinates of the spot.

The image display device may further comprise a color change detection section which detects a change in color of a spot represented by plural pieces of image data before processing based on the plural pieces of image data.

The measuring section may have a section which specifies a velocity of a spot based on plural pieces of image data before processing.

In this case, the processing section may determine a position in an image indicated by image data after processing which the spot is to occupy next, based on the velocity specified by the measuring section and a latest position in the image indicated by image data after processing which the spot has occupied, and process image data in such a way that the spot comes to the determined position.

The image display device may further comprise a spot-shape determining section which determines a shape of a spot to be represented by image data after processing performed by the processing section, based on the positional coordinates of the spot measured by the measuring section.

According to this image display device, an image picked up by the image pickup section which is set in an arbitrary position is adequately displayed on the display screen. The picked up spot is adequately displayed on the display screen after the position of the spot is converted by the coordinate conversion section. The shape of a spot to be displayed reflects the position of the picked up spot. Accordingly, operational characteristic of this image display device is excellent.

The processing section may have a section which externally receives a signal indicating that a light source of the spot is emitting light and processes image data in response to the received signal.

An image display method according to a second aspect of the present invention comprises:

an image pickup step which picks up a spot and an area including the spot from an arbitrary position;

a generation step which generates image data of the area picked up in the image pickup step;

a display step which displays an image based on the image data generated in the generation step on a display screen;

a processing step which processes the image data in such a way that the image data is adequately displayed on the display screen in the display step;

a measuring step which measures positional coordinates of the spot in the area; and a coordinate conversion step which converts the positional coordinates of the spot measured in the measuring step to positional coordinates that are reflected on post-processing image data acquired as a result of a process performed in the processing step.

According to this image display method, an image picked up by an image pickup section which is set in an arbitrary position is adequately displayed on a display screen. A picked-up spot is adequately displayed on the display screen after the position of the spot is converted by the coordinate conversion section.

The image pickup step may pick up the display screen from an arbitrary position.

The area may be constituted by a projected image and the spot may be a dot of light on the projected image, which has a specific wavelength and whose luminance is set equal to or higher than a luminance of an other portion of the projected image.

The area is an area surrounded by at least four points whose positional coordinates have been set beforehand.

The processing step ma include an area setting step which inputs information designating at least four points surrounding the area and sets a region surrounded by the points indicated by the input information as the area. This area setting step may specify at least four spots included in an image represented by image data before processing and set the specified spots as points surrounding the area.

The display step may display a figure for extracting an area surrounded by at least four points in an area to be picked up in the image pickup step.

In this case, the area setting step of the processing step may extract at least four points from the figure for extracting the area represented by image data before processing and set the extracted points as points surrounding the area.

Let it be assumed that an area before processing represented by image data before processing is a quadrangle and an area after processing represented by image data after processing performed in the processing step is a rectangle.

In this case, the processing step may acquire a first pair of lines that pass through a spot in the area after processing and perpendicularly intersect opposite two sides of the rectangle, which defines the area after processing, acquire a second pair of lines that internally divide opposite two sides of the quadrangle, which defines the area before processing, by an interior division ratio by which the first pair of lines internally divide the opposite two sides of the rectangle, and process the image data in such a way that a spot at a point of intersection of the second pair of lines comes to a point of intersection of the first pair of lines after processing.

Or, in this case, the processing step may perform a process of determining in which one of four quadrangles obtained by quadrisecting the quadrangle that defines the area before processing by two lines each connecting a point of intersection of one of two sets of opposite two sides of the quadrangle that defines the area before processing to a point of intersection of diagonal lines of the quadrangle the spot is included, and then moving a point lying in the rectangle that defines the area after processing in a direction of a vertex equivalent to a vertex, among vertexes of a quadrangle determined as including the spot, that also serves as a vertex of the quadrangle defining the area before processing by a predetermined amount which becomes smaller as a number of times quadrisecting of the quadrangle is performed becomes larger, and process the image data in such a way that in a case where the process is repeated further until the point lying in the rectangle that defines the area after processing converges to substantially a given position, regarding the quadrangle determined as including the spot as a quadrangle defining the area before processing, a position of the point which reaches convergence becomes a position of a spot represented by the image data after processing.

The area may be comprised of a plurality of regions.

In this case, the measuring step may specify a region in which the spot is included, and measure the positional coordinates of the spot in the area by measuring positional coordinates of the spot in the specified region.

The display step may display a curve indicating a track along which a spot has moved, over an image based on image data after processing.

The processing step may specify one of plural levels to which a luminance of a spot represented by image data before processing corresponds.

In this case, the display step may display a spot having the luminance whose level has been specified in the processing step.

The measuring step may detect a spot identification pattern comprised of a plurality of spots from image data before processing and measure positional coordinates of the detected spot identification pattern as positional coordinates of a spot.

The measuring step may specify positions and velocity of a spot at two times based on plural pieces of image data before processing.

In this case, the processing step may determine an estimated position of the spot between the two times based on the positions and velocity of the spot at the two times specified in the measuring step, and process image data before processing in such a way that an image having the spot positioned at the determined estimated position is shown.

The measuring step may specify positions of a spot at a plurality of times based on plural pieces of image data before processing, determine a representative position representing a position of the spot in a time zone including the plurality of times based on the specified positions, and treat positional coordinates of the determined representative position as results of measuring positional coordinates of the spot.

The image display method may further comprise a color change detection step which detects a change in color of a spot represented by plural pieces of image data before processing based on the plural pieces of image data.

The measuring step may specify a velocity of a spot based on plural pieces of image data before processing.

In this case, the processing step may determine a position in an image indicated by image data after processing which the spot is to occupy next, based on the velocity specified in the measuring step and a latest position in the image indicated by image data after processing which the spot has occupied, and process image data in such a way that the spot comes to the determined position.

The image display method may further comprise a spot-shape determining step which determines a shape of a spot to be represented by image data after processing acquired as a result of processing performed in the processing step, based on the positional coordinates of the spot measured in the measuring step. According to this image display method, the image picked up from an arbitrary position is displayed on the display screen adequately. A picked-up spot is displayed on the display screen adequately after the position of the spot is converted in the coordinate conversion step. Further, the shape of the spot to be displayed reflects the position of the picked-up spot.

The processing step may externally receive a signal indicating that a light source of the spot is emitting light and process image data in response to the received signal.

A program according to a third aspect of the present invention is a program which allows a computer connected to an image display device and an image pickup section to function as an image pickup control section which causes the image pickup section to pick up a spot and an area including the spot from an arbitrary position, a generation section which generates image data of the area picked up by the image pickup control section, and a display control section which displays an image based on the image data generated by the generation section on a display screen of the display section, and to further function as a processing section which processes the image data in such a way that the image data is adequately displayed on the display screen of the display section, a measuring section which measures positional coordinates of the spot in the area, and a coordinate conversion section which converts the positional coordinates of the spot measured by the measuring section to positional coordinates that are reflected on post-processing image data acquired as a result of a process performed by the processing section.

According to a computer which executes this program, an image display device, and an image pickup section, an image picked up by the image pickup section placed at an arbitrary position is displayed on a display screen adequately. Further, a picked-up spot is displayed adequately on the display screen after the position of the spot is converted. Accordingly, operational characteristic when controlling a computer to display an image is excellent.

A program according to a fourth aspect of the present invention is a program which allows a computer connected to an image display device and a plurality of image pickup sections to function as an image pickup control section which causes the plurality of image pickup sections to pick up a spot and an area including the spot from a plurality of arbitrary positions, a generation section which generates image data of a plane in space picked up by the image pickup control section, and a display control section which displays an image based on the image data generated by the generation section on the display section, and to further function as a processing section which processes the image data generated by the generation section in such a way that the image data is adequately displayed on a display screen of the display section, a measuring section which measures positional coordinates of the spot in the space, a spot-shape determining section which determines a shape of a spot to be represented by image data after processing performed by the processing section, based on the positional coordinates of the spot measured by the measuring section, and a coordinate conversion section which converts the positional coordinates of the spot measured by the measuring section to positional coordinates that are reflected on post-processing image data.

According to a computer which executes this program, an image display device, and an image pickup section, an image picked up by the image pickup section placed at an arbitrary position is displayed on a display screen adequately. Further, a picked-up spot is displayed adequately on the display screen after the position of the spot is converted. The shape of the spot to be displayed reflects the position of the picked-up spot. Accordingly, operational characteristic when controlling a computer to display an image is excellent.

A projection system according to a fifth aspect of the present invention has a projector, comprising:

an image pickup section which picks up an area projected by the projector from an arbitrary position;

a generation section which generates image data of the area picked up by the image pickup section;

a processing section which is capable of displaying and outputting the image data generated by the generation section as an adequate display screen;

a detection section which detects a spot area which emits light having a specific wavelength from the projected area;

a measuring section which measures positional coordinates of the spot area detected by the detection section; and a coordinate conversion section which converts the positional coordinates measured by the measuring section to positional coordinates that are reflected on image data processed by the processing section.

BRIEF DESCRIPTION OF THE DRAWINGS

These objects and other objects and advantages of the present invention will become more apparent upon reading of the following detailed description and the accompanying drawings in which:

FIGS. 29A to 29C are diagrams each exemplarily showing a pattern of spotlights having the same color which are emitted from the light emitting unit;

FIG. 30 is a flowchart showing a spotlight extraction process for detecting a pattern of spotlights having the same color;

FIG. 54 is a diagram exemplarily showing an image displayed by the drawing system shown in FIG. 52;

DETAILED DESCRIPTION OF THE PREFERRED EMBODIMENTS

An image display device, an image display method, a program, and a projection system according to the embodiments of the present invention will be explained below with reference to the drawings.

First Embodiment

Figure 1:
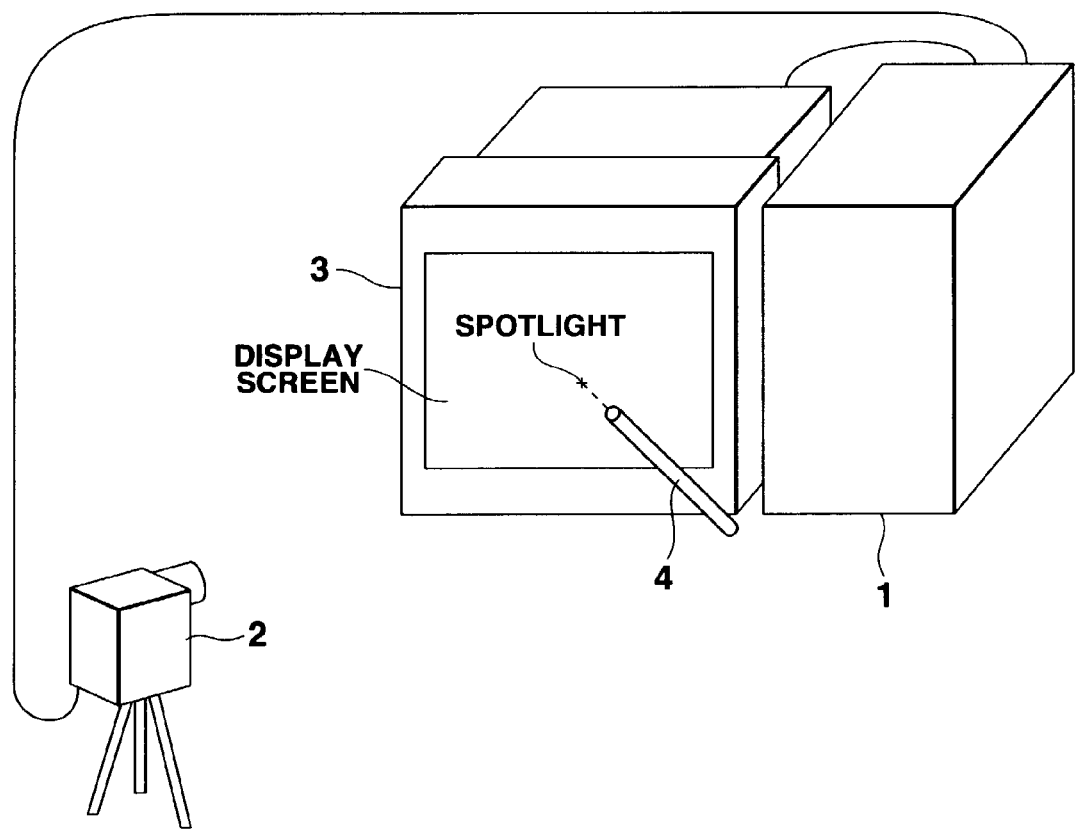
FIG. 1 is a diagram showing the structure of a drawing system according to a first embodiment of the present invention.

FIG. 1 is a diagram showing the structure of a drawing system according to a first embodiment of the present invention.

As illustrated, this drawing system comprises a data processing device 1, an image input unit 2, a display unit 3, and a light emitting unit 4. The data processing device 1 is connected to the image input unit 2 and to the display unit 3.

Figure 2:
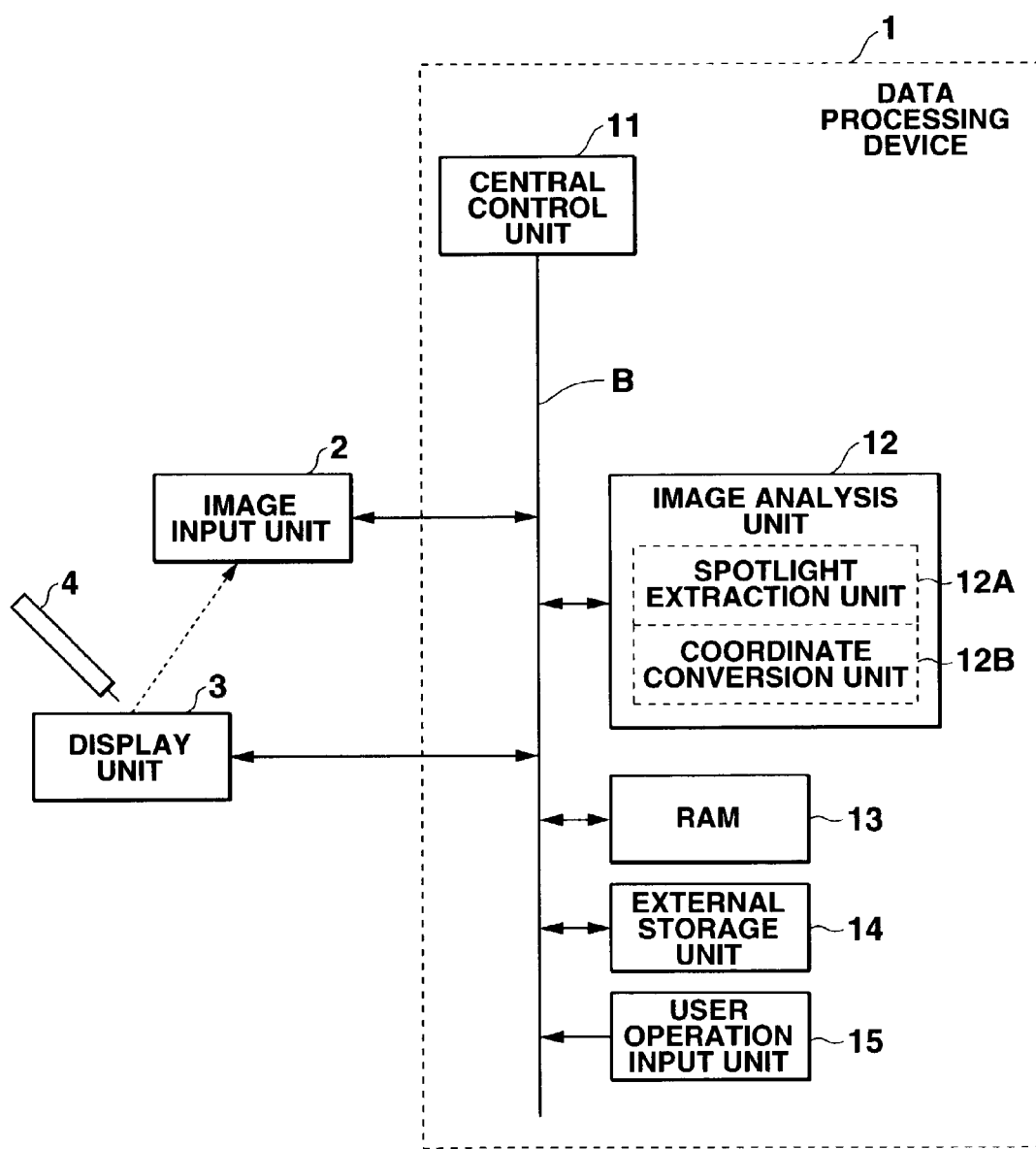
FIG. 2 is a block diagram showing connection between elements included in the drawing system shown in FIG. 1, and the structure of a data processing device.

As shown in FIG. 2, the data processing device 1 comprises a central control unit 11, an image analysis unit 12, a RAM (Random Access Memory) 13, an external storage unit 14, and a user operation input unit 15.

The central control unit 11 is connected to the image analysis unit 12, the RAM 13, and the external storage unit 14 through a bus B. The user operation input unit 15 is connected to the central control unit 11. The image input unit 2 and the display unit 3 are connected to the bus B.

The central control unit 11 is constituted by a CPU (Central Processing unit), etc. The central control unit 11 reads a program stored in the external storage unit 14 in response to an instruction input by a user operating the user operation input unit 15, and performs later-described processes in accordance with this program.

The RAM 13 serves as a work memory of the central control unit 11 and the image analysis unit 12.

The image analysis unit 12 comprises a CPU, a DSP (Digital Signal Processor), etc., and includes a spotlight extraction unit 12A and a coordinate conversion unit 12B in order to perform an image analysis process described later. A same CPU, etc. may perform the function of the central control unit 11 and the function of the image analysis unit 12.

Figure 5:
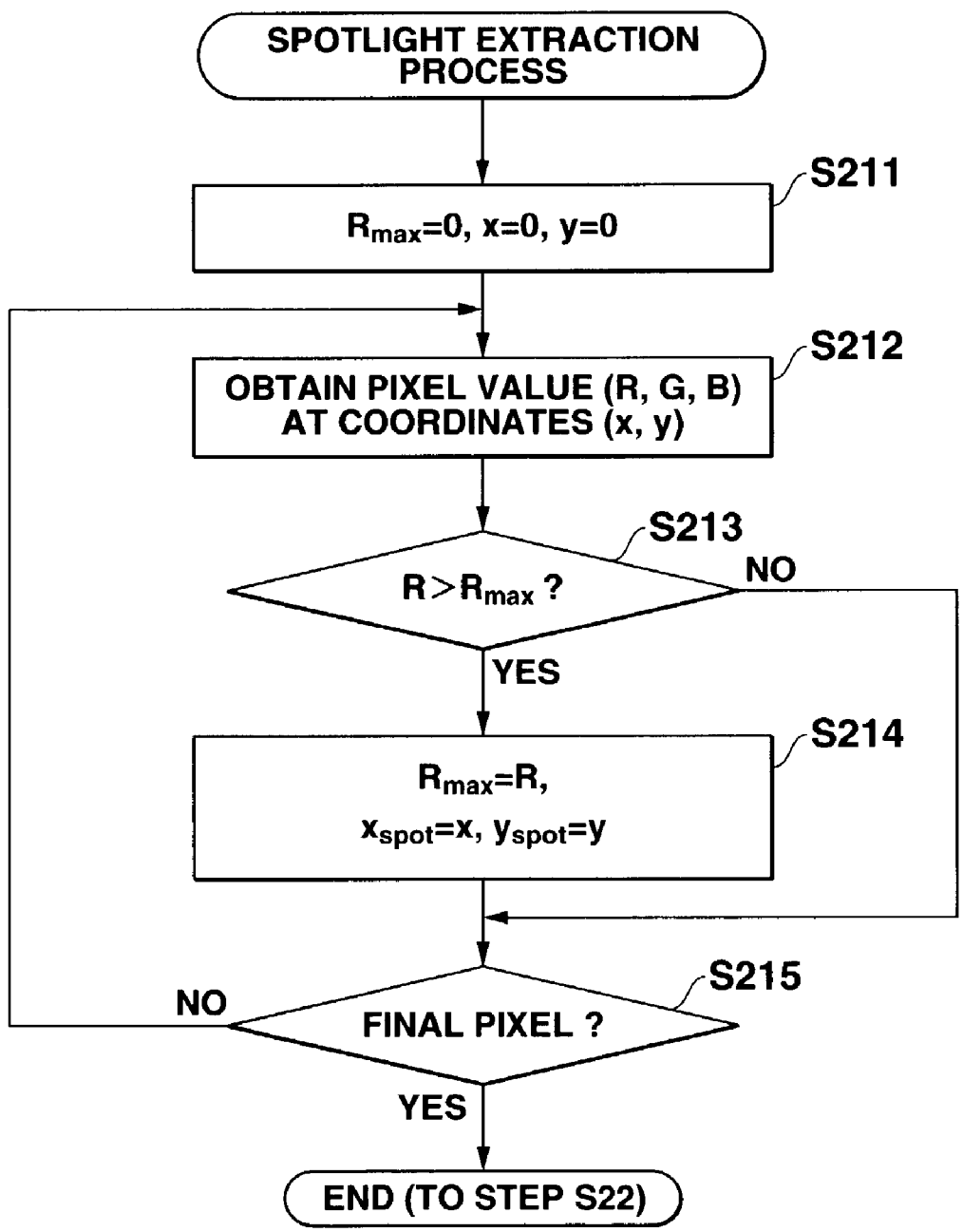
FIG. 5 is a flowchart showing a spotlight extraction process performed by the drawing system shown in FIG. 1.

The spotlight extraction unit 12A performs a process (a spotlight extraction process) for specifying a point which corresponds to a point onto which spotlight emitted from the light emitting unit 4 is directed, within an image taken by the image input unit 2 (i.e., an image represented by image data which is generated by the image input unit 2 and stored in the RAM 13 under the control of the central control unit 11), by following the steps shown in a flowchart of FIG. 5.

The coordinate conversion unit 12B performs a coordinate conversion process for specifying where the point specified by the spotlight extraction unit 12A is positioned on a later-described display screen of the display unit 3, based on the image data generated by the image input unit 2, by following the steps shown in a flowchart of FIG. 6.

The external storage unit 14 is constituted by a hard disk device, etc., and pre-stores a program executed by the central control unit 11.

The user operation input unit 15 comprises a keyboard, a mouse, etc., and receives input of information which is in accordance with an operation of a user (for example, an instruction for executing the program stored in the external storage unit 14), and supplies the input information to the central control unit 11.

The image input unit 2 is constituted by an image pick-up unit such as a video camera, digital still camera, etc. The image input unit 2 takes an image of the display screen of the display unit 3, generates the aforementioned image data which represents the taken image, and supplies this image data to the central control unit 11.

The display unit 3 comprises a CRT (Cathode Ray Tube) having a flat screen, a control circuit, etc., and displays an image represented by image data supplied thereto, on the display screen thereof, in accordance with an instruction supplied from the central control unit 11.

The light emitting unit 4 is constituted by a lighting pen, etc., and emits single-color spotlight having brightness adjustable by an operation of the user. Specifically, the light emitting unit 4 comprises a pressure sensor which generates a signal representing intensity of a pressure applied to a light emitting portion thereof, and thus emits light having brightness determined by the intensity of a power by which this light emitting portion is pushed onto the display screen of the display unit 3. And the brightness of the spotlight emitted from this light emitting portion increases, as the intensity of the power to push this light emitting portion onto the display screen of the display unit 3 increases. Note that in this embodiment, the light emitting unit 4 emits red-color light.

First Embodiment: Operation

Next, the operation of this drawing system will be explained with reference to FIG. 3 to FIG. 6.

Figure 3:
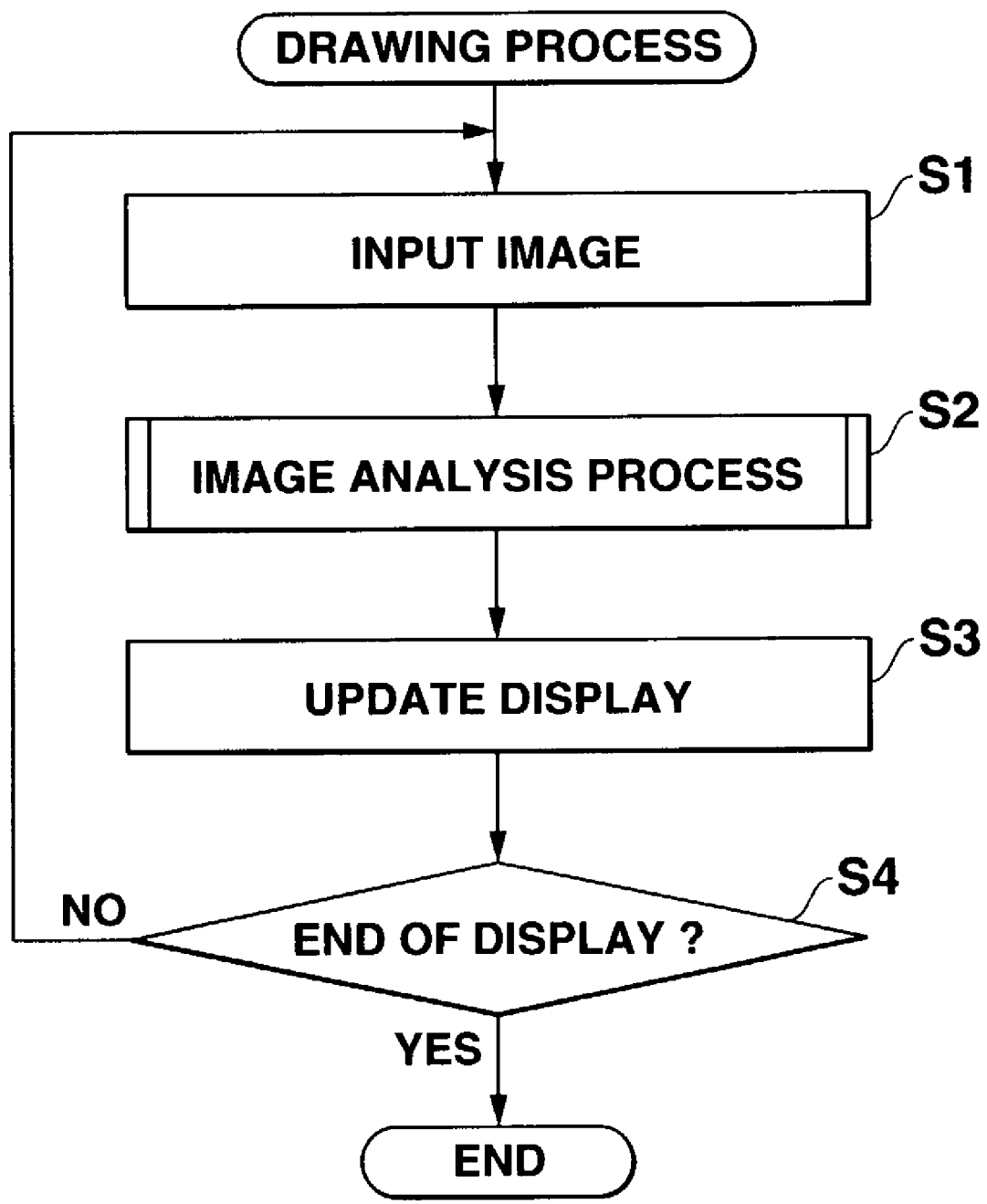
FIG. 3 is a flowchart showing a drawing process performed by the drawing system shown in FIG. 1.

FIG. 3 is a flowchart showing a drawing process.

Figure 4:
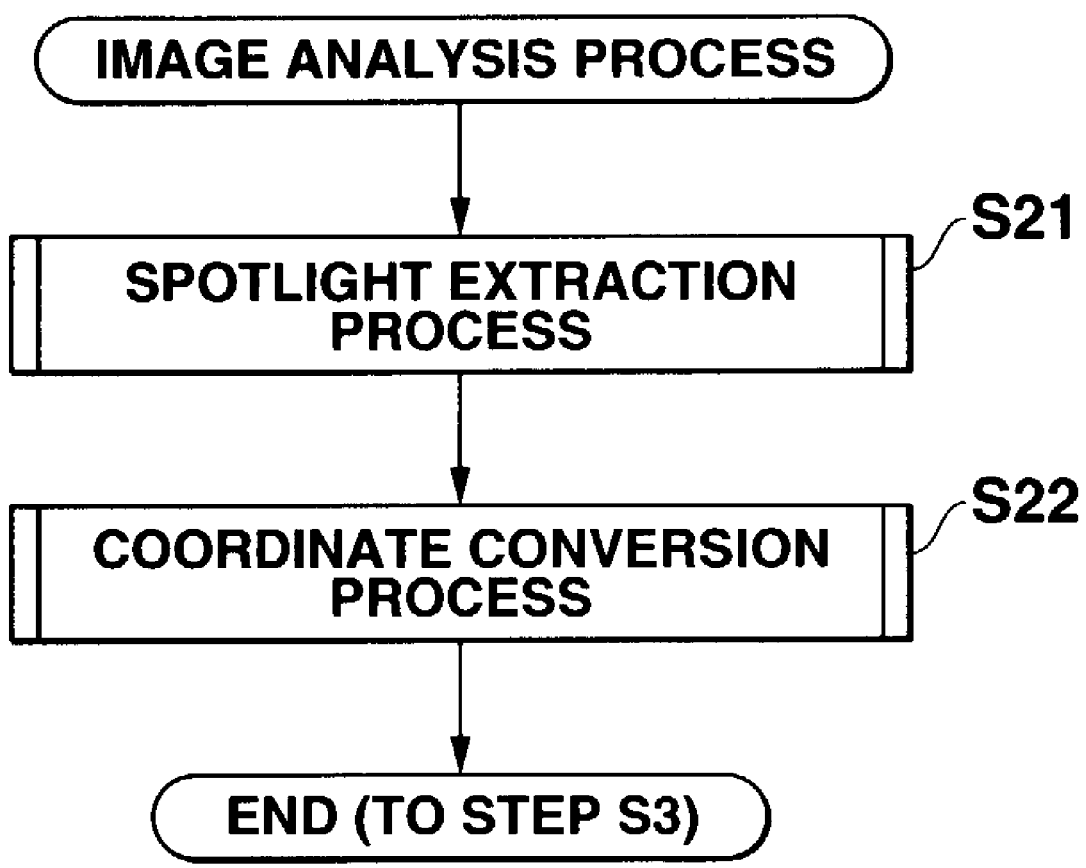
FIG. 4 is a flowchart showing an image analysis process performed by the drawing system shown in FIG. 1.

FIG. 4 is a flowchart showing the image analysis process.

FIG. 5 is a flowchart showing the spotlight extraction process.

Figure 6:
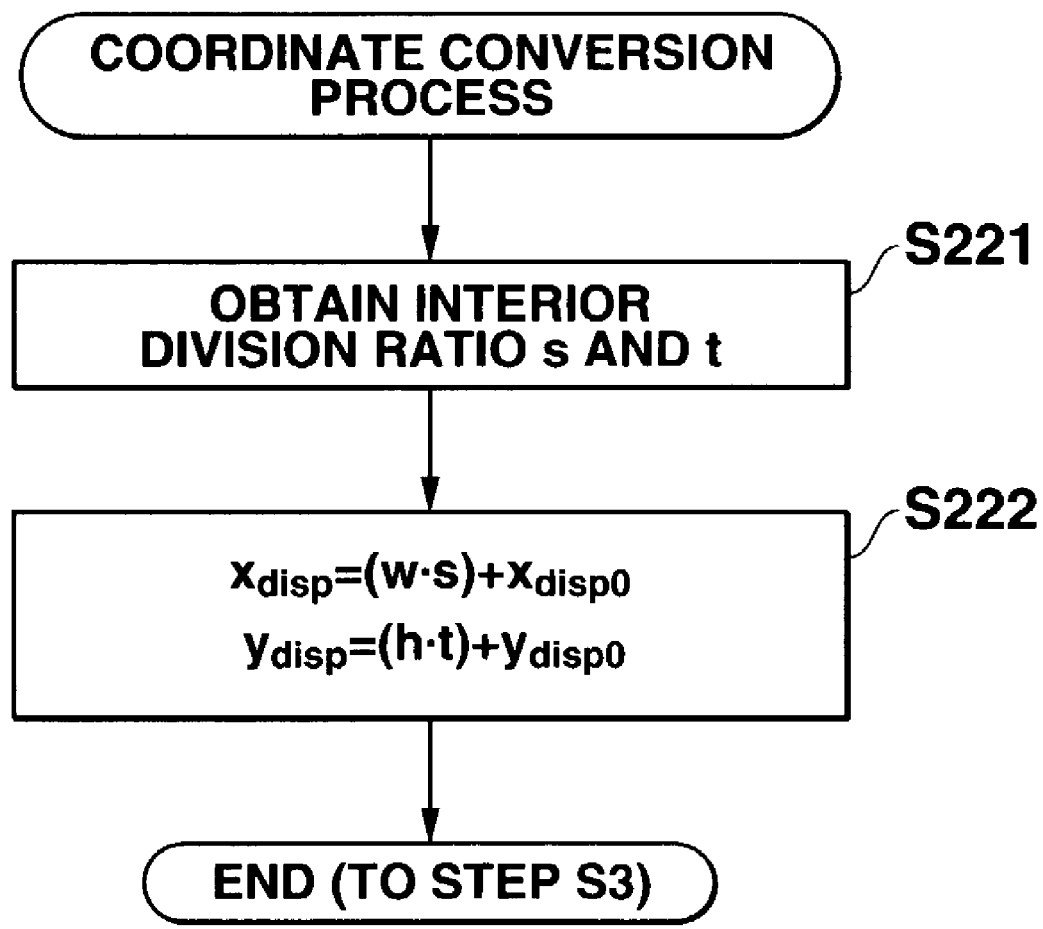
FIG. 6 is a flowchart showing a coordinate conversion process performed by the drawing system shown in FIG. 1.

FIG. 6 is a flowchart showing the coordinate conversion process.

When this drawing system starts the drawing process, the image input unit 2 takes an image of the display screen of the display unit 3, generates image data representing the taken image, and supplies this image data to the central control unit 11 of the data processing device 1 (FIG. 3, step S1). Due to this step, the image of the display screen of the display unit 3 is input.

The image data generated by the image input unit 2 is composed of a plurality of pixel data each representing a position and pixel value of a pixel, where the display screen of the display unit 3 is regarded as a group of pixels arranged in a matrix pattern. The pixel value is a variable which represents the color of each pixel as a combination of brightness of the respective red, green, and blue primary color components. The position of each pixel is represented as a combination of values of an x axis direction component and y axis direction component indicating the position of the pixel, where the image taken by the image input unit 2 is put on a plane of x-y orthogonal coordinates.

If the user is operating the light emitting unit 4 and irradiating spotlight on the display screen of the display unit 3 when the image of the display screen is input in step S1, the image data generated by the image input unit 2 in step S1 also represents the spot on the display screen of the display unit 3 formed by the spotlight.

To facilitate understanding, hereinafter it is assumed that the area occupied by the image displayed on the display screen of the display unit 3 is a rectangle A'B'C'D' shown in FIG. 7B. Specifically, this rectangle is formed of vertexes A' to D' and has a side A'B', a side B'C', a side C'D', and a side D'A'.

The image input unit 2 does not necessarily take the image of the display screen of the display unit 3 from right ahead of the display screen. Therefore, an area that corresponds to the rectangular area, within an image which is represented by the image data generated by the image input unit 2 in step S1, may not necessarily be a shape similar to the rectangle A'B'C'D'.

To facilitate understanding, hereinafter it is assumed that the area corresponding to the area occupied by the rectangle A'B'C'D' within the image represented by the image data generated by the image input unit 2 in step S1 is a quadrangle ABCD shown in FIG. 7A, having vertexes A, B, C, and D, and sides AB, BC, CD, and DA. On the image represented by the generated image data, positional coordinates $(x_a, y_a)$ of the vertex A, positional coordinates $(x_b, y_b)$ of the vertex B, positional coordinates $(x_c, y_c)$ of the vertex C, and positional coordinates $(x_d, y_d)$ of the vertex D are determined when, at the time of initialization prior to the image analysis process, the user performs some operation such as pointing four points on the display screen of the display unit 3 with the light emitting unit 4, and inputting data representing the positional coordinates of the four points. The sides AB, BC, CD, and DA of the quadrangle ABCD correspond to the sides A'B', B'C', C'D', and D'A' of the rectangle A'B'C'D' in this order.

Image Analysis Process: Spotlight Extraction Process

When the image data is supplied from the image input unit 2, the central control unit 11 stores this image data in the RAM 13, and instructs the image analysis unit 12 to start the image analysis process. The image analysis unit 12 starts the image analysis process in accordance with this instruction (step S2).

Specifically, the image analysis unit 12 performs a spotlight extraction process in step S2 first (FIG. 4, step S21).

When the spotlight extraction process is started, the spotlight extraction unit 12A of the image analysis unit 12 declares usage of a variable $R_{max}$ which represents brightness of a red component (R) of a spot whose red component (R) is the brightest among the red (R), green (G), and blue (B) components of a given pixel, and usage of variables (x, y) representing the positional coordinates of this spot (i.e., secures areas for storing the variable $R_{max}$, the variable x, and the variable y in the storage area of the RAM 13), and initializes the variable $R_{max}$, and the variables (x, y) (FIG. 5, step S211).

Then, the spotlight extraction unit 12A specifies any one of the pixel data which compose the image data stored in the RAM 13, and obtains a value of brightness of the red component represented by the pixel value of the specified pixel data (step S212). It should be noted that pixel data once specified in step S212 is never to be specified again.

Then, the spotlight extraction unit 12A determines whether the value of brightness of a red component which is most lately obtained in step S212 is greater than $R_{max}$ or not (step S213). In a case where it is determined that the value of brightness of the red component is equal to or smaller than $R_{max}$, the spotlight extraction unit 12A advances the process flow to step S215.

On the contrary, in a case where it is determined that the value of brightness of the red component is greater than $R_{max}$, the spotlight extraction unit 12A updates $R_{max}$ to the value of brightness of the red component most lately obtained in step S212 (step S214). Further in step S214, the spotlight extraction unit 12A updates the variables (x, y) to values of an x axis direction component and a y axis direction component which are represented by the pixel data most lately specified in step S212. When the process of step S214 is completed, the spotlight extraction unit 12A advances the process flow to step S215.

In step S215, the spotlight extraction unit 12A determines whether there is any pixel data left that has not yet been specified in step S212. In a case where it is determined that there is any, the spotlight extraction unit 12A returns the flow to step S212. On the other hand, in a case where it is determined that there is no pixel data left, the image analysis unit 12 terminates the spotlight extraction process, and goes to step S22 of the image analysis process.

The variables (x, y) at the time the spotlight extraction process is terminated represents the x axis direction component and y axis direction component of the position of the spot formed on the image taken by the image input unit 2 in step S1. The variable $R_{max}$ at the time the spotlight extraction process is terminated represents the brightness of the red component at the position of this spot.

Hereinafter, the variables (x, y) at the time the spotlight extraction process is terminated will be referred to as $(x_{spot}, y_{spot})$.

When the spotlight extraction process is terminated, the image analysis unit 12 starts the coordinate conversion process (step S22). When the coordinate conversion process is started, the coordinate conversion unit 12B of the image analysis unit 12 performs a process of step S221, as shown in FIG. 6.

In step S221, the coordinate conversion unit 12B obtains interior division ratios s and t explained below (note that s and t are both values equal to or greater than 0 and equal to or smaller than 1), based on the coordinates of the vertexes A, B, C, and D determined by the initialization, and the coordinates of the spot (indicated by a point P shown in FIG. 7A) which is located in the spotlight extraction process.

Procedures for obtaining s and t will be explained below in detail. First, as shown in FIG. 7A, the positions of the vertex A, a point S, and the point P have the relationship shown by an equation 1.

$$\vec{AP} = \vec{AS} + \vec{SP} \quad \text{[Equation 1]}$$

(where $\vec{AP}$, $\vec{TS}$, and $\vec{AP}$ are vectors respectively going from A to P, from A to S, and from S to P.)

Figure 7A:
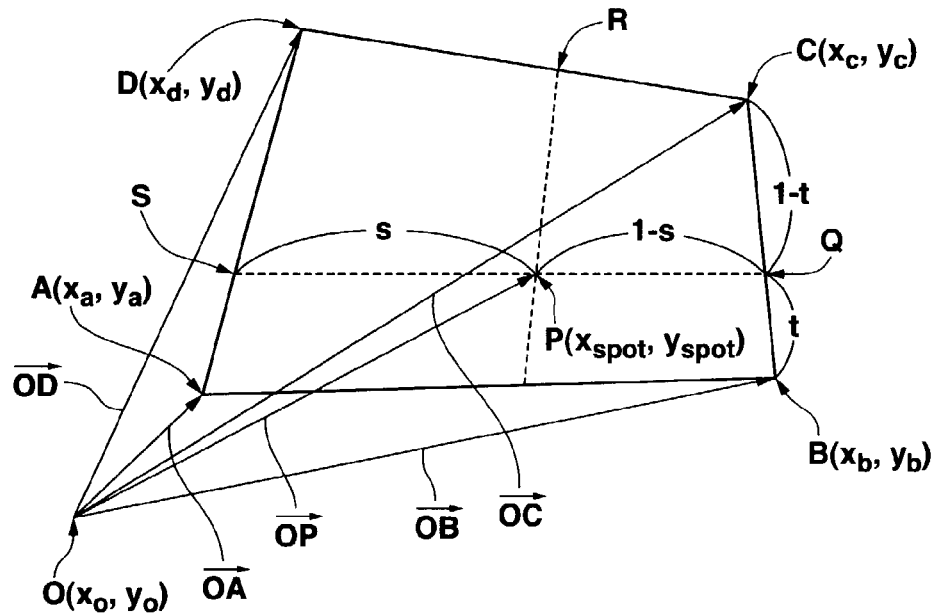
FIG. 7A is a diagram showing a shape of an image taken by an image input unit.

When a point O shown in FIG. 7A is arbitrarily set as a reference point, the positions of the vertex A, the vertex D, the point O, a point Q, and the point S have the relationship shown by an equation 2, as shown in FIG. 7A.

$$\begin{aligned}\vec{OP} - \vec{OA} &= t \times \vec{AD} + s \times \vec{SQ} \\ &= t \times \vec{AD} + s(\vec{AQ} - \vec{AS}) \\ &= t \times \vec{AD} + s(\vec{AQ} - t \times \vec{AD})\end{aligned} \quad \text{[Equation 2]}$$

(where $\vec{OP}$, $\vec{OA}$, $\vec{AD}$, $\vec{SQ}$, $\vec{AQ}$, and $\vec{AS}$ are vectors respectively going from O to P, from O to A, from A to D, from S to Q, from A to Q, and from A to S, s is an interior division ratio at which the point P internally divides the line segment SQ, and t is an interior division ratio at which the point Q divides the line segment BC.)

Accordingly, as shown in FIG. 7A, the positions of the vertex A, the vertex B, the vertex C, the vertex D, and the point P have the relationship shown by an equation 3.

$$\vec{OP} - \vec{OA} = t \times (-\vec{OA} + \vec{OD}) + s \times (-\vec{OA} + \vec{OB}) + s \times t \times (\vec{OA} - \vec{OB} + \vec{OC} - \vec{OD}) \quad \text{[Equation 3]}$$

(where $\vec{OB}$, $\vec{OC}$, and $\vec{OD}$ are vectors respectively going from O to B, from O to C, and from O to D.)

The coordinate conversion unit 12B substitutes the abscissas and ordinates of the respective vertexes A, B, C, D, and point P in the equation 3, and solve the resultant simultaneous equations, thereby to derive the interior division ratios s and t.

Figure 7B:
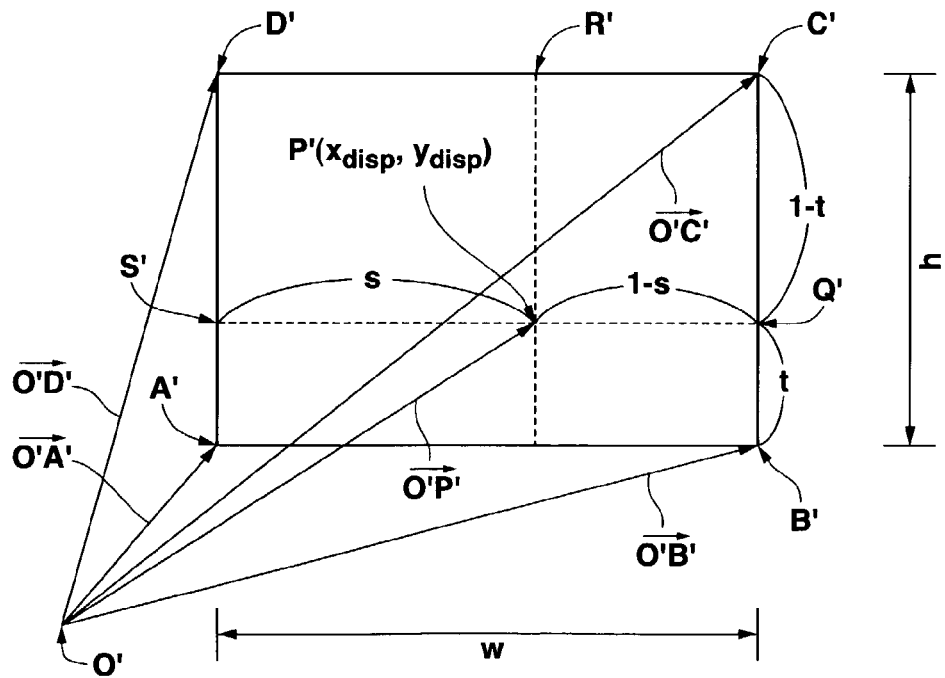
FIG. 7B is a diagram showing a shape of an area occupied by an image on a display screen of a display unit.

Then, the coordinate conversion unit 12B obtains coordinates ($x_{disp}$, $y_{disp}$) of a point P' on the display screen, i.e., the plain shown in FIG. 7B, based on the interior division ratios s and t obtained in above step S221, and stores the obtained abscissa $x_{disp}$ and ordinate $y_{disp}$ in association with $R_{max}$ which is obtained at the time the spotlight extraction process is terminated, in the RAM 13 (step S222). Thus, the coordinate conversion process is completed. That is, the point P' is a point that internally divides the side A'D' and side B'C' of the rectangle A'B'C'D' with a ratio of t:(1−t), and internally divides a line S'Q' (which internally divides the sides A'D' and B'C' with a ratio of t:(1−t)) with a ratio of s:(1−s).

Specifically, the coordinate conversion unit 12B obtains $x_{disp}$ and $y_{disp}$ by calculating the right sides of the following equation 4 and equation 5, respectively. Values w and h represent width and height of the rectangle A'B'C'D' (display screen) respectively, and $x_{disp0}$ and $y_{disp0}$ represent the position of the reference point (origin O') on the display screen.

$$x_{disp} = (w \times s) + x_{disp0} \quad \text{[Equation 4]}$$

$$y_{disp} = (h \times t) + y_{disp0} \quad \text{[Equation 5]}$$

When the coordinate conversion process is terminated, the image analysis unit 12 terminates the image analysis process and advances the flow to step S3 of the drawing process.

In step S3, the central control unit 11 reads $x_{disp}$, $y_{disp}$, and $R_{max}$ stored in the RAM 13 in step S222, from the RAM 13. Then, the central control unit 11 instructs the display unit 3 to display a spot having brightness corresponding to $R_{max}$ at the position corresponding to the coordinates ($x_{disp}$, $y_{disp}$) on the display screen of the display unit 3. The display unit 3 displays such a spot on the display screen in accordance with this instruction. Accordingly, the coordinates ($x_{disp}$, $y_{disp}$) is the position at which the spot is displayed in step S3.

The position at which the spot is displayed in step S3 should be the position where the light emitted from the light emitting unit 4 has hit on the display screen.

In step S3, this drawing system may keep displaying the spot displayed earlier or may erase this spot from the display screen. Or, whether or not to erase the spot may be determined based on an instruction input by the user by operating the user operation input unit 15.

In a case where the spot displayed earlier is not to be erased from the display screen, the track of positions on the display screen that are irradiated by the light emitted from the light emitting unit 4 is displayed on the display screen. Thus, the operator of the light emitting unit 4 can draw characters or figures on the display screen using the light emitting unit 4.

Next, the central control unit 11 determines whether or not the user instructs end of display of images by operating the user operation input unit 15 (step S4). In a case where it is determined that the user does not give such an instruction, the central control unit 11 returns the flow to step S1. On the other hand, in a case where it is determined that the user instructs end of display of images, the central control unit terminates the drawing process.

The structure of this drawing system is not limited to the above described one, but can be modified variously and applied in various ways.

For example, the display unit 3 may be a liquid crystal display. Further, the display unit 3 may not necessarily display a spot on the display screen in step S3, but may display an arbitrary figure in an arbitrary color. Moreover, the brightness of the light emitted from the light emitting unit 4 may not necessarily be changeable, and the light emitted from the light emitting unit 4 may not necessarily be single-color light.

The spotlight extraction unit 12A may extract a plurality of spots having different colors from each other, and the coordinate conversion unit 12B may determine the display positions on the display screen, of the respective spots extracted by the spotlight extraction unit 12A. In this case, this drawing system may display the respective spots whose display positions are determined by the coordinate conversion unit 12B, in colors or shapes different from each other.

Further in this case, this drawing system may comprise a plurality of light emitting units 4 which emit light of different colors from each other. Those light emitting units 4 can be operated by different operators.

Figure 8:
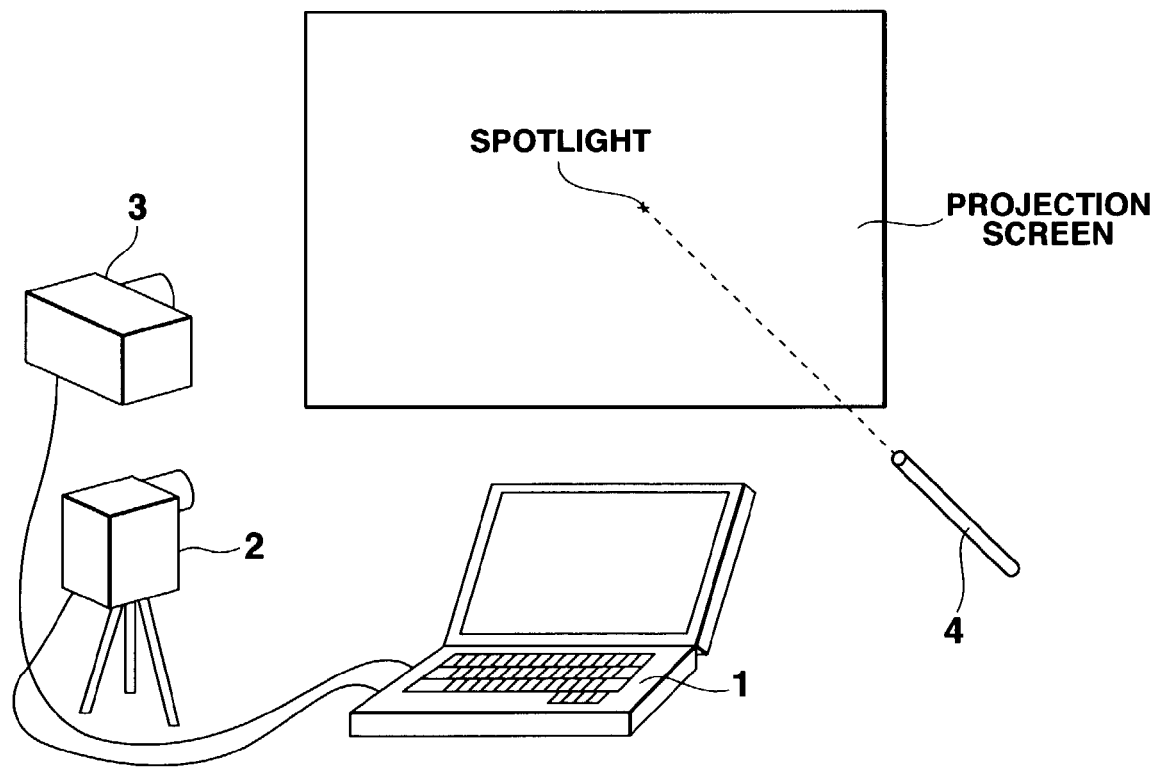
FIG. 8 is a diagram showing a modified example of the drawing system shown in FIG. 1.

Furthermore, the display unit 3 may comprise a projector for projecting an image on a projection screen such as a wall, in place of a display screen, as shown in FIG. 8. In this case, the image input unit 2 may take an image of the image projected by the display unit 3 on the projection screen, and this drawing system may use this projection screen as the display screen of the display unit 3 to perform the above described processes.

And in this drawing system, the image input unit 2 may take an image of a lattice pattern made of rectangles each forming a unit cell of the lattice, and the display unit 3 may display image data representing the taken image (distorted lattice pattern).

In this case, when the user uses the mouse of the user operation input unit 15 to specify four points which are the vertexes of a given unit cell constituting the distorted lattice pattern displayed on the display screen of the display unit 3, the coordinate conversion unit 12B may store the positions of the four points on the display screen in association with one another.

Figure 9:
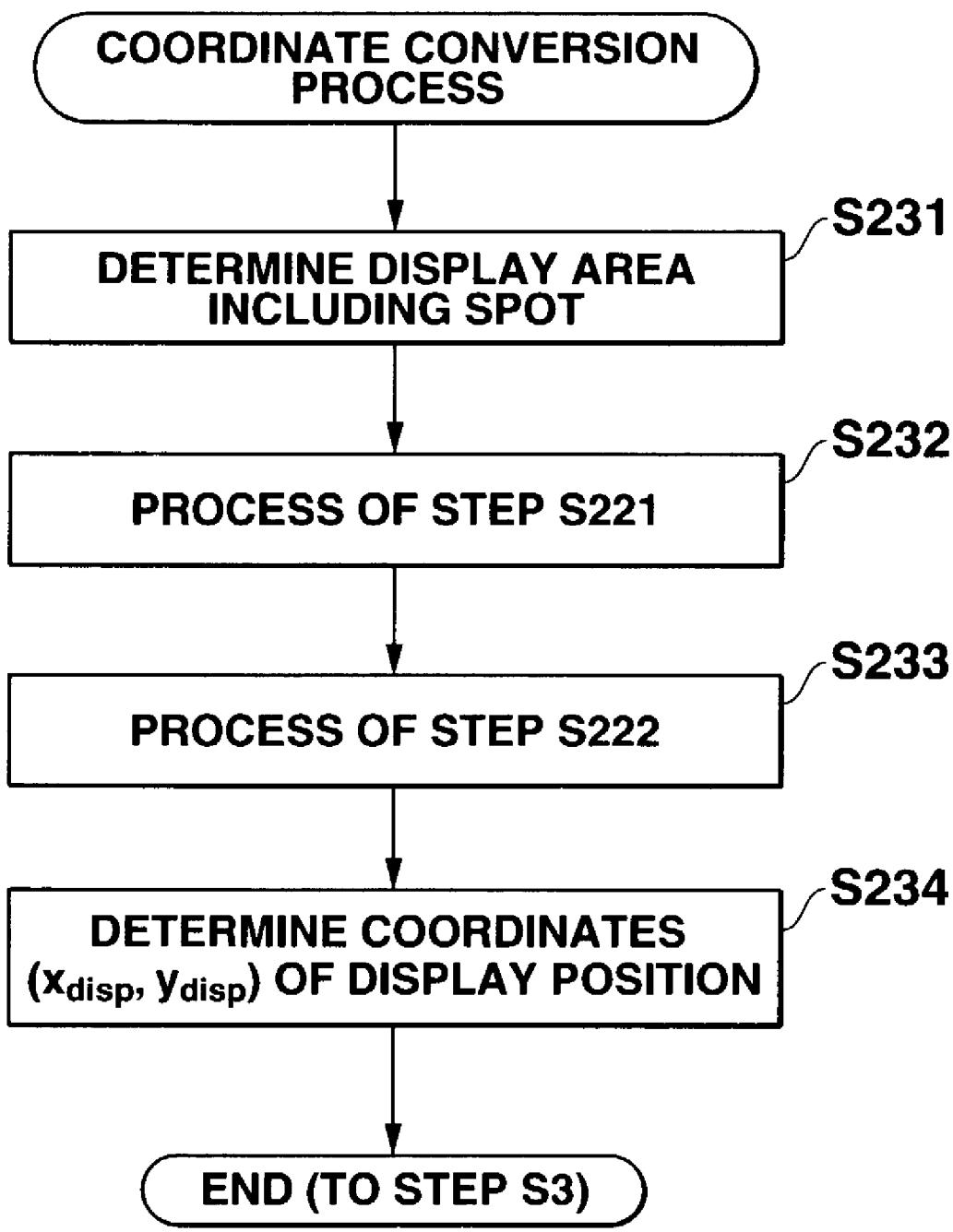
FIG. 9 is a flowchart showing a coordinate conversion process.

Then, if the coordinate conversion unit 12B stores the positions of the vertexes of a display area (unit cell), the coordinate conversion unit 12B may perform steps S231 to S234 shown in FIG. 9 as the coordinate conversion process, instead of the above steps S221 and S222.

First, the coordinate conversion unit 12B determines in which display area the position of a spot extracted by the spotlight extraction unit 12A (i.e., the position of a spot represented by a pair of abscissa $x_{spot}$ and ordinate $y_{spot}$) is included, based on the positions of the vertexes of the display area stored in the coordinate conversion unit 12B (FIG. 9, step S231).

Then, the coordinate conversion unit 12B performs a process substantially equal to the above described step S221, by regarding the display area which is determined as including the position of the spot extracted by the spotlight extraction unit 12A, as the above described quadrangle ABCD, and regarding a rectangular area (the display area after the conversion process) occupying a region of the display screen of the display unit 3 and having sides of certain lengths, as the above described rectangle A'B'C'D' (step S232).

Then, the coordinate conversion process 12B performs a process substantially equal to the above described step S222 (step S233). However, the coordinates to be obtained (the coordinates at the intersection of a line segment PR and a line segment QS) need not to be coordinates which are measured from a specific point on the display screen of the display unit 3 which is determined as the origin.

Next, the coordinate conversion unit 12B determines the coordinates ($x_{disp}$, $y_{disp}$) representing the display position on the display screen of the display unit 3, of the spot extracted by the spotlight extraction unit 12A, based on the coordinates obtained in step S233 and the positions of the vertexes of the display area which is determined in step S231 as including the position of the spot. Then, the coordinate conversion unit 12B stores the obtained values $x_{disp}$, and $y_{disp}$, and the variable $R_{max}$ which is obtained at the time the spotlight extraction process is completed, in association with one another in the RAM 13 (step S234), and terminates the coordinate conversion process.

Figure 10A:
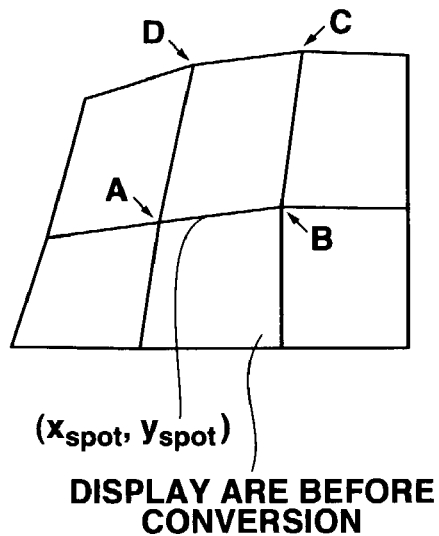
FIGS. 10A and 10B are diagrams showing a display area before conversion, and a display area after conversion, respectively.
Figure 10B:
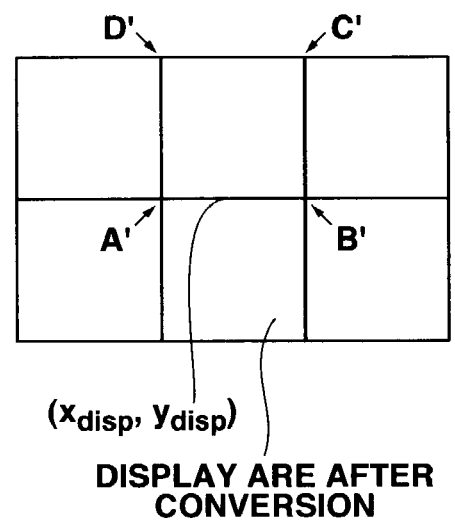

However, in the case where there are a plurality of display areas which should be conversion-processed, the spot might be located on a side shared by two display areas before being conversion-processed, as shown in FIG. 10. In this case, the coordinate conversion unit 12B determines the display position of the spot in step S234 so that the spot can be displayed on the same position on the display screen, whichever of the two display areas before being conversion-processed is specified in step S231.

By performing the processes of the above steps S231 to S234 as the coordinate conversion process, the spot can be displayed on the right position on the display screen of the display unit 3 (i.e., the position of the display screen where the light emitted from the light emitting unit 4 is irradiated), even if the optical system of the image input unit 2 cause aberration.

In the case where the display unit 3 displays a lattice pattern which is distorted, when the image input unit 2 generates image data representing the distorted lattice pattern which is the target to be displayed by the display unit 3, the image input unit 2 may adjust the sensitivity of the image-taking operation so that the distorted lattice pattern can be displayed in its original undistorted shape.

In this case, if the user operates the user operation input unit 15 and gives an instruction to display the distorted lattice pattern, the central control unit 11 of the data processing device 1 may transmit this instruction to the image input unit 2. In response to the transmitted instruction, the image input unit 2 may change the sensitivity of the image-taking operation to a value at which the distorted lattice pattern is displayed in its undistorted shape.

Modified Version of First Embodiment

In the above first embodiment, there has been explained a case where the image taken by the image input unit 2 and the image displayed by the display unit 3 can be associated with each other by linear conversion of coordinates. However, there are cases where nonlinear distortion such as barrel distortion may be caused on the input image, due to distortion of the camera lens of the image input unit 2, and distortion of the display unit 3 (distortion generated if the display screen such as a CRT is mildly curved).

In those cases, a correct coordinate conversion process cannot be performed according to the above first embodiment. Therefore, a calibration process is performed before the drawing process. A modification of the drawing system where the calibration process is performed, will be specifically explained with reference to FIGS. 11 to 14.

The circuit structure of the data processing device 1 according to this modification is the same as that shown in FIG. 2, thus explanation will be omitted. A program for controlling the calibration process is stored in the external storage unit 14 or in the central control unit 11. A predetermined area within the RAM 13 will be used as a work memory for executing this program.

Modified Version of First Embodiment: Operation

Figure 11:
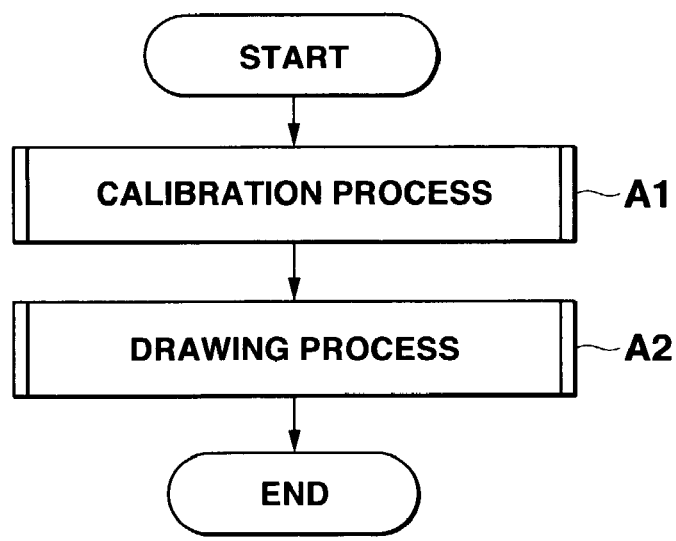
FIG. 11 is a flowchart showing an operation performed by the data processing device according to the modified example of the first embodiment.

A flowchart of the entire processes including the calibration process performed by the drawing system according to this modification is shown in FIG. 11. That is, this drawing system performs the drawing process shown in FIG. 3 in step A2, and performs the calibration process (step A1) as a preparatory process.

Figure 12:
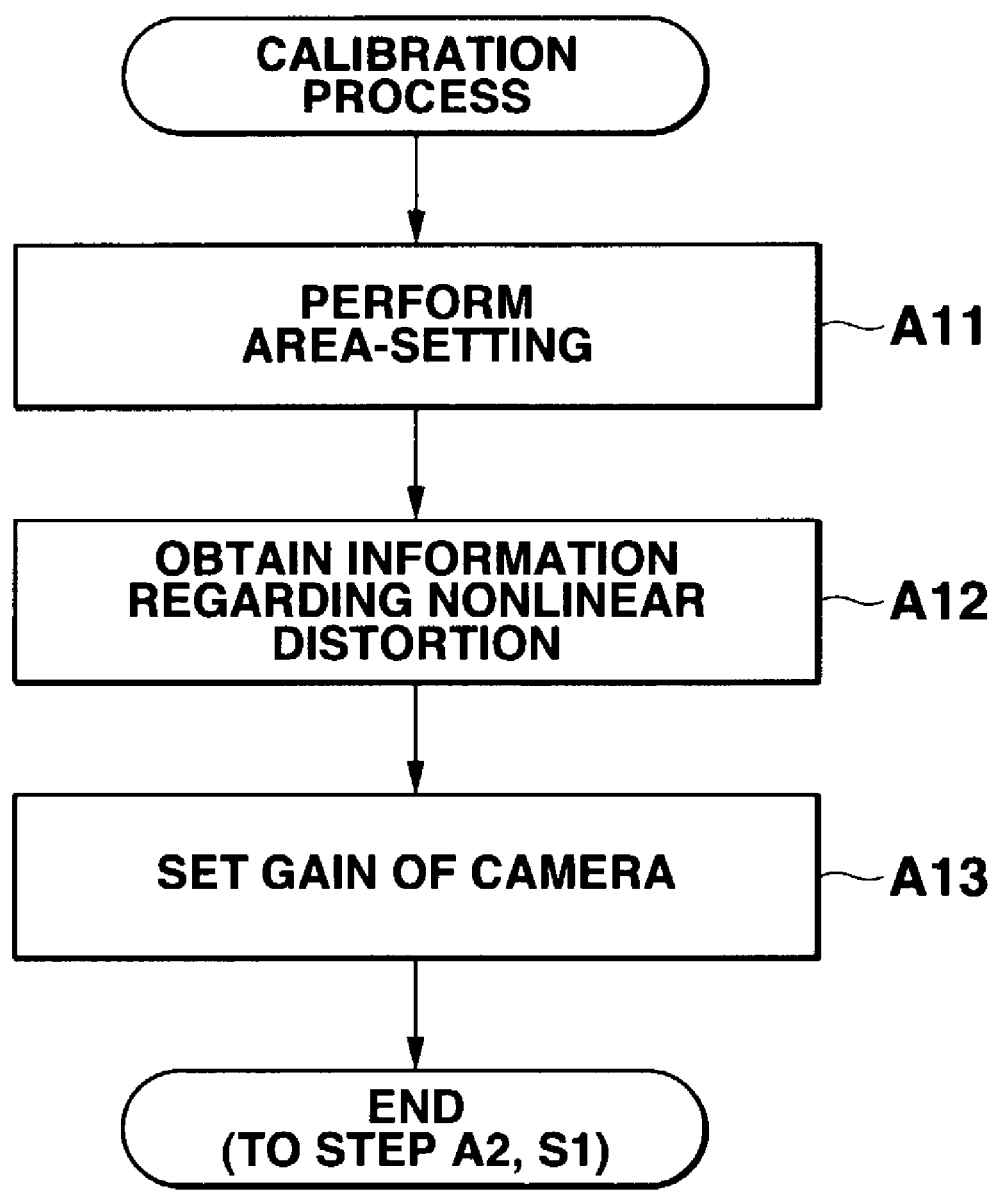
FIG. 12 is a flowchart showing a calibration process according to the modified example of the first embodiment.

FIG. 12 is a flowchart showing the calibration process.

In the calibration process, this drawing system performs area-setting first, to preset an area within an input image whose coordinates are to be converted. This area is set by, for example, determining coordinates of four points A, B, C, and D which are to be the corners of the area to be set using the mouse of the user operation input unit 15, or by pointing four points on the display screen of the display unit 3 using the light emitting unit 4, as specifically explained in the first embodiment (step A11).

In a case where the area is set by using the mouse in step A11, a problem may be caused that the position on the display screen of the display unit 3 where the spotlight emitted from the light emitting unit 4 seems to irradiate when viewed from the standpoint of the operator does not substantially coincide with the position of the spot to be displayed in step S3, due to the parallax between the sight of the image input unit 2 and the sight of the operator, or light refraction caused on the surface of the display screen of the display unit 3 which is covered with transparent material. However, in a case where the area is set by pointing four points on the display screen of the display unit 3 using the light emitting unit 4, the spotlight emitted from the light emitting unit 4 is reflected on the surface of the display screen of the display unit 3, and the reflected spotlight is taken by the image input unit 2. Accordingly, it is possible to avoid the problem that the position where the spotlight seems to irradiate and the position of the spot to be displayed do not coincide with each other.

Next, this drawing system obtains information regarding nonlinear distortion (step A12). Specifically, the display unit 3 displays a lattice on the display screen, and the user specifies coordinates of a point on the lattice, using the mouse of the user operation input unit 15. Then, the central control unit 11 obtains the coordinates of the point on the lattice, as information regarding nonlinear distortion, based on the result of specifying.

At the end of the calibration process, this drawing system sets information regarding the image-taking of the image input unit 2, especially, gain of the camera (not illustrated) of the image input unit 2 (step A13). The process of step A13 is performed since the brightness of the projected image compared to the brightness of the spot needs to be reduced in order to distinguish the spot from the projected image. However, when performing the area-setting process of step A11, if the brightness of the projected image is controlled down, the projected image may be blackened, or the difference in brightness between the projected image and the spot may become very small. Therefore, it is preferred that in area-setting, the gain of the camera is set so that the projected image can be displayed clearly, and after obtaining information regarding nonlinear distortion (correction information), the brightness of the projected image compared to the brightness of the spot is reduced to the extent that the projected image and the spot can be distinguished from each other.

Figure 13:
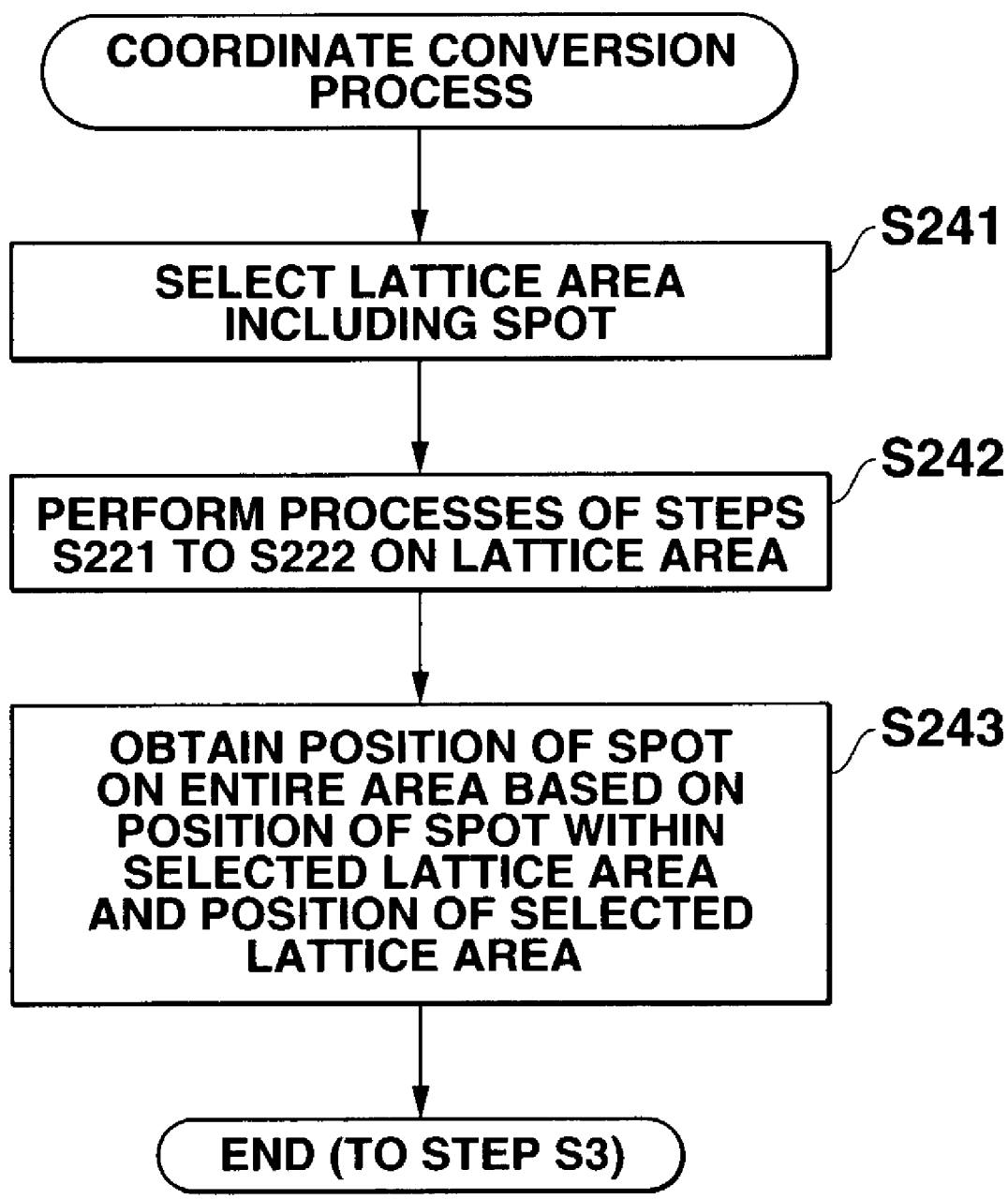
FIG. 13 is a flowchart showing a coordinate conversion process according to the modified example of the first embodiment.
Figure 14:
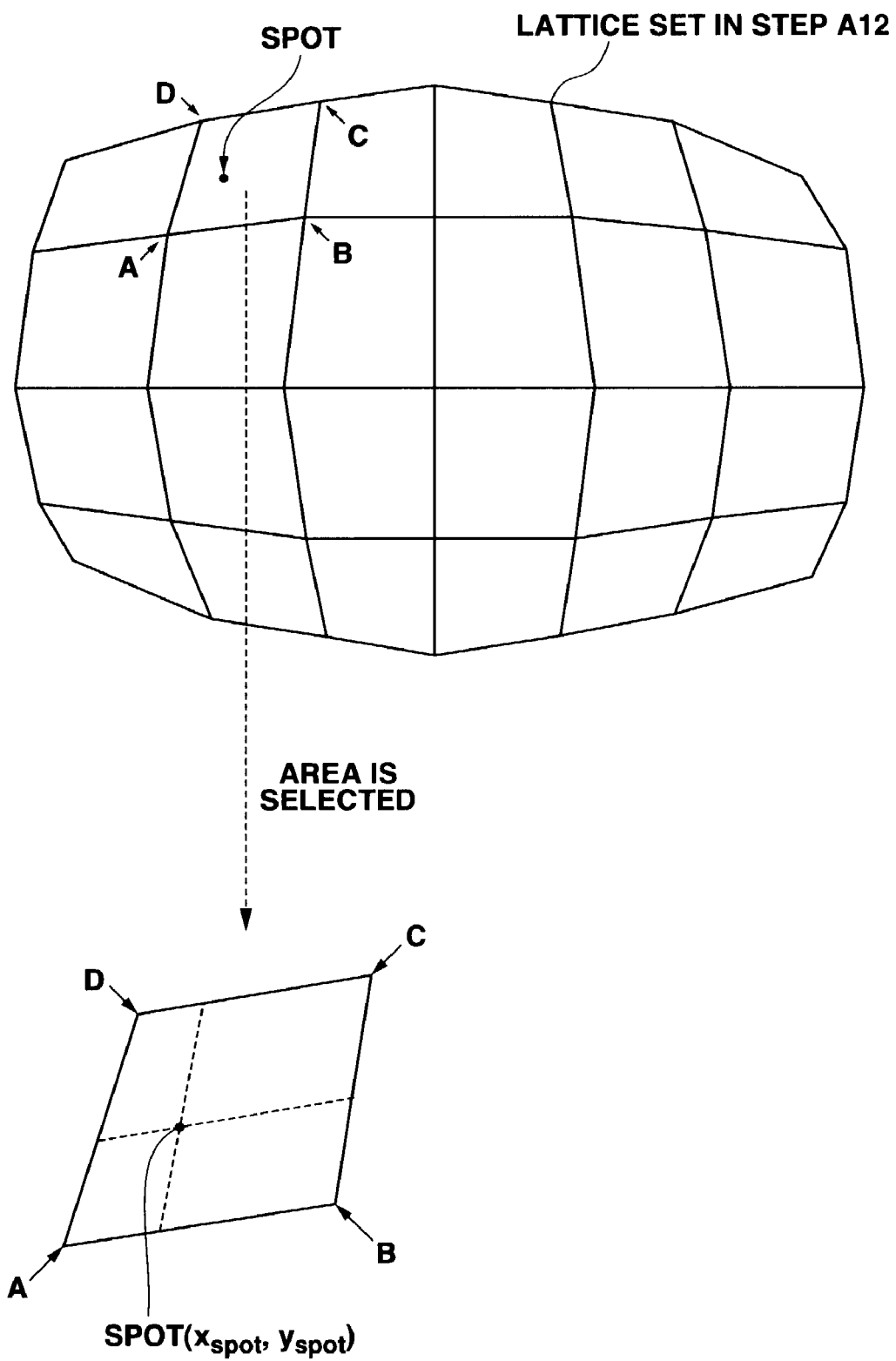
FIG. 14 is a diagram for explaining a coordinate conversion process according to the modified example of the first embodiment.

The drawing system according to this modification performs processes shown in FIG. 13, as the coordinate conversion process.

First, a lattice area (an area within the lattice) that includes the spot is selected using the information regarding nonlinear distortion obtained in step A12 (i.e., coordinates of the point on the lattice) (step S241). Then, this lattice area including the spot is subjected to the processes of steps S221 and S222 shown in FIG. 6 (step S242). After this, the position of the spot on the entire latticed screen is obtained, based on the result of the coordinate conversion process and the position of the selected lattice area (step S243).

When the drawing process is started, the image input unit 2 adjusts the sensitivity (gain) of the image-taking, so that the brightness of the spot displayed on the display screen in step S3 does not reach saturation, even if the brightness of the spotlight irradiating the display screen of the display unit 3 reaches the maximum intensity that can be achieved by the spotlight emitted from the light emitting unit 4. As a modified example, when the drawing process is started, the central control unit 11 may give an instruction to adjust the sensitivity, to the image input unit 2. And in response to this instruction, the image input unit 2 may change the sensitivity of the image-taking, to a value large enough to prevent the brightness of the spot displayed in step S3 from reaching saturation, even if the brightness of the spotlight irradiating the display screen of the display unit 3 reaches the maximum intensity of the light emitted from the light emitting unit 4.

Further, also while this drawing system is performing the drawing process, the image input unit 2 may adjust the sensitivity of the image-taking, so that the brightness of the spot displayed in step S3 does not reach saturation, even if the brightness of the spotlight irradiating the display screen of the display unit 3 reaches the maximum intensity of the light emitted from the light emitting unit 4.

In this case, when the drawing process is started, the central control unit 11 or the image analysis unit 12 may determine the value of the sensitivity of the image-taking which is set in the image input unit 2 based on the image data supplied from the image input unit 2, and may give an instruction to adjust the sensitivity to the determined value to the image input unit 2. In response to this instruction, the image input unit 2 may change the sensitivity of the image-taking to the value which is in accordance with the instruction.

In the first embodiment and its modified version, extraction of spotlight and conversion of coordinates have been explained. If the image input unit 2 takes images of the display screen successively and performs coordinate conversion by extracting spotlights one by one in time-series in accordance with the control of the data processing device 1, a track drawn by the extracted spots can be reflected on the display screen.

Figure 15:
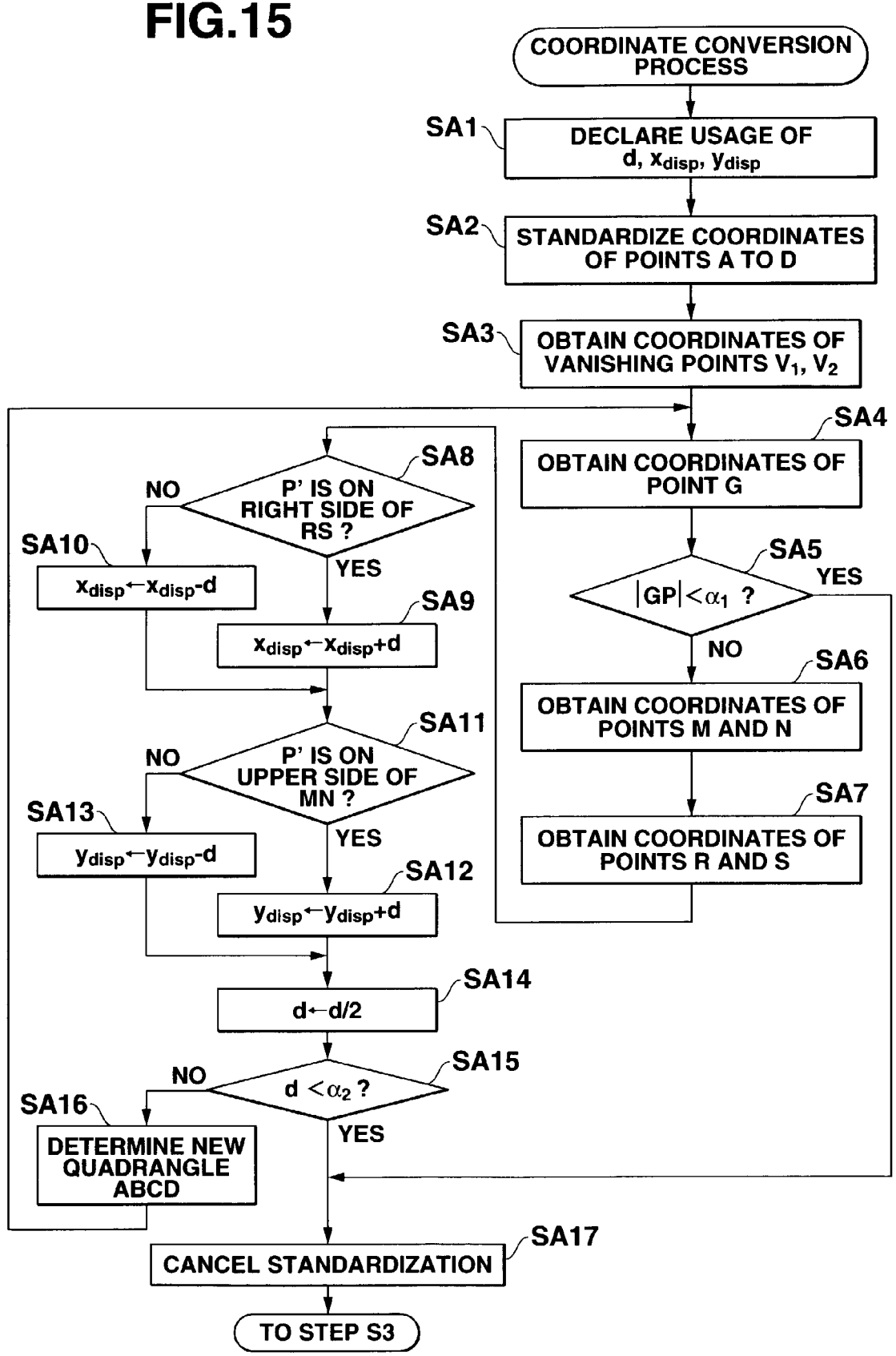
FIG. 15 is a flowchart showing a coordinate conversion process according to the modified example of the first embodiment.

The coordinate conversion unit 12B of the image analysis unit 12 may perform the coordinate conversion process of step S22, by following the procedures shown in FIG. 15.

When the coordinate conversion unit 12B starts the coordinate conversion process after the spotlight extraction process is terminated, it declares usage of a variable d. Further, the coordinate conversion unit 12B declares usage of a variable $x_{disp}$ representing the value of the x axis direction component of the aforementioned point P' and a variable $y_{disp}$ representing the value of the y axis direction component of the point P' (FIG. 15, step SA1).

Then, the coordinate conversion unit 12B initializes the coordinates ($x_{disp}$, $y_{disp}$) of the point P' and the variable d, and standardizes the coordinates of the points A to D aforementioned (step SA2). Specifically, the coordinate conversion unit 12B substitutes a value 0.5 for the variable $x_{disp}$, a value 0.5 for the variable $y_{disp}$, and a value 0.25 for the variable d, and determines to regard the coordinates of the point A as (0, 0) and regard the coordinates of the point C as (1, 1) after the step SA2.

Next, the coordinate conversion unit 12B obtains the coordinates of a vanishing point $V_1$ (the intersection of the line AB and the line DC), and the coordinates of a vanishing point $V_2$ (the intersection of the line BC and the line AD) (step SA3).

Then, the coordinate conversion unit 12B obtains the coordinates of a point G which is the intersection of the line segment AC and the line segment BD (step SA4).

After this, the coordinate conversion unit 12B determines whether or not the distance between the point G and the aforementioned point P is smaller than a predetermined amount $\alpha_1$ (step SA5), and if determining that the distance between the point G and the point P is smaller than the predetermined amount $\alpha_1$, advances the flow to the step SA17 to be described later.

On the other hand, if determining that the distance between the point G and the point P is equal to or greater than the predetermined amount $\alpha_1$, the coordinate conversion unit 12B obtains the coordinates of a point M at the intersection of the line $V_1G$ and the line segment BC, and the coordinates of a point N at the intersection of the line $V_1G$ and the line segment DA (step SA6). Then, the coordinate conversion unit 12B obtains the coordinates of a point R at the intersection of the line $V_2G$ and the line segment CD, and the coordinates of a point S at the intersection of the line $V_2G$ and the line segment AB (step SA7).

Next, the coordinate conversion unit 12B determines whether or not the point P' represented by the present values of the variable $x_{disp}$ and variable $y_{disp}$ is located on the right side of the line RS (in other words, whether or not the line segment AP' intersects with the line RS) (step SA8). In a case where determining that the point P' is located on the right side of the line RS, the coordinate conversion unit 12B increases the variable $x_{disp}$ by an amount corresponding to the variable d (step SA9). On the contrary, in a case where determining that the point P' is not located on the right side of the line RS, the coordinate conversion unit 12B decreases the variable $x_{disp}$ by an amount corresponding to the variable d (step SA10).

When completing the processes of steps SA9 and SA10, the coordinate conversion unit 12B determines whether or not the point P' represented by the present values of the variable $x_{disp}$ and variable $y_{disp}$ is located on the upper side of the line MN (in other words, whether or not the line segment AP' intersects with the line MN) (step SA11).

In a case where determining that the point P' is located on the upper side of the line MN, the coordinate conversion unit 12B increases the variable $y_{disp}$ by an amount corresponding to the variable d (step SA12). On the other hand, in a case where determining that the point P', is not located on the upper side of the line MN, the coordinate conversion unit 12B decreases the variable $y_{disp}$ by an amount corresponding to the variable d (step SA13).

When completing the processes of steps SA12 and SA13, the coordinate conversion unit 12B changes the variable d to the half of the present variable d (step SA14), and determines whether or not the variable d after being changed is smaller than a predetermined amount $\alpha_2$ (step SA15). If determining that the variable d is smaller than the predetermined amount $\alpha_2$, the coordinate conversion unit 12B advances the flow to step SA17.

On the other hand, in a case where determining that the variable d is equal to or greater than the predetermined amount $\alpha_2$, the coordinate conversion unit 12B specifies a quadrangle that includes thereinside the point P' represented by the present values of the variable $x_{disp}$ and variable $y_{disp}$, among a quadrangle ASGN, a quadrangle SBMG, a quadrangle GMCR, and a quadrangle NGRD, and determines to regard the specified quadrangle as a new quadrangle ABCD (step SA16), and returns the flow to step SA4.

In a case where the coordinate conversion unit 12B regards the quadrangle ASGN as the new quadrangle ABCD, it regards the point A as the new point A as before, the point S as the new point B, the point G as the new point C, and the point N as the new point D.

In a case where the coordinate conversion unit 12B regards the quadrangle SBMG as the new quadrangle ABCD, it regards the point S as the new point A, the point B as the new point B as before, the point M as the new point C, and the point G as the new point D.

In a case where the coordinate conversion unit 12B regards the quadrangle GMCR as the new quadrangle ABCD, it regards the point G as the new point A, the point M as the new point B, the point C as the new point C as before, and the point R as the new point D.

And in a case where the coordinate conversion unit 12B regards the quadrangle NGRD as the new quadrangle ABCD, it regards the point N as the new point A, the point G as the new point B, the point R as the new point C, and the point D as the new point D as before.

When the flow advances from step SA5 or SA15 to step SA17, the coordinate conversion unit 12B returns the coordinates represented by the present values of the variable $x_{disp}$ and variable $y_{disp}$ to a non-standardized state. That is, the coordinate conversion unit 12B changes the variable $x_{disp}$ to $\{X \cdot (x_c - x_a) + x_a\}$ where X is the present value of the variable $x_{disp}$, and changes the variable $y_{disp}$ to $\{Y \cdot (y_c - y_a) + y_a\}$ where Y is the present value of the variable $y_{disp}$.

Then, the coordinate conversion unit 12B determines the coordinates represented by the variable $x_{disp}$ and variable $y_{disp}$ which are returned to the non-standardized state as the coordinates of the point P' and stores those variables $x_{disp}$ and $y_{disp}$ returned to the non-standardized state in association with $R_{max}$ obtained at the time the spotlight extraction process is terminated in the RAM 13. After this, the coordinate conversion unit 12B terminates the coordinate conversion process, and advances the flow to step S3.

Figure 16A:
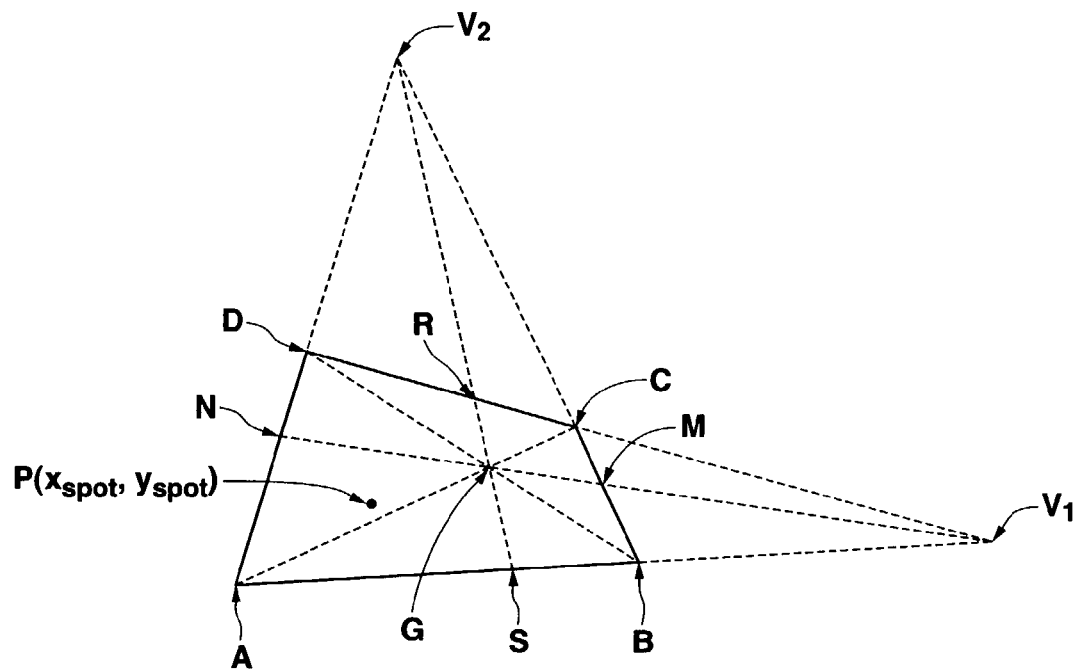
FIG. 16A is a diagram showing a display area before conversion.
Figure 16B:
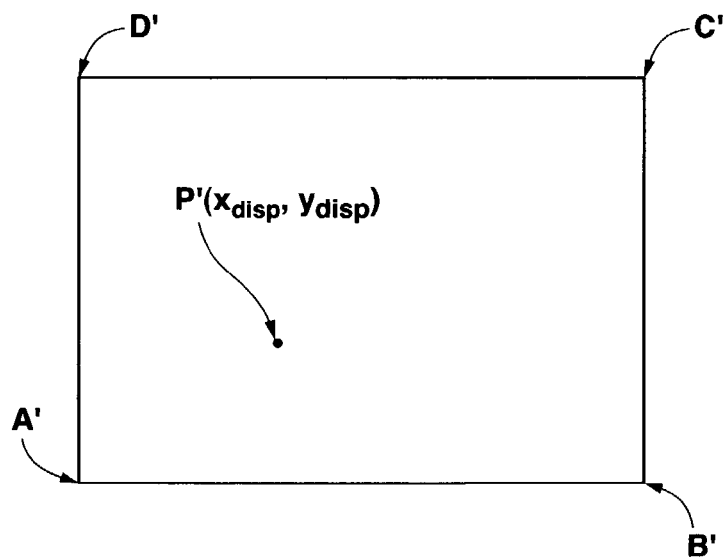
FIG. 16B is a diagram showing a display area after conversion.

As the result of performing the above described steps SA1 to SA17, the point P' within the rectangle A'B'C'D' that corresponds to the point P within the quadrangle ABCD shown in FIG. 16A is determined as shown in FIG. 16B, for example.

This drawing system may not limit the information for setting the area whose coordinates are to be converted, to the information representing the four corners of this area, but may obtain arbitrary information. Thus, for example, in a case where this area is divided into a plurality of unit cells of a lattice, information representing the vertexes of each unit cell may be obtained. And the central control unit 11 may control the display unit 3 to display a lattice pattern (or a checkered pattern, etc.) for making it easier to set the area whose coordinates are to be converted, in step A11.

Let it be assumed that this drawing system controls the display unit 3 to display a lattice pattern on the display screen to facilitate the setting of the area whose coordinates are to be converted, and obtains in step A11 information representing vertexes of each unit cell in case of dividing the area whose coordinates are to be converted into unit cells.

In this case, the coordinate conversion unit 12B of the image analysis unit 12 specifies a unit cell in which a spot exists, based on the information representing the vertexes of each unit cell, and the coordinates $(x_{spot}, y_{spot})$ of the spot which are obtained in the spotlight extraction process. Then, the coordinate conversion unit 12B performs the coordinate conversion process (for example, the processes of steps S221 to S222, or the processes of steps SA1 to SA17), by regarding an area which corresponds to the specified unit cell within the image represented by the image data generated in step S1 by the image input unit 2, as the above described quadrangle ABCD.

Then, before advancing the flow to step S3, the coordinate conversion unit 12B specifies coordinates of the display position of this spot within the set area whose coordinates are to be converted, based on the coordinates $(x_{disp}, y_{disp})$ obtained in the coordinate conversion process and the position of the specified unit cell within the set area. By doing so, the coordinate conversion unit 12B specifies the coordinates of the display position of the spot within the set area whose coordinates are to be converted, without a need to apply the coordinate conversion process fully to this set area. Therefore, it is possible to speed up the process for specifying the coordinates of the display position of the spot.

Specifically, for example, let it be assumed that the area whose coordinates are to be converted is a taken image generated by the image input unit 2, of a rectangle made of a plurality of rectangular unit cells arranged in a matrix pattern having J number of rows and K number of columns, the image being taken when the rectangle is displayed on the display screen of the display unit 3. In this case, the coordinate conversion unit 12B may specify a unit cell within the area whose coordinates are to be converted that includes the coordinates ($x_{spot}$, $y_{spot}$), by checking the row number and the column number. Then, the coordinate conversion unit 12B may perform the coordinate conversion process by regarding the specified unit cell as the above quadrangle ABCD, and may specify the coordinates ($x_{disp1}$, $y_{disp1}$) of the display position of the spot within the area whose coordinates are to be converted, by generating data representing the values $x_{disp1}$ and $y_{disp1}$ of the left side of an equation 6 and equation 7 using the coordinates ($x_{disp}$, $y_{disp}$) obtained in the coordinate conversion process.

$$x_{disp1} = x_{disp} + w \cdot \{(k-1)/K\} \quad \text{[Equation 6]}$$

(where w is the width of the rectangle A'B'C'D')

$$y_{disp1} = y_{disp} + h \cdot \{(j-1)/J\} \quad \text{[Equation 7]}$$

(where h is the height of the rectangle A'B'C'D')

Next, in step S3, the central control unit 11 may instruct the display unit 3 to display a spot having brightness corresponding to $R_{max}$ at the position represented by the coordinates specified as the coordinates of the display position of the spot within the area whose coordinates are to be converted, instead of the position represented by the coordinates ($x_{disp}$, $y_{disp}$).

Second Embodiment

In the aforementioned step A11, this drawing system may automatically set the area, without the user's operation to point four points on the display screen of the display unit 3. The second embodiment of the present invention where area-setting is performed automatically will now be explained below.

The physical structure of this drawing system is substantially the same as the structure shown in FIG. 2.

Figure 17:
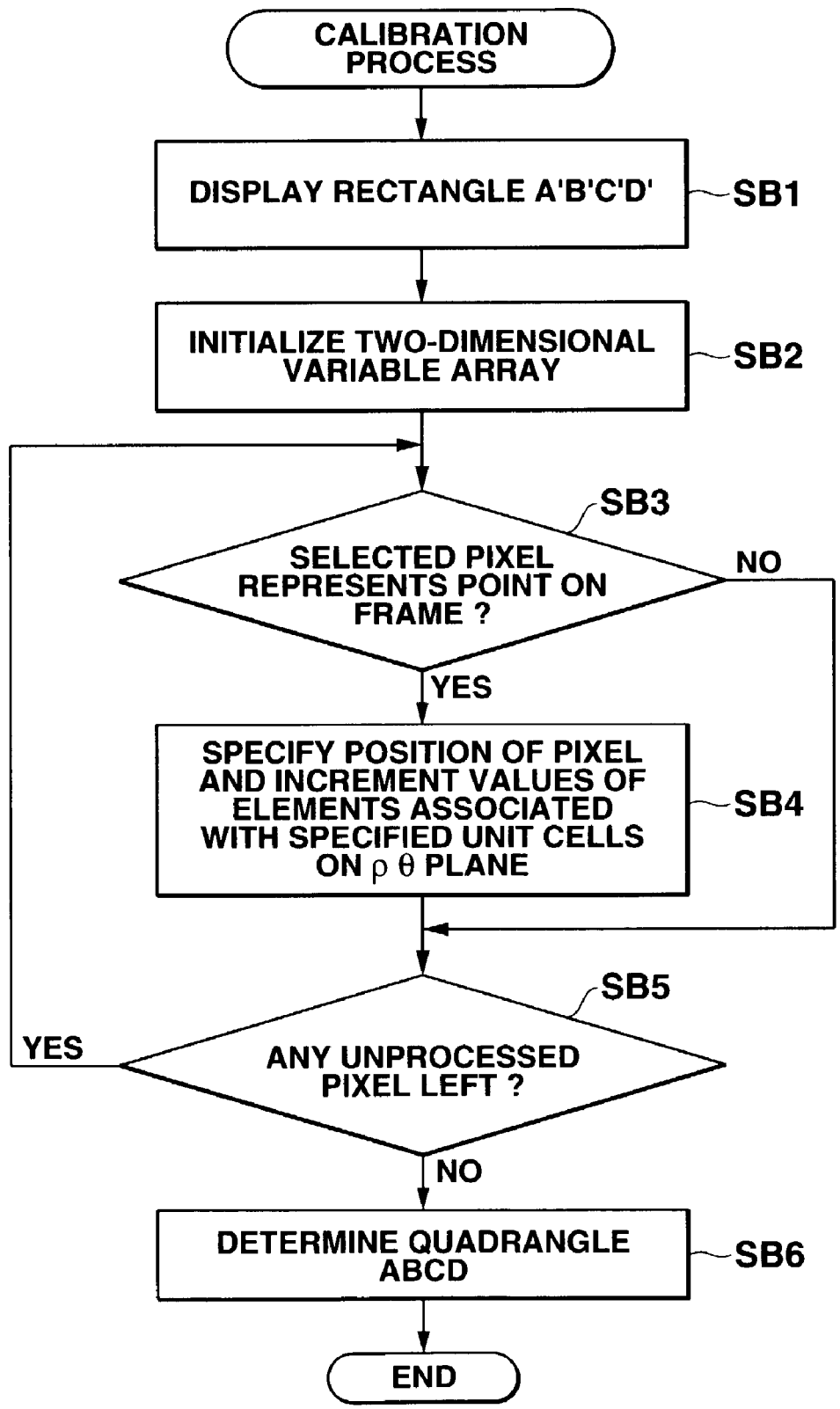
FIG. 17 is a flowchart showing a calibration process according to a second embodiment.

Functionally, the data processing device 1 of this drawing system obtains the positions of the points A, B, C, and D which are the vertexes of the quadrangle ABCD by performing a process shown in FIG. 17 as the process of step A11.

First, the central control unit 11 instructs the display unit 3 to display a rectangular frame representing the aforementioned rectangle A'B'C'D' on the display screen (FIG. 17, step SB1). Then, the central control unit 11 declares usage of a two-dimensional variable array, and initializes this two-dimensional variable array by substituting an initial value 0 for each element composing this two-dimensional variable array (step SB2).

Each element composing the two-dimensional variable array initialized in step SB2 is associated in one-to-one correspondence with a unit cell contained in a lattice which exists on a plane of ρ-θ orthogonal coordinates for representing values of a variable ρ and variable θ which are to be described later. This lattice is obtained by dividing a rectangle whose four sides are parallel to a ρ axis or a θ axis into a matrix pattern.

The image input unit 2 takes an image of a rectangular frame displayed in step SB1, generates image data and supplies the image data to the central control unit 11. The central control unit 11 stores this image data in the RAM 13.

Then, the central control unit 11 determines whether or not a given pixel (a pixel that has not yet been the target of the process of step SB3) which is included in an image represented by the image data stored in the RAM 13 represents a point on the frame displayed on the display screen of the display unit 3 (step SB3). In a case where determining that the pixel represents a point on the frame, the central control unit 11 advances the flow to step SB4. In a case where determining that the pixel does not represent a point on the frame, the central control unit 11 advances the flow to step SB5.

In a case where the color of the frame displayed in step SB1 is red, the determination in step SB3 may be performed by determining whether or not the red component (R) of the pixel value of a given pixel is equal to or greater than a predetermined value, and the green component (G) and the blue component (B) are both equal to or smaller than a predetermined value.

In step SB4, the central control unit 11 specifies a position (u, v) on a plane of x-y orthogonal coordinates, where the pixel which is most lately determined in step SB3 as representing a point on the frame exists. Then, the central control unit 11 specifies unit cells through which a curve, that is drawn on the plane of ρ-θ orthogonal coordinates and represents pairs of values of ρ and θ that satisfy the relationship represented by an equation 8, passes. The central control unit 11 increments (increases by 1) the values of elements included in the two-dimensional variable array usage of which is declared in step SB2, that are associated with the specified unit cells. Then, the central control unit 11 advances the flow to step SB5.

The variable θ that satisfies the equation 8 represents an angle formed by x axis and a perpendicular line drawn from the origin of the plane of x-y orthogonal coordinates toward a line [$\{x \cdot (\sin \theta)\} + \{y \cdot (\cos \theta)\} = \rho$] on the plane of x-y orthogonal coordinates. The variable ρ represents a distance between this line and the origin.

$$\{u \cdot (\sin \theta)\} + \{v \cdot (\cos \theta)\} = \rho \quad \text{[Equation 8]}$$

In step SB5, the central control unit 11 determines whether there is any pixel left that has not yet been the target of the process of step SB3, among the pixels included in the image represented by the image data stored in the RAM 13. In a case where determining that there is any pixel left, the central control unit 11 returns the flow to step SB3. In a case where determining that there is no pixel left, the central control unit 11 advances the flow to step SB6.

In step SB6, the central control unit 11 specifies four elements among the elements included in the two-dimensional variable array, that have the largest values. Then, the central control unit 11 specifies four pairs of values of ρ and θ that represent the positions of the unit cells associated with the specified four elements.

As a result, four lines on the plane of x-y orthogonal coordinates are specified, by substituting the respective specified pairs in the equation 8. Then, the central control unit 11 determines a quadrangle formed by cutting the plane of x-y orthogonal coordinates along the specified four lines, as the aforementioned quadrangle ABCD.

The position of a unit cell on the plane of ρ-θ orthogonal coordinates may be represented by the position of an arbitrary point within this unit cell. For example, the position of a unit cell may be represented by the position of a point at which diagonals of a quadrangle which forms this unit cell intersect with each other.

The color of the frame displayed on the display screen of the display unit 3 may not be red, but may be green, blue, or an arbitrary color obtained by mixing the red color, the green color, and the blue color. In step SB3, whether or not a pixel represents a point on the frame may be determined by determining whether or not the pixel represents a color equal to the color of the displayed frame.

The figure displayed on the display screen of the display unit 3 by the drawing system in step A11 may not be a frame-shaped figure, but may be dot figures representing four corners of the area whose coordinates are to be converted.

In a case where the figure displayed on the display screen of the display unit 3 by the drawing system in step A11 is made of dot figures representing four corners of the area whose coordinates are to be converted, the central control unit 11 specifies six pairs of values of ρ and θ, that represent the positions of six unit cells associated with six elements having the largest values among the elements included in the two-dimensional variable array. Then, the central control unit 11 specifies six lines by substituting the respective six specified pairs in the equation 8, and specifies four points at which three of the six specified lines substantially intersect together. Those specified four points are respectively the points A, B, C, and D, which are the vertexes of the aforementioned quadrangle ABCD.

Modified Version of Second Embodiment

Figure 18:
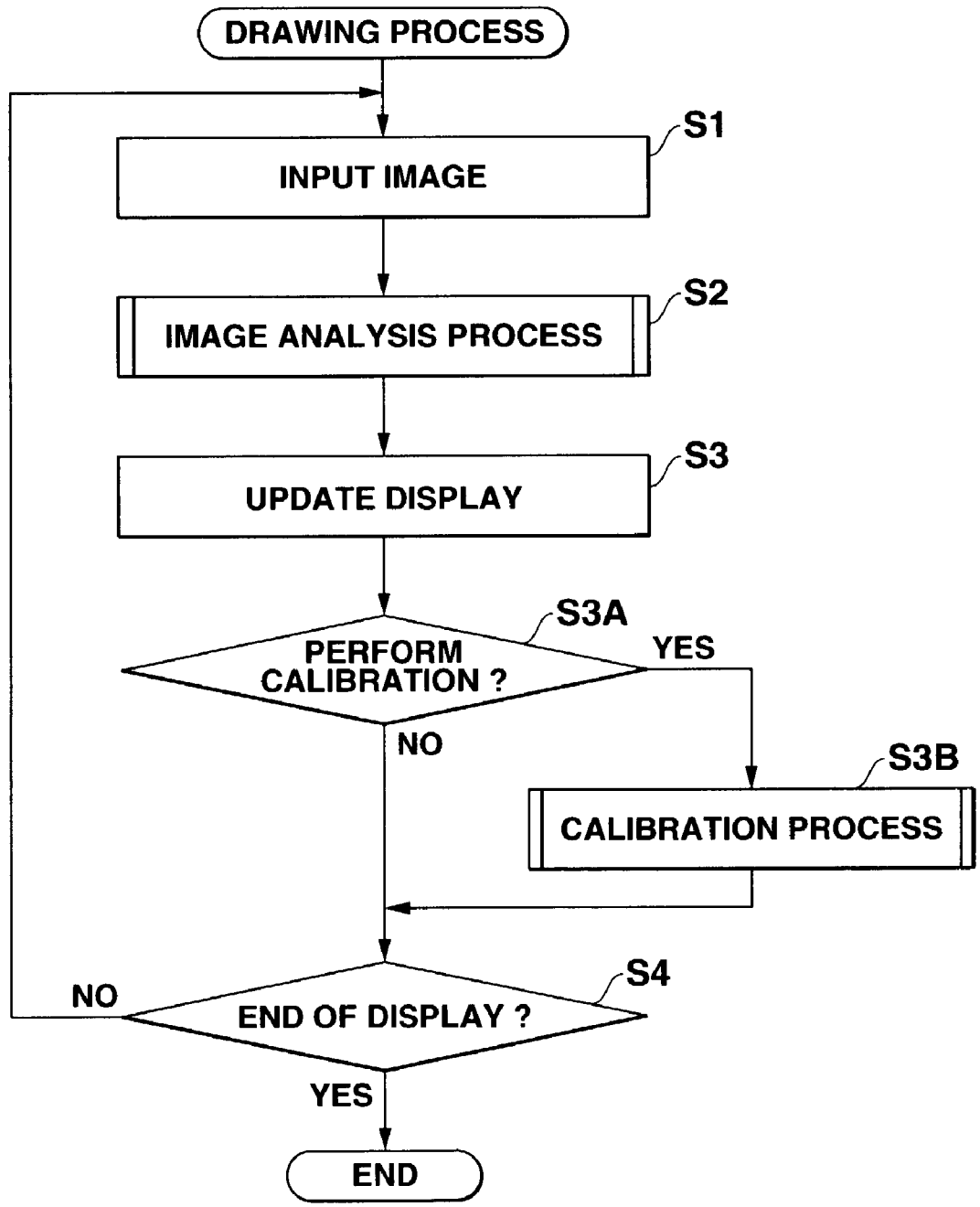
FIG. 18 is a flowchart showing a drawing process according to the second embodiment

In a case where the processes of the above steps SB1 to SB6 are performed as the process of step A11, this drawing system may perform the calibration process (the process of step A1) at a timing shown in FIG. 18, instead of performing this process before step S1 of the drawing process.

In the case where the drawing system performs the process shown in FIG. 18, the image represented by the image data generated by the image input unit 2 is composed of pixels arranged in a matrix pattern having $H_d$ number of rows and $W_d$ number of columns (that is, there are $(H_d \cdot W_d)$ number of pixels). The central control unit 11 stores image data generated by the image input unit 2 for at least two images taken most lately by the image input unit 2, in the RAM 13.

In a case where the drawing system performs the process shown in FIG. 18, after a spot is newly displayed by the display unit 3 in step S3, the central control unit 11 determines whether or not to perform calibration based on the image data for two most lately stored images among the image data input and stored in the RAM 13 in step S1 (FIG. 18, step S3A).

Specifically, in step S3A, the central control unit 11 obtains a value which is obtained by raising a difference between the brightness of a pixel located in an i-th row and in a j-th column within the most lately stored image data (i is a natural number equal to or smaller than $H_d$, and j is a natural number equal to or smaller than $W_d$) and the brightness of a pixel located in an i-th row and in a j-th column within the second most lately stored image data to the second power (or obtains the absolute value of the difference). The central control unit 11 obtains this value for all the values that can be taken by i and j, and obtains the sum of thus obtained $(H_d \cdot W_d)$ number of values. Then, the central control unit 11 determines whether or not the obtained sum exceeds a predetermined threshold for detecting change of environment. In a case where determining that the sum exceeds the threshold, the central control unit 11 determines to perform calibration. In a case where determining that the sum does not exceed the threshold, the central control unit 11 determines not to perform calibration.

In a case where the brightness of pixels composing the image data is evaluated by 256 stages of integers from 0 to 255 inclusive, if the central control unit 11 obtains a value obtained by raising the difference in brightness between pixels in an i-th row and in a j-th column within the two most lately stored image data to the second power, the threshold for detecting change of environment may be $\{(128)^2 \cdot H_d \cdot W_d\}$, for example. If the central control unit 11 obtains the absolute value of the difference in brightness between pixels in an i-th row and in a j-th column within the two most lately stored image data, the threshold for detecting change of environment may be $(128 \cdot H_d \cdot W_d)$, for example.

Then, the central control unit 11 advances the flow to step S4 in a case where determining not to perform calibration, and performs calibration by performing substantially the same process as step A1 in a case where determining to perform calibration (step S3B). When calibration is completed, the central control unit advances the flow to step S4.

Third Embodiment

The spot displayed by the display unit 3 may have a predetermined brightness corresponding to the stage of brightness of the spotlight emitted from the light emitting unit 4. The drawing system according to the third embodiment of the present invention where the spot displayed by the display unit 3 has a predetermined brightness corresponding to the stage of brightness of the spotlight taken by the image input unit 2, will be explained below.

The physical structure of this drawing system is substantially the same as the structure shown in FIG. 2. However, the brightness of the spotlight emitted from the light emitting unit 4 is adjusted to any of N stages (N is an arbitrary integer equal to or greater than 2) in accordance with an operation of a user. (In the following explanation, a state where the spotlight is not emitted is regarded as having brightness of 0th stage when evaluated from the darkest stage. Further, to facilitate understanding, it is assumed that the color of the spotlight is red.)

This drawing system stores data representing level thresholds which are values for specifying correspondence between the brightness of the spot displayed by the display unit 3 and a range of brightness of the spotlight emitted from the light emitting unit 4, previously or in accordance with an operation of the operator. The drawing system determines the brightness of the spot to be displayed by the display unit 3, based on the data representing the level thresholds and the brightness of the spotlight whose image is taken by the image input unit 2.

Figure 19:
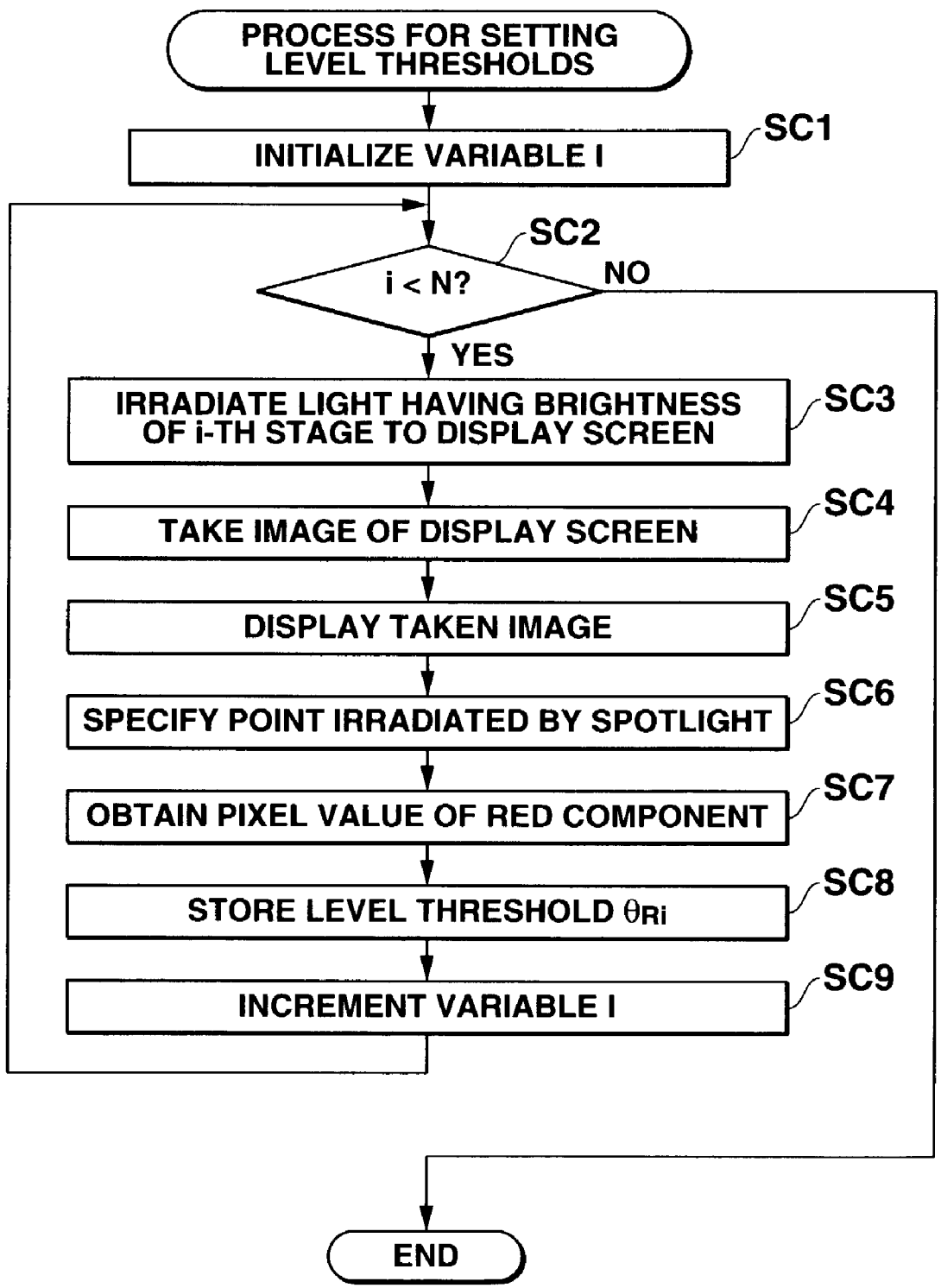
FIG. 19 is a flowchart showing a process for setting level thresholds according to a third embodiment.

Specifically, in order to store the level thresholds in accordance with an operation of the operator, the drawing system determines the level thresholds by following the procedures shown in FIG. 19 before performing the process of step S1. The brightness of the spot displayed by the display unit 3 varies within a range of N stages from $L_0$ to $L_{N-1}$. The brightness at a k-th stage from the darkest side (k is an integer equal to or greater than 0 and equal to or smaller than (N−1)) is represented by a symbol $L_k$, and is associated with a k-th level threshold $\theta_{Rk}$. The external storage unit 14 pre-stores N number of data representing brightness $L_0$ to $L_{N-1}$.

The procedures shown in FIG. 19 will now be specifically explained. The central control unit 11 of this drawing system declares usage of a variable I at a timing such as after the quadrangle ABCD is set, and initializes the variable I by substituting a value 0 for the variable I (FIG. 19, step SC1).

Then, the central control unit 11 determines whether or not the present value i of the variable I is smaller than the value N (step SC2). When determining that the present value i is equal to or greater than the value N, the central control unit 11 terminates the process for setting the level thresholds, and advances the flow to step S1, for example. On the contrary, in a case where determining that the present value i is smaller than the value N, the central control unit 11 waits for the image input unit 2 to perform the process of step SC4, in order to perform the process of step SC5 described later.

The operator operates the light emitting unit 4 to emit spotlight having brightness of i-th stage from the darkest side, and irradiates the spotlight to the display screen of the display unit 3 (step SC3). (In a case where i=0, the operator may put out the light emitting unit 4.)

The image input unit 2 takes an image of the display screen of the display unit 3, and supplies image data representing the taken image to the central control unit 11 (step SC4). The central control unit 11 controls the display unit 3 to display the image represented by the image data (step SC5).

When the display unit 3 displays the image in step SC5, the operator specifies a point on the display screen of the display unit 3 that corresponds to the point irradiated by the spotlight, by operating the mouse of the user operation input unit 15 (step SC6). (In a case where i=0, the operator may specify a point on the display screen of the display unit 3 that is not irradiated by the spotlight).

Then, the central control unit 11 reads pixel data representing the point specified by the operator among pixel data included in the image data supplied by the image input unit 2, and obtains a pixel value of the red component represented by this pixel data (step SC7).

Then, the central control unit 11 generates data representing the value of an i-th level threshold $\theta_{Ri}$ based on the obtained pixel value, and stores this data in the external storage unit 14 (step SC8). Specifically, the central control unit 11 obtains the i-th level threshold $\theta_{Ri}$ by calculating the right side of an equation 9, generates data representing $\theta_{Ri}$, and stores this data in association with brightness $L_i$ in the external storage unit 14.

$$\theta_{Ri}=(R_{i-1}+R_i)/2 \quad \text{[Equation 9]}$$

(where $R_i$ is the pixel value of the red component obtained in step SC7 in a case where the present value of the variable I is i. And it is assumed that $R_{-1}=0$.)

Then, the central control unit 11 increments the variable I (step SC9), and returns the flow to step SC2.

Figure 20:
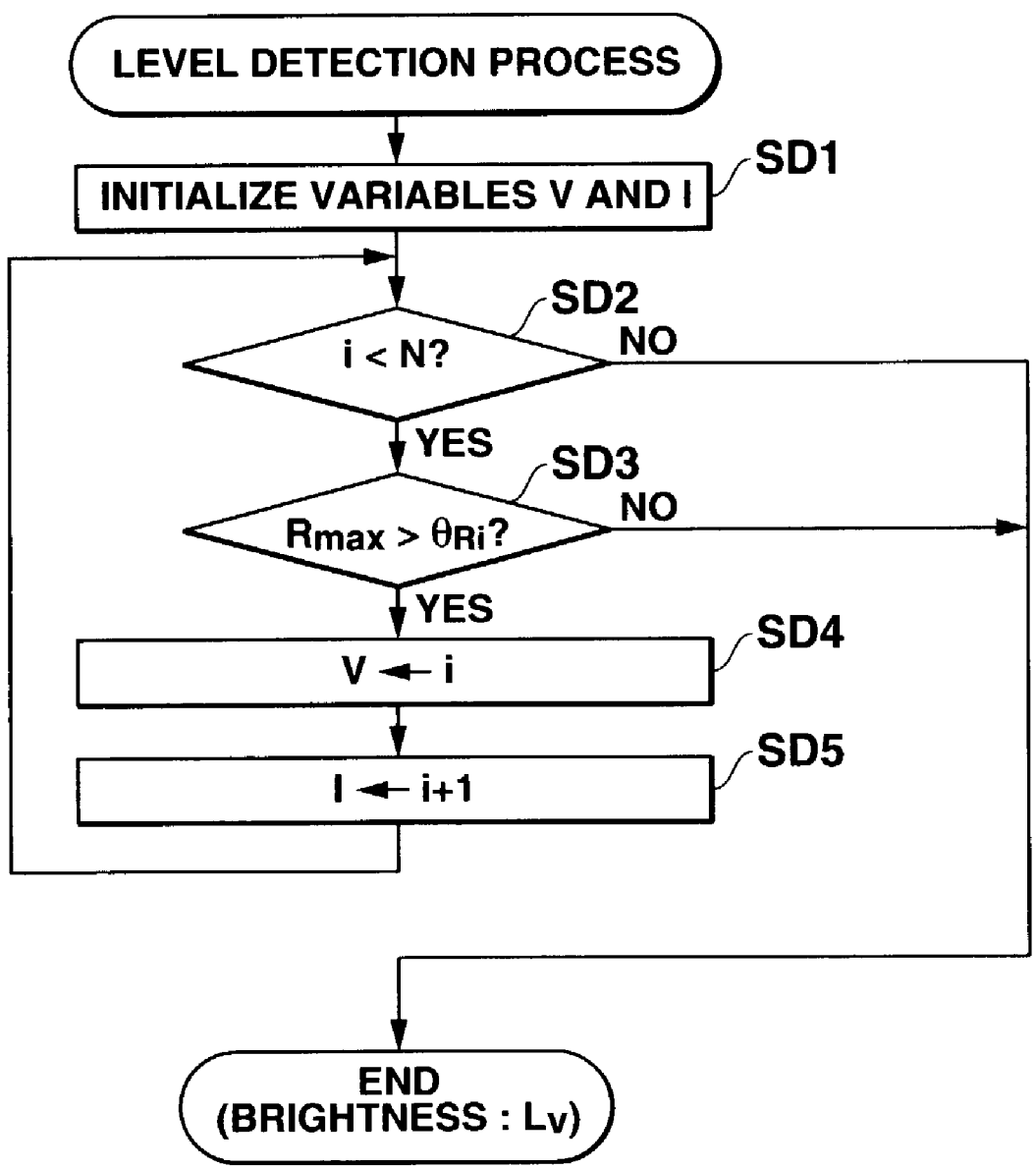
FIG. 20 is a flowchart showing a level detection process according to the third embodiment.

In the case where the drawing system stores the level thresholds, the spotlight extraction unit 12A of the image analysis unit 12 of this drawing system performs a level detection process shown in FIG. 20, after completing the spotlight extraction process.

When completing the spotlight extraction process, the spotlight extraction unit 12A declares usage of a variable V and a variable I, and initializes the variables V and I by substituting a value 0 for the variables V and I, respectively (FIG. 20, step SD1).

Then, the spotlight extraction unit 12A determines whether or not the present value i of the variable I is smaller than the aforementioned value N (step SD2). When determining that the present value i is equal to or greater than the value N, the spotlight extraction unit 12A terminates the level detection process, and determines the brightness of the spot to be displayed by the display unit 3 as brightness $L_v$, which is the v-th stage from the darkest side (where v is the present value of the variable V).

On the contrary, if determining that the present value i is smaller than the value N, the spotlight extraction unit 12A determines whether or not the aforementioned value $R_{max}$ obtained as a result of performing the spotlight extraction process is greater than the value $\theta_{Ri}$ (step SD3). When determining that the value $R_{max}$ is equal to or smaller than the value $\theta_{Ri}$, the spotlight extraction unit 12A terminates the level detection process, and determines the brightness of the spot to be displayed by the display unit 3 as brightness $L_v$, which is the v-th stage from the darkest side.

On the contrary, if determining that the value $R_{max}$ is greater than the value $\theta_{Ri}$, the spotlight extraction unit 12A substitutes the variable I (i.e., the value i) for the variable V (step SD4), increments the value I (step SD5), and returns the flow to step SD2.

In step S3, the central control unit 11 controls the display unit 3 to display a spot having brightness corresponding to the value $L_v$ determined in the level detection process, instead of controlling the display unit 3 to display a spot having brightness corresponding to the value $R_{max}$.

This drawing system may further perform a predetermined process which is associated with the brightness of the spot determined in the level detection process. In other words, the user can supply N types of information to the data processing device 1 by changing the brightness of the spot by operating the light emitting unit 4.

Figure 21:
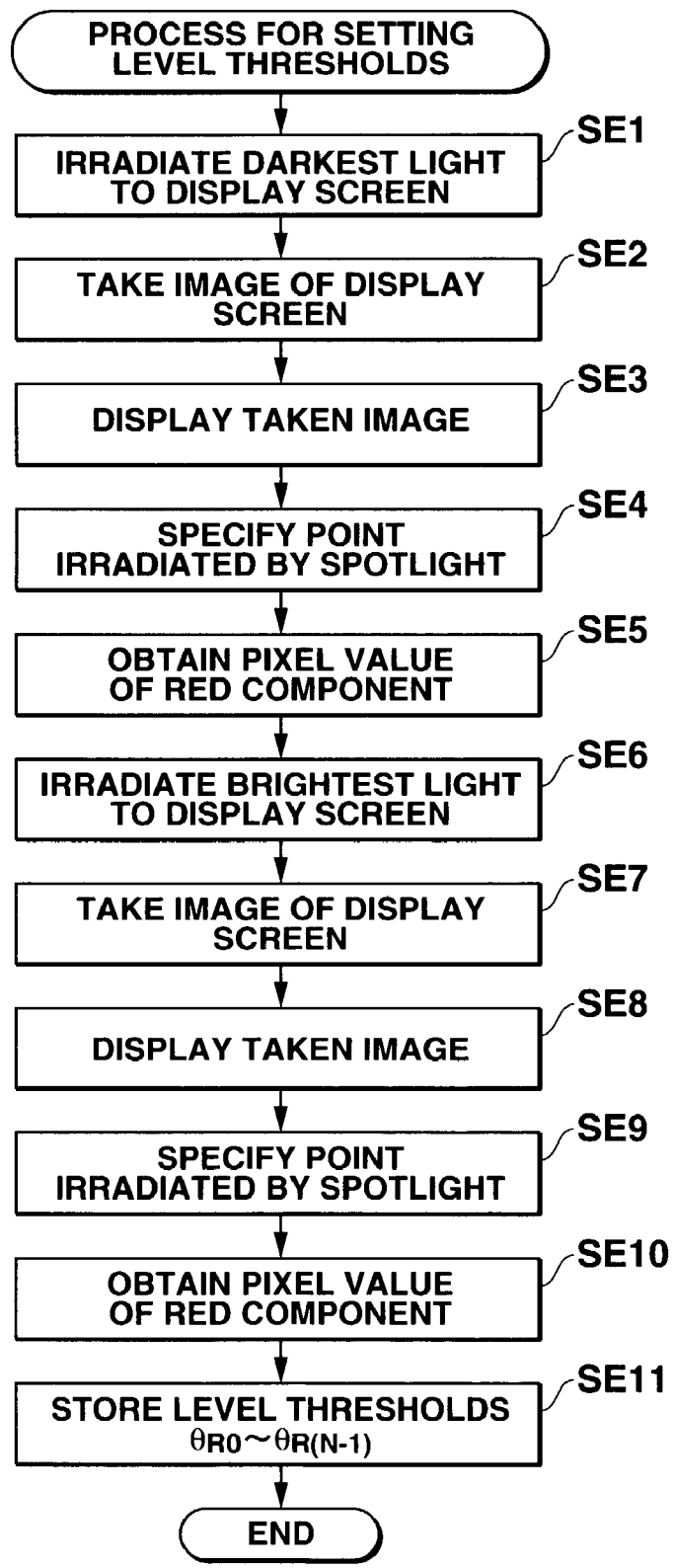
FIG. 21 is a flowchart showing a modified example of the process for setting level thresholds.
Figure 22A:
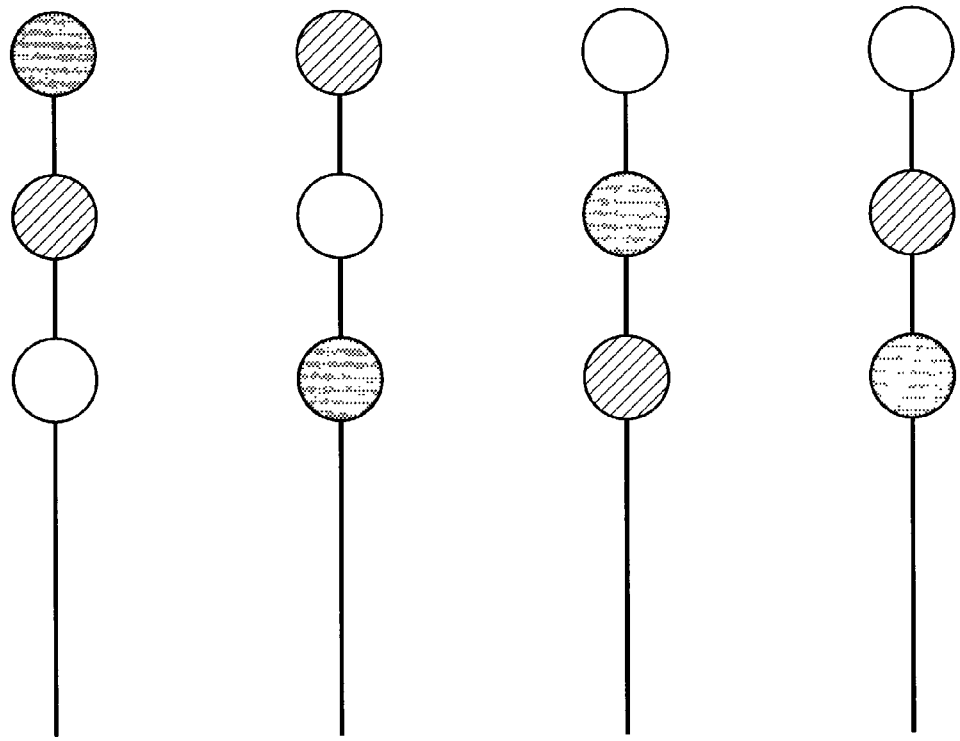
FIGS. 22A to 22D are diagrams each exemplarily showing a pattern of spotlights emitted from a light emitting unit.
Figure 22B:
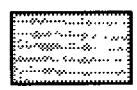
Figure 22C:
Figure 22D:
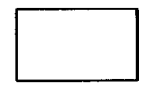

This drawing system may obtain and store the data representing the level thresholds by following the procedures shown in FIG. 21, instead of the procedures shown in FIG. 19.

First, after the quadrangle ABCD is set, the central control unit 11 waits for the image input unit 2 to perform the process of step SE3, in order to perform the process of step SE4 described later.

The operator operates the light emitting unit 4 to emit spotlight having brightness at the darkest stage among the N stages, and irradiates the spotlight to the display screen of the display unit 3 (FIG. 21, step SE1). Or, in step SE1, the operator may not irradiate the spotlight to the display screen of the display unit 3.

The image input unit 2 takes an image of the display screen of the display unit 3, and supplies image data representing the taken image to the central control unit 11 (step SE2). The central control unit 11 controls the display unit 3 to display the image represented by this image data (step SE3).

When the display unit 3 displays the image in step SE3, the operator specifies a point on the display screen of the display unit 3 that corresponds to the point irradiated by the spotlight by performing substantially the same process as the aforementioned step SC6 (step SE4).

Then, the central control unit 11 reads pixel data representing the point specified by the operator, among the pixel data included in the image data supplied by the image input unit 2, and obtains a pixel value of the red component represented by this pixel data (step SE5).

Next, the operator operates the light emitting unit 4 to emit spotlight having brightness at the brightest stage among the N stages, and irradiates the spotlight to the display screen of the display unit 3 (step SE6). The image input unit 2 supplies image data representing a taken image of the display screen of the display unit 3 to the central control unit 11 (step SE7). The central control unit 11 controls the display unit 3 to display this image (step SE8).

When the display unit 3 displays the image in step SE8, the operator specifies a point on the display screen of the display unit 3 that corresponds to the point irradiated by the spotlight, likewise the above step SE4 (step SE9). The central control unit 11 obtains a pixel value of the red component represented by pixel data indicative of the point specified by the operator, among the pixel data included in the image data supplied by the image input unit 2 in step SE7 (step SE10).

Then, the central control unit 11 generates N number of data representing values of N number of level thresholds $\theta_{R0}$ to $\theta_{R(N-1)}$, based on the two pixel values obtained in steps SE5 and SE10, and stores those data in the external storage unit 14 (step SE11).

Specifically, the central control unit 11 obtains the level threshold $\theta_{R0}$ by calculating the right side of an equation 10, and obtains the level thresholds $\theta_{R1}$ to $\theta_{R(N-1)}$ by calculating the right side of an equation 11 by substituting integers 1 to (N−1) for the value i. Then, the central control unit 11 generates N number of data representing the values $\theta_{R0}$ to $\theta_{R(N-1)}$, and stores the generated data in the external storage unit 14.

$$\theta_{R0} = R_{MIN}/2 \qquad \text{[Equation 10]}$$

(where $R_{MIN}$ is the pixel value obtained in step SE5.)

$$\theta_{Ri} = R_{MIN} + i \cdot (R_{MAX} - R_{MIN})/(N-1) - (R_{MAX} - R_{MIN})/\{2 \cdot (N-1)\} \qquad \text{[Equation 11]}$$

(where $R_{MAX}$ is the pixel value obtained in step SE10.)

Modified Version of Third Embodiment

The light emitting unit 4 may comprise a structure for emitting a plurality of spotlights having single colors different from each other (specifically, the light emitting unit 4 may comprise a plurality of light emitting diodes for emitting spotlights having single colors different from each other).

In this case, the drawing system may extract a pattern of spotlights which has an arrangement unique to the light emitting unit 4, and which is formed on the display screen of the display unit 3 when the spotlights emitted from the light emitting unit 4 irradiate the display screen. The pattern of spotlights may be a pattern such as shown in FIGS. 22A to 22D, where three spots, respectively, red, green, and blue are arranged in line at almost regular intervals. The risk of incorrectly detecting a point which is not actually a spot as a spot is lower in a case where a pattern of spotlights is extracted, than in a case where only one spot is extracted.

In a case where the drawing system comprises a plurality of light emitting units 4, in order to make a pattern of spotlights of each light emitting unit 4 unique to each light emitting unit 4, it is preferred that spotlights be arranged such that a pattern of spotlights of one light emitting unit 4 and a pattern of spotlights of another light emitting unit 4 do not coincide with each other when rotating the pattern of spotlights of one light emitting unit 4. Therefore, it is preferred that the pattern shown in FIG. 22A and the pattern shown in FIG. 22D should not be used at a same time.

The spotlights emitted from the light emitting unit 4 may form a pattern made of a first spotlight, and a second spotlight and third spotlight which are arranged symmetrically with respect to the first spotlight. In this case, this drawing system may extract the pattern of spotlights by performing a process shown in FIG. 23 as the spotlight extraction process (the process of step S21). To facilitate understanding, it is assumed that the first spotlight is red, the second spotlight is green, and the third spotlight is blue (that is, those spotlights form a pattern shown in FIG. 22C, for example).

Figure 23:
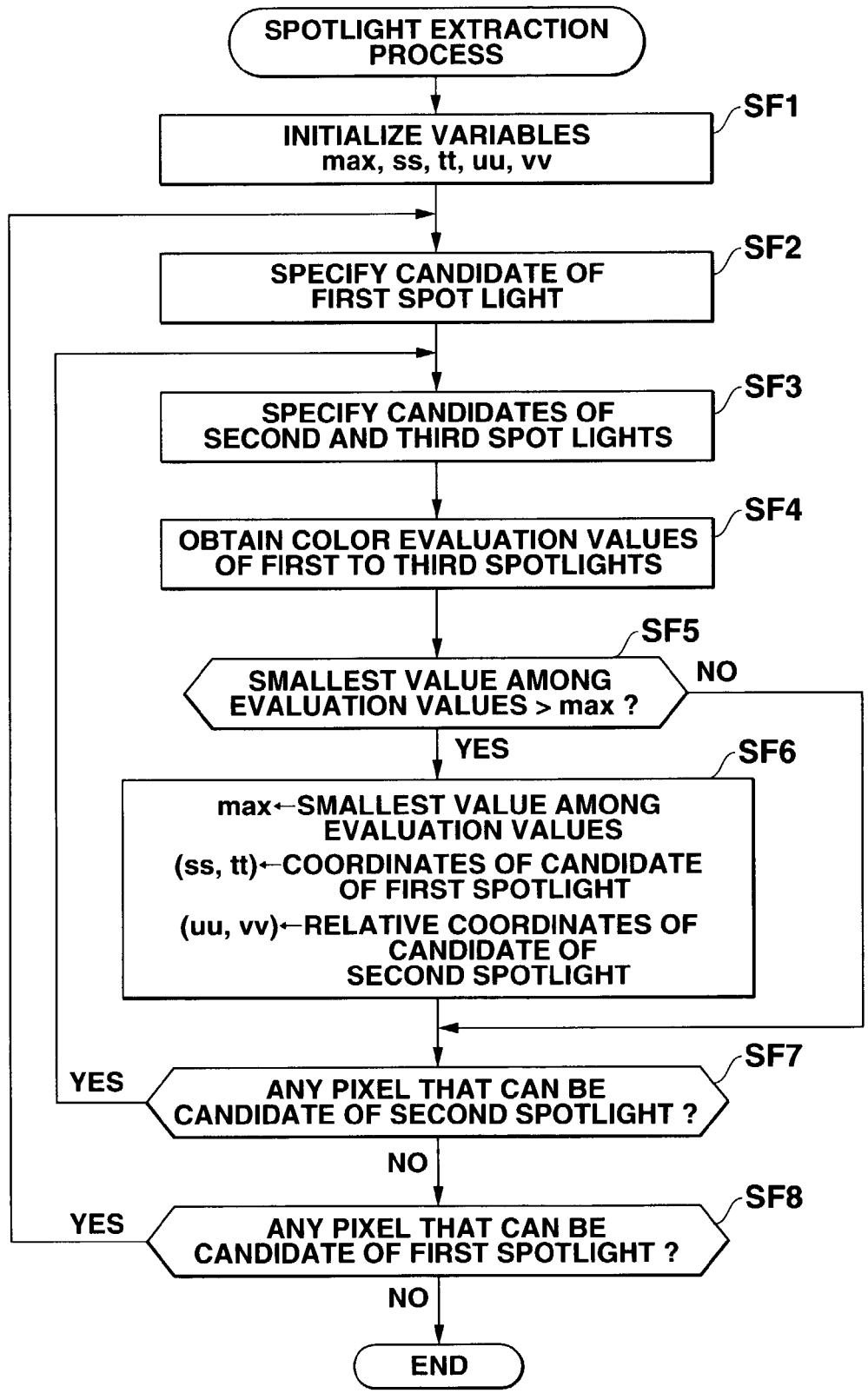
FIG. 23 is a flowchart showing a spotlight extraction process for detecting a pattern of spotlights.

When the spotlight extraction process is started, the spotlight extraction unit 12A declares usage of a variable max, a variable ss, a variable tt, a variable uu, and a variable vv, and initializes those five variables by substituting a value 0 for the five variables, respectively (FIG. 23, step SF1).

Then, the spotlight extraction unit 12A specifies one pixel data among pixel data included in the image data stored in the RAM 13, as pixel data representing a candidate of the first spotlight (step SF2). It should be noted that in step SF2, the spotlight extraction unit 12A does not specify pixel data which has once been specified as a candidate of the first spotlight in step SF2, as a candidate of the first spotlight again.

Next, the spotlight extraction unit 12A specifies pixel data representing a pixel which is in a predetermined positional relationship with the candidate of the first spotlight most lately specified in step SF2, as pixel data representing a candidate of the second spotlight. Further, the spotlight extraction unit 12A specifies pixel data representing a pixel which is substantially in a symmetric relationship with the candidate of the second spotlight with respect to the candidate of the first spotlight, as pixel data representing a candidate of the third spotlight (step SF3).

It should be noted that in step SF3, the spotlight extraction unit 12A does not specify a pixel which has once been specified as a candidate of the second (or third) spotlight in step SF3 in relation with a candidate of the first spotlight most lately specified in step SF2, as a candidate of the second (or third) spotlight again in relation with this most lately specified candidate of the first spotlight.

Then, the spotlight extraction unit 12A obtains evaluation values of specific color components of the candidates of the first, second, and third spotlights represented by the specified three pixel data (step SF4). Specifically, the spotlight extraction unit 12A obtains a red color evaluation value ER of the candidate of the first spotlight, a green color evaluation value EG of the candidate of the second spotlight, and a blue color evaluation value EB of the candidate of the third spotlight.

The red color evaluation value ER is a value obtained by calculating the right side of an equation 12, the green color evaluation value EG is a value obtained by calculating the right side of an equation 13, and the blue color evaluation value EB is a value obtained by calculating the right side of an equation 14.

$$ER = R - \{(G+B)/2\} \qquad \text{[Equation 12]}$$

(where R is the brightness of the red component, G is the brightness of the green component, and B is the brightness of the blue component.)

$$EG = G - \{(R+B)/2\} \qquad \text{[Equation 13]}$$

$$EB = B - \{(R+G)/2\} \qquad \text{[Equation 14]}$$

Next, the spotlight extraction unit 12A determines whether or not the smallest value among the obtained evaluation values of the candidates of the first to third spotlights is greater than the present value of the variable max (step SF5). When determining that the smallest value is equal to or smaller than the variable max, the spotlight extraction unit 12A advances the flow to step SF7.

On the contrary, when determining that the smallest value is greater than the variable max, the spotlight extraction unit 12A updates the present value of the variable max to the smallest value among the three evaluation values most lately obtained in step SF4 (step SF6).

Further in step SF6, the spotlight extraction unit 12A updates the present value of the variable ss to a value of an x axis direction component representing the position of the pixel most lately specified in step SF2 as the candidate of the first spotlight, and updates the present value of the variable tt to a value of a y axis direction component of this pixel.

The spotlight extraction unit 12A updates the present value of the variable uu to a difference between the value of the x axis direction component representing the position of the pixel most lately specified in step SF2 as the candidate of the first spotlight and a value of an x axis direction component representing the position of the pixel most lately specified in step SF3 as the candidate of the second spotlight.

Further, the spotlight extraction unit 12A updates the present value of the variable vv to a difference between the value of the y axis direction component representing the position of the pixel most lately specified in step SF2 as the candidate of the first spotlight and a value of a y axis direction component representing the position of the pixel most lately specified in step SF3 as the candidate of the second spotlight.

Next, the spotlight extraction unit 12A determines whether or not there is any pixel that has not yet been specified as a candidate of the second spotlight, among pixels which are in the aforementioned predetermined positional relationship with the candidate of the first spotlight most lately specified in step SF2 (step SF7). When determining that there is any such pixel, the spotlight extraction unit 12A returns the flow to step SF3. When determining that there is no such pixel, the spotlight extraction unit 12A advances the flow to step SF8.

In step SF8, the spotlight extraction unit 12A determines whether or not there is any pixel that has not yet been specified in step SF2 as a candidate of the first spotlight. When determining that there is any such pixel, the spotlight extraction unit 12A returns the flow to step SF2. When determining that there is no such pixel, the spotlight extraction unit 12A terminates the spotlight extraction process.

The variable ss at the time the process is completed represents the x axis direction component of the position of the first spotlight, and the variable tt represents the y axis direction component of the position of the first spotlight. The sum of the variable ss and variable uu at the time the process is completed represents the x axis direction component of the position of the second spotlight. The sum of the variable tt and variable vv at the time the process is completed represents the y axis direction component of the second spotlight. The variable max at the time the process is completed represents the brightness of the darkest spotlight among the first to third spotlights.

Further, in the case where the spotlights emitted from the light emitting unit 4 form a pattern made of the red first spotlight, and the green second spotlight and the blue third spotlight which are arranged symmetrically with respect to the first spotlight, this drawing system may perform a process shown in FIG. 24 to FIG. 27, as the spotlight extraction process.

Figure 24:
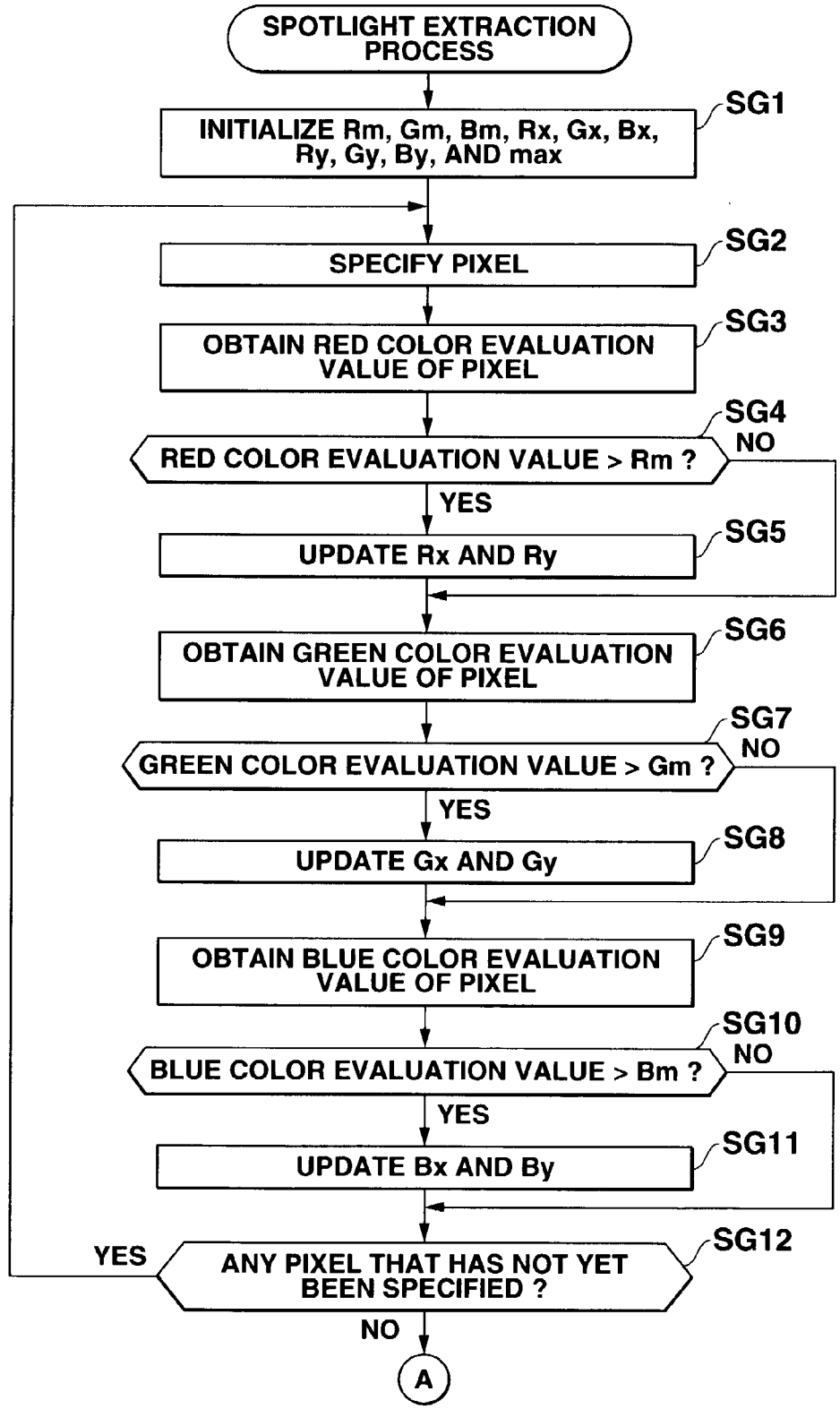
FIG. 24 is a flowchart showing a modified example of the spotlight extraction process for detecting a pattern of spotlights.
Figure 25:
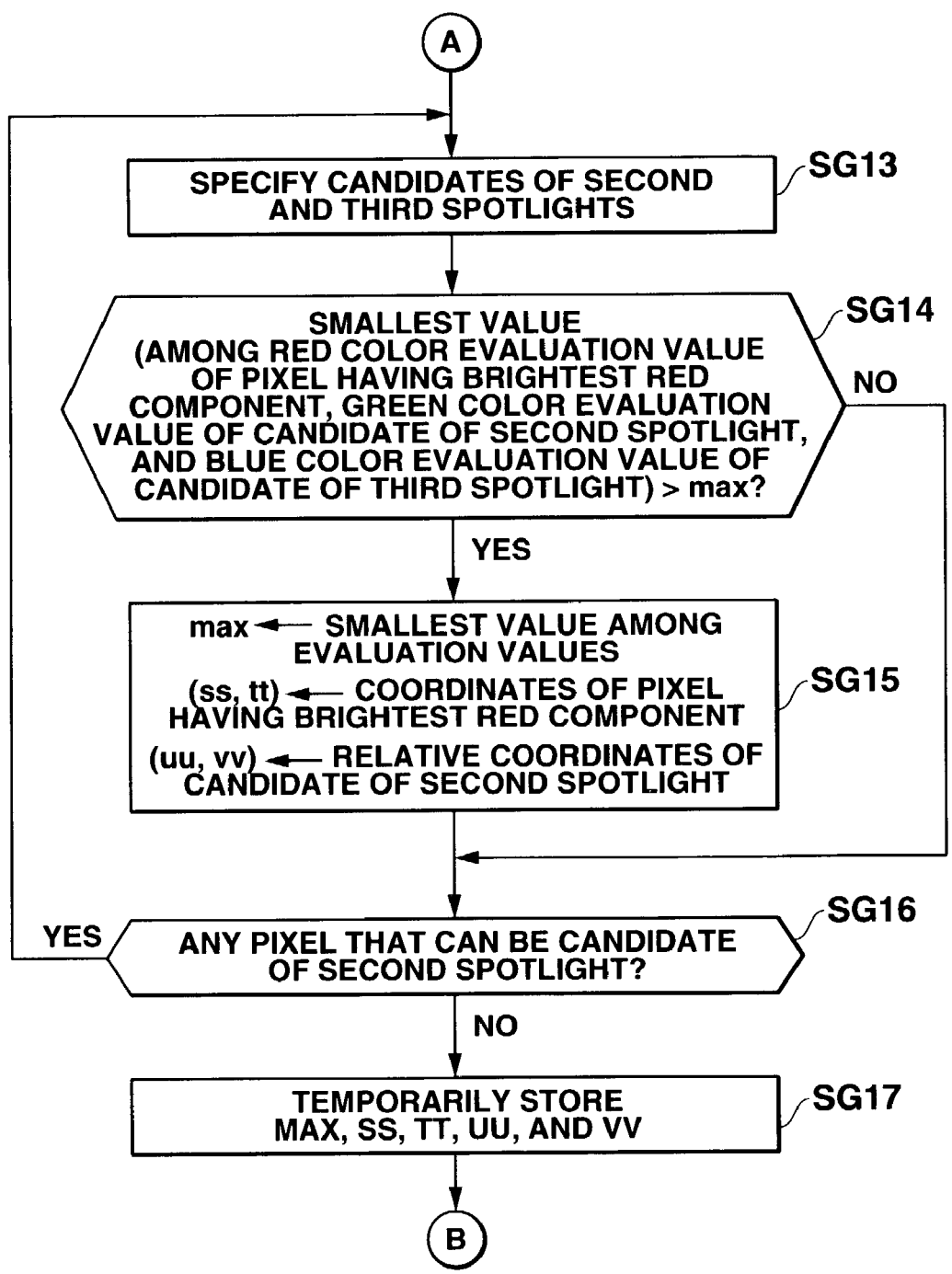
FIG. 25 is a continuation of the flowchart shown in FIG. 24.
Figure 26:
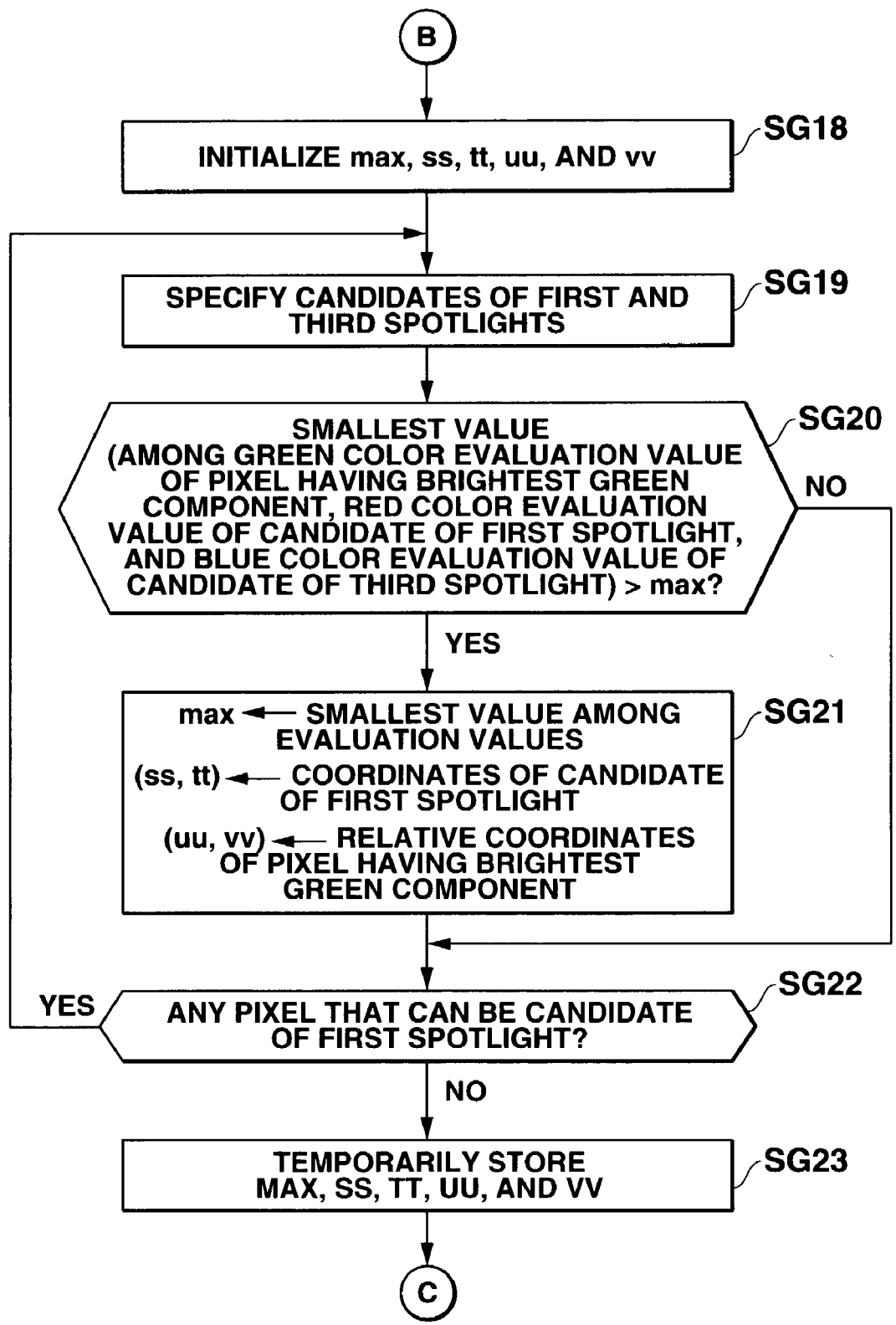
FIG. 26 is a continuation of the flowchart shown in FIG. 25.
Figure 27:
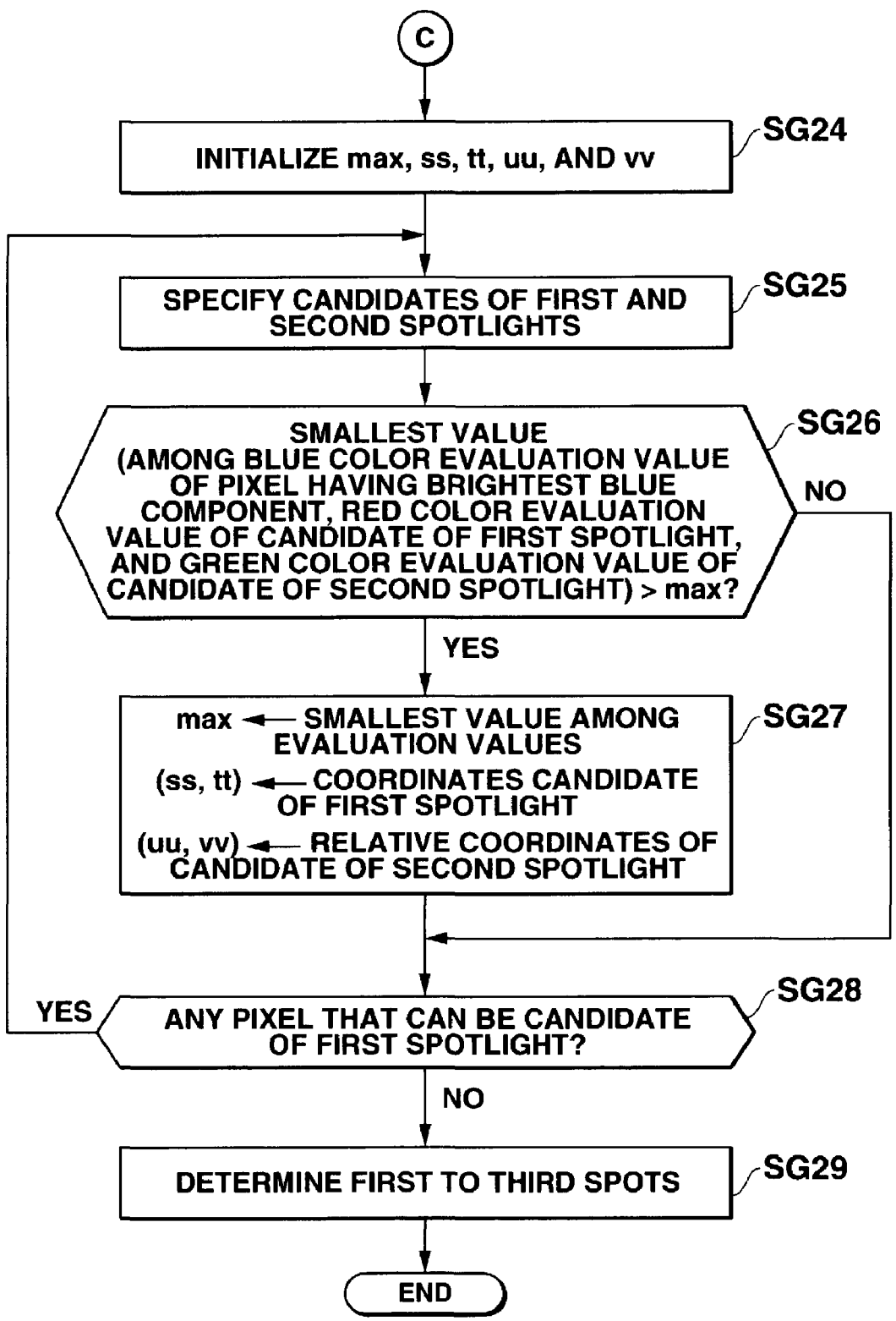
FIG. 27 is a continuation of the flowchart shown in FIG. 26.

When this spotlight extraction process is started, the spotlight extraction unit 12A declares usage of a variable Rm, a variable Gm, a variable Bm, a variable Rx, a variable Ry, a variable Gx, a variable Gy, a variable Bx, a variable By, and a variable max, and initializes those ten variables by substituting a value 0 to those variables, respectively (FIG. 24, step SG1).

Then, the spotlight extraction unit 12A specifies one pixel data, among pixel data included in the image data stored in the RAM 13 (step SG2). It should be noted that in step SG2, a pixel that has once been specified in step SG2 is not to be specified again.

Then, the spotlight extraction unit 12A obtains a red color evaluation value ER of the specified pixel (step SG3), and determines whether or not the obtained red color evaluation value ER is greater than the variable Rm (step SG4). When determining that the red color evaluation value ER is equal to or smaller than the variable Rm, the spotlight extraction unit 12A advances the flow to step SG6.

On the contrary, when determining that the red color evaluation value ER is greater than the variable Rm, the spotlight extraction unit 12A updates the variable Rm to the red color evaluation value newly obtained in step SG3, updates the variable Rx to a value of an x axis direction component representing the position of the pixel most lately specified in step SG2, and updates the variable Ry to a value of a y axis direction component of this pixel (step SG5).

Next, the spotlight extraction unit 12A obtains a green color evaluation value EG of the specified pixel (step SG6), and determines whether or not the green color evaluation value EG is greater than the variable Gm (step SG7). When determining that the green color evaluation value EG is equal to or smaller than the variable Gm, the spotlight extraction unit 12A advances the flow to step SG9. On the contrary, when determining that the green color evaluation value EG is greater than the variable Gm, the spotlight extraction unit 12A updates the variable Gm to the green color evaluation value EG newly obtained in step SG6, updates the variable Gx to the value of the x axis direction component representing the position of the pixel most lately specified in step SG2, and updates the variable Gy to the y axis direction component of this pixel (step SG8).

Then, the spotlight extraction unit 12A obtains a blue color evaluation value EB of the specified pixel (step SG9), and determines whether or not the blue color evaluation value EB is greater than the variable Bm (step SG10). When determining that the blue color evaluation value is equal to or smaller than the variable Bm, the spotlight extraction unit 12A advances the flow to step SG12. On the contrary, when determining that the blue color evaluation value EB is greater than the variable Bm, the spotlight extraction unit 12A updates the variable Bm to the blue color evaluation value EB newly obtained n step SG9, updates the variable Bx to the value of the x axis direction component representing the position of the pixel most lately specified in step SG2, and updates the variable By to the value of the y axis direction component of this pixel (step SG11).

In step SG12, the spotlight extraction unit 12A determines whether or not there is any pixel that has not yet been specified in step SG2. When determining that there is any such pixel, the spotlight extraction unit 12A returns the flow to step SG2. When determining that there is no such pixel, the spotlight extraction unit 12A advances the flow to step SG13 shown in FIG. 25.

The variable Rx at the time the steps up to step SG12 are completed represents a value of an x axis direction component representing the position of a pixel whose red component is the brightest among all the pixels, the variable Ry represents a value of a y axis direction component of this pixel, and the variable Rm represents the red color evaluation value of this pixel.

Likewise, the variable Gx represents a value of an x axis direction component representing the position of a pixel whose green component is the brightest among all the pixels, the variable Gy represents a value of a y axis direction component of this pixel, and the variable Gm represents the green color evaluation value of this pixel.

Further, the variable Bx represents a value of an x axis direction component representing the position of a pixel whose blue component is the brightest among all the pixels, the variable By represents a value of a y axis direction component of this pixel, and the variable Bm represents the blue color evaluation value of this pixel.

In step SG13, in a case where the pixel which is specified as having the brightest red component is determined as the first spotlight, the spotlight extraction unit 12A specifies two pixels which are located in positions in which the second and third spotlights should be located with respect to the first spotlight, as candidates of the second and third spotlights.

However, in step SG13, the spotlight extraction unit 12A does not specify a pixel that has once been specified as a candidate of the second spotlight in step SG13, as a candidate of the second spotlight again. Also, the spotlight extraction unit 12A does not specify a pixel that has once been specified as a candidate of the third spotlight in step SG13, as a candidate of the third spotlight again.

Then, the spotlight extraction unit 12A obtains the red color evaluation value of the pixel specified as having the brightest red component, the green color evaluation value of the most lately specified candidate of the second spotlight, and the blue color evaluation value of the most lately specified candidate of the third spotlight. The spotlight extraction unit 12A determines whether or not the smallest value among those obtained three evaluation values is greater than the present value of the variable max (step SG14). When determining that the smallest value among the evaluation values is equal to or smaller than the variable max, the spotlight extraction unit 12A advances the flow to step SG16.

On the contrary, in a case where the smallest value among the evaluation values is greater than the variable max, the spotlight extraction unit 12A updates the variable max to the smallest value among the three evaluation values newly obtained in step SG14 (step SG15).

The spotlight extraction unit 12A updates the variable ss to the value of the x axis direction component representing the position of the pixel specified as having the brightest red component, and updates the variable tt to the value of the y axis direction component of this pixel.

The spotlight extraction unit 12A updates the variable uu to a difference between the value of the x axis direction component representing the position of the pixel specified as having the brightest red component and a value of an x axis direction component representing the position of the pixel most lately specified in step SG13 as the candidate of the second spotlight.

Further, the spotlight extraction unit 12A updates the variable vv to a difference between the value of the y axis direction component representing the position of the pixel specified as having the brightest red component and a value of a y axis direction component representing the position of the pixel most lately specified in step SG13 as the candidate of the second spotlight.

Next, the spotlight extraction unit 12A determines whether or not there is any pixel that can be a candidate of the second spotlight when the pixel specified as having the brightest red component is determined as the first spotlight, other than the pixel already specified in step SG13 (step SG16). When determining that there is any such pixel, the spotlight extraction unit 12A returns the flow to step SG13.

On the contrary, when determining that there is no such pixel, the spotlight extraction unit 12A generates data tmp1 representing a present value MAX of the variable max, a present value SS of the variable ss, a present value TT of a variable tt, a present value UU of the variable uu, and a present value VV of the variable vv, and temporarily stores the data tmp1 in the RAM 13 (step SG17).

Then, the spotlight extraction unit 12A initializes the variable max, the variable ss, the variable tt, the variable uu, and the variable vv (FIG. 26, step SG18), and advances the flow to step SG19.

In step SG19, in a case where the pixel which is specified as having the brightest green component is determined as the second spotlight, the spotlight extraction unit 12A specifies two pixels which are located in positions in which the first and third spotlights should be located with respect to the second spotlight, as candidates of the first and third spotlights.

However in step SG19, a pixel which has once been specified as a candidate of the first spotlight in step SG19 is not to be specified as a candidate of the first spotlight again. Further, a pixel which has once been specified as a candidate of the third spotlight in step SG19 is not to be specified as a candidate of the third spotlight again.

Then, the spotlight extraction unit 12A obtains the green color evaluation value of the pixel specified as having the brightest green component, a red color evaluation value of the most lately specified candidate of the first spotlight, and a blue color evaluation value of the pixel of the most lately specified candidate of the third spotlight. Then, the spotlight extraction unit 12A determines whether or not the smallest value among the obtained three evaluation values is greater than the variable max (step SG20). When determining that the smallest value is equal to or smaller than the variable max, the spotlight extraction unit advances the flow to step SG22.

On the contrary, when determining that the smallest value among the evaluation values is greater than the variable max, the spotlight extraction unit 12A updates the variable max to the smallest value among the three evaluation values newly obtained in step SG20 (step SG21).

The spotlight extraction unit 12A updates the variable ss to a value of an x axis direction component representing the position of the pixel most lately specified in step SG19 as the candidate of the first spotlight, and updates the variable tt to a value of a y axis direction component of this pixel.

The spotlight extraction unit 12A updates the variable uu to a difference between the value of the x axis direction component representing the position of the pixel most lately specified in step SG19 as the candidate of the first spotlight and the value of the x axis direction component representing the position of the pixel specified as having the brightest green component.

Further, the spotlight extraction unit 12A updates the variable vv to a difference between the value of the y axis direction component representing the position of the pixel most lately specified in step SG19 as the candidate of the first spotlight and the value of the y axis direction component representing the position of the pixel specified as having the brightest green component.

Then, the spotlight extraction unit 12A determines whether or not there is any pixel that can be a candidate of the first spotlight when the pixel specified as having the brightest green component is determined as the second spotlight, other than the pixel that has already been specified in step SG19 (step SG22). When determining that there is any such pixel, the spotlight extraction unit 12A returns the flow to step SG19.

On the contrary, when determining that there is no such pixel, the spotlight extraction unit 12A generates data tmp2 representing a present value MAX of the variable max, a present value SS of the variable ss, a present value TT of the variable tt, a present value UU of the variable uu, and a present value VV of the variable vv, and temporarily stores the data tmp2 in the RAM 13 (step SG23). Then, the spotlight extraction unit 12A initializes the variable max, the variable ss, the variable tt, the variable uu, and the variable vv (FIG. 27, step SG24), and advances the flow to step SG25.

In step SG25, in a case where the pixel which is specified as having the brightest blue component is determined as the third spotlight, the spotlight extraction unit 12A specifies two pixels which are located in positions in which the first and second spotlights should be located with respect to the third spotlight, as candidates of the first and second spotlights.

However in step SG25, a pixel that has once been specified as a candidate of the first spotlight in step SG25 is not to be specified as a candidate of the first spotlight again. Further, a pixel that has once been specified as a candidate of the second spotlight in step SG25 is not to be specified as a candidate of the second spotlight again.

Then, the spotlight extraction unit 12A obtains the blue color evaluation value of the pixel specified as having the brightest blue component, the red color evaluation value of the most lately specified candidate of the first spotlight, and the green color evaluation value of the most lately specified candidate of the second spotlight. Then, the spotlight extraction unit 12A determines whether or not the smallest value among the obtained three evaluation values is greater than the present value of the variable max (step SG26). When determining that the smallest value among the evaluation values is equal to or smaller than the variable max, the spotlight extraction unit 12A advances the flow to step SG28.

On the contrary, when determining that the smallest value among the evaluation values is greater than the variable max, the spotlight extraction unit 12A updates the variable max to the smallest value among the three evaluation values newly obtained in step SG26 (step SG27).

Further, the spotlight extraction unit 12A updates the variable ss to a value of an x axis direction component representing the position of the pixel most lately specified in step SG25 as the candidate of the first spotlight, and updates the variable tt to a value of a y axis direction component of this pixel.

The spotlight extraction unit 12A updates the variable uu to a difference between the value of the x axis direction component representing the position of the pixel most lately specified in step SG25 as the candidate of the first spotlight and a value of an x axis direction component representing the position of the pixel most lately specified in step SG25 as the candidate of the second spotlight.

Further, the spotlight extraction unit 12A updates the variable uu to a difference between the value of the y axis direction component representing the position of the pixel most lately specified in step SG25 as the candidate of the first spotlight and a value of a y axis direction component representing the position of the pixel most lately specified in step SG25 as the candidate of the second spotlight.

Then, the spotlight extraction unit 12A determines whether or not there is any pixel that can be a candidate of the first spotlight when the pixel specified as having the brightest blue component is determined as the third spotlight, other than the pixel already specified in step SG25 (step SG28). When determining that there is any such pixel, the spotlight extraction unit 12A returns the flow to step SG25.

On the contrary, when determining that there is no such pixel the spotlight extraction unit 12A generates data tmp3 representing a present value MAX of the variable max, a present value SS of the variable ss, a present value TT of the variable tt, a present value of UU of the variable uu, and a present value VV of the variable vv. Then, the spotlight extraction unit 12A specifies data representing the largest present value MAX among the present values MAX represented by the data tmp1, the data tmp2, and the data tmp3. Then, the spotlight extraction unit 12A determines a pixel which is located on coordinates (SS, TT) represented by a pair of values SS and TT which are represented by the specified data, as the first spotlight (step SG29).

Further in step SG29, the spotlight extraction unit 12A determines a pixel which is located on coordinates ((SS+UU), (TT+VV)) represented by a pair of a sum of values SS and UU which are represented by the specified data and a sum of values TT and VV which are represented by the specified data, as the second spotlight. And the spotlight extraction unit 12A determines a pixel which is located on coordinates ((SS−UU), (TT−VV)) represented by a pair of a difference between values SS and UU which are represented by the specified data and a difference between values TT and VV which are represented by the specified data, as the third spotlight.

By performing the above steps SG1 to SG29 as the spotlight extraction process, it is possible to avoid incorrect operation which might be caused when light other than the spotlight emitted from the light emitting unit 4 is irradiated on the display screen of the display unit 3.

Figure 28:
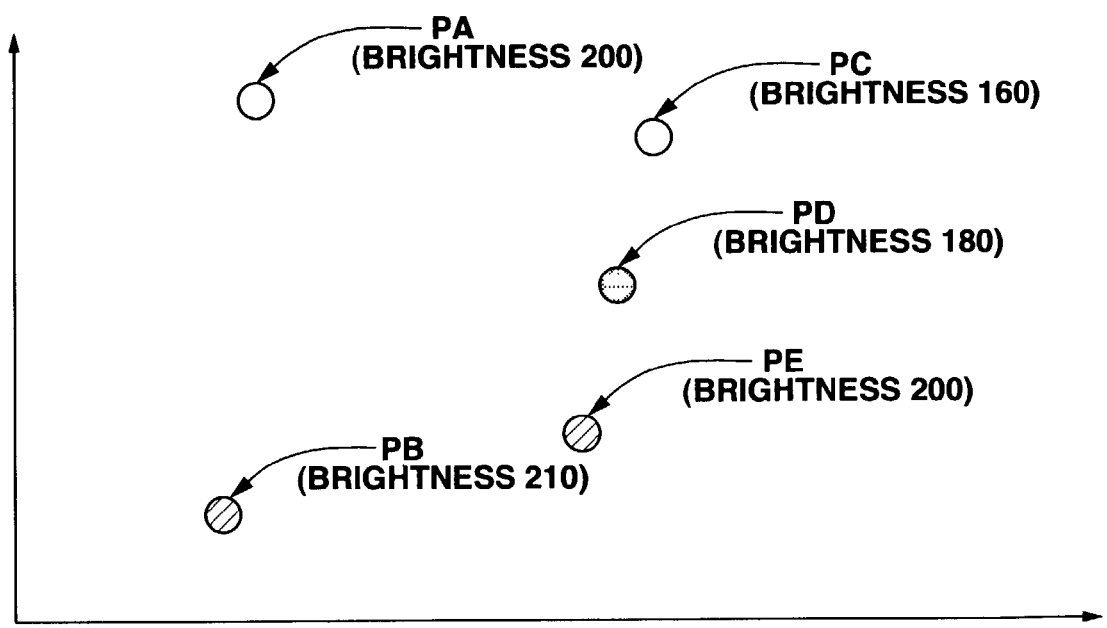
FIG. 28 is a diagram for explaining how incorrect detection of spotlight is prevented.

Specifically, for example, it is assumed that a blue point PA having brightness of 200 and a green point PB having brightness of 210 which are formed by light other than the spotlight emitted from the light emitting unit 4, and a blue point PC having brightness of 160, a red point PD having brightness of 180, and a green point PE having brightness of 200 which are formed by the spotlights emitted from the light emitting unit 4 are formed on the display screen of the display unit 3, as shown in FIG. 28. In this case, if the drawing system performs steps SF1 to SF8 as the spotlight extraction process, a combination of the point PA, the point PB, and the point PD might be incorrectly determined as the spotlights emitted from the light emitting unit 4. On the other hand, if the drawing system performs steps SG1 to SG29 as the spotlight extraction unit, the combination of the point PC, the point PD, and the point PE is determined as the spotlights emitted from the light emitting unit 4 correctly.

A plurality of spotlights emitted from the light emitting unit 4 may have the same color. Specifically, for example, the spotlights emitted from the light emitting unit 4 may form a pattern shown in FIG. 29A, where three spots having the same color and the same brightness are arranged in line at almost regular intervals (note that in FIGS. 29A and 29B, the area of a circle represents the brightness). The spotlights emitted from the light emitting unit 4 may form a pattern shown in FIG. 29B, where three spots having the same color and different brightness from one another are arranged in line at almost regular intervals. Or, the spotlights emitted from the light emitting unit 4 may form a pattern shown in FIG. 29C, where in addition to the pattern shown in FIG. 29A, a fourth spot exists which is arranged in a line perpendicular to the line where the three spots are arranged and intersects with this line at the central spot of the three spots.

In the case where the spotlights emitted from the light emitting unit 4 form a pattern made of a first spotlight, and a second spotlight and third spotlight which are arranged symmetrically with respect to the first spotlight as shown in FIG. 29A, the drawing system may extract the pattern of the spotlights by performing a process shown in FIG. 30 as the spotlight extraction process. (To facilitate understanding, it is assumed below that all of the first to third spotlights are red.)

When the spotlight extraction process is started, the spotlight extraction unit 12A declares usage of a variable $R_{max}$, a variable x, and a variable y, and initializes those three variables (FIG. 30, step SH1). Then, the spotlight extraction unit 12A obtains coordinates and red color evaluation value of a pixel which has the brightest red component by performing substantially the same processes as the aforementioned steps S211 to S214 (step SH2). In step SH2, the above described red color evaluation value is used in place of the brightness of the red component. However, it causes no problem to use the brightness of the red component.

Next, the spotlight extraction unit 12A obtains coordinates and red color evaluation value of a pixel which has the second brightest red component by applying substantially the same process as step SH2 to pixels which compose the image data stored in the RAM 13 except the pixel whose coordinates are obtained in step SH2 (step SH3).

Figure 31:
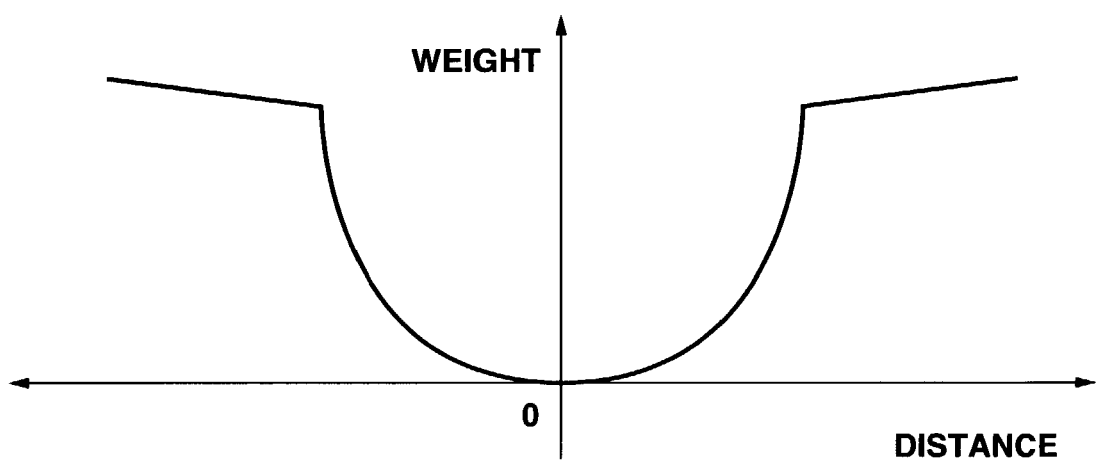
FIG. 31 is a graph showing a weight function.

In step SH3, a value obtained by multiplying the original pixel value of the pixel which is the target of the process of step SH3 by a weight function, is used as a pixel value. This weight function is such a function as shown in FIG. 31, for example. That is, according to this weight function, if the distance between a pixel and the coordinates obtained in step SH2 is equal to or smaller than a fixed value, the pixel value of this pixel is made smaller than the original pixel value. And if the distance between a pixel and the coordinates obtained in step SH2 is equal to or smaller than the fixed value, the closer to the coordinates obtained in step SH2 this pixel is located, the smaller the ratio of the pixel value after multiplication to the original pixel value is made.

Then, the spotlight extraction unit 12A obtains coordinates and red color evaluation value of a pixel which has the third brightest red component by applying substantially the same process as step SH3 to pixels which compose the image data stored in the RAM 13 except the two pixels whose coordinates are obtained in steps SH2 and SH3 (step SH4).

According to a weight function by which the original pixel value of the pixel which is the target of the process of step SH4 is multiplied, if the distance between a pixel and the coordinates obtained in step SH3 is equal to or smaller than a fixed value, the pixel value of this pixel is made smaller than its original pixel value. And if the distance between a pixel and the coordinates obtained in step SH3 is equal to or smaller than the fixed value, the closer to the coordinates obtained in step SH3 this pixel is located, the smaller the ratio of the pixel value after multiplication to the original pixel value is made.

Next, the spotlight extraction unit 12A determines the positions of the first to third spotlights by performing substantially the same processes as the aforementioned steps SG13 to SG29 by using the three pixels whose red color evaluation values and coordinates are obtained in steps SH2 to SH4 (step SH5).

It should be noted that in step SH5, the spotlight extraction unit 12A uses the pixel having the second brightest red component in place of a pixel having the brightest green component. The spotlight extraction unit 12A uses the pixel having the third brightest red component in place of a pixel having the brightest blue component. Further, the spotlight extraction unit 12A uses red color evaluation values (or, brightness of red components) in place of green color evaluation value and blue color evaluation value.

Fourth Embodiment

Due to the process of step 3 where a spot is repeatedly displayed on the display screen of the display unit 3, if the position of the spotlight irradiated onto the display screen moves, the spot to be displayed by the drawing system according to each of the above described embodiments also moves.

However, if the spotlight moves fast, the movement of the spot displayed by the drawing system becomes visibly discontinuous. Users might feel unnatural while viewing the movement of the spot.

In this case, it is possible to make the movement of the spot visually continuous, by performing an interpolation process in terms of amount of movement of the spot. The fourth embodiment of the present invention where the movement of the spot is made continuous by performing an interpolation process, will now be explained below.

Figure 32:
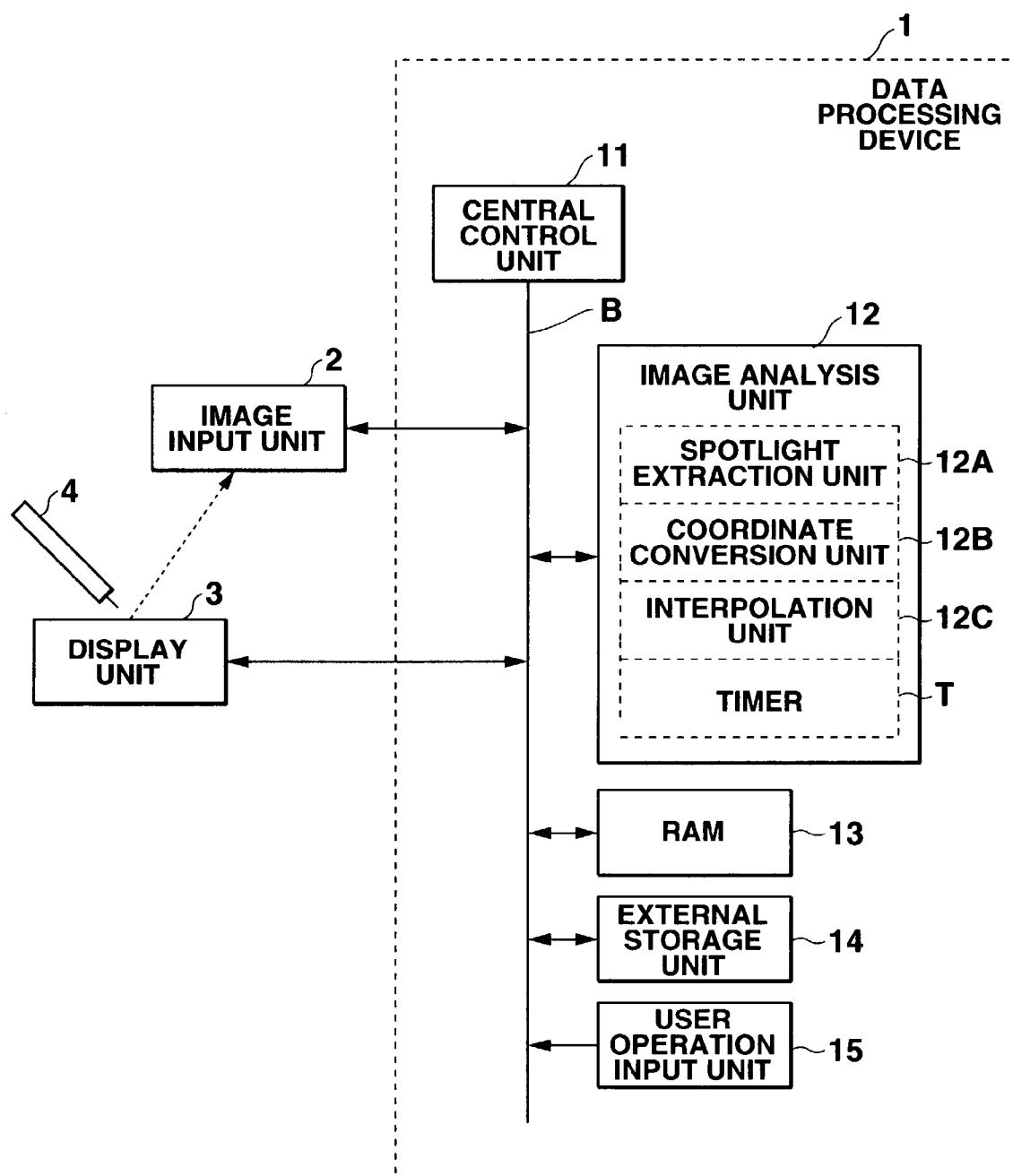
FIG. 32 is a diagram showing a structure of a drawing system according to a fourth embodiment of the present invention.

The drawing system according to this embodiment comprises the structure shown in FIG. 32. That is, this drawing system comprises substantially the same physical structure as that shown in FIG. 2. In addition to this, the image analysis unit 12 comprises an interpolation unit 12c constituted by a CPU, etc. and for performing a later-described process, and a timer T constituted by a crystal oscillator, etc. The timer T generates time information representing the current time, and successively supplies the time information to the interpolation unit 12c.

The RAM 13 of this drawing system stores coordinates representing the position of the spot, for two pairs of coordinates which are most lately extracted in the spotlight extraction process. When the coordinate conversion process (the process of step S22) is completed, the drawing system performs the interpolation process shown in FIG. 33, before performing step S3.

Figure 33:
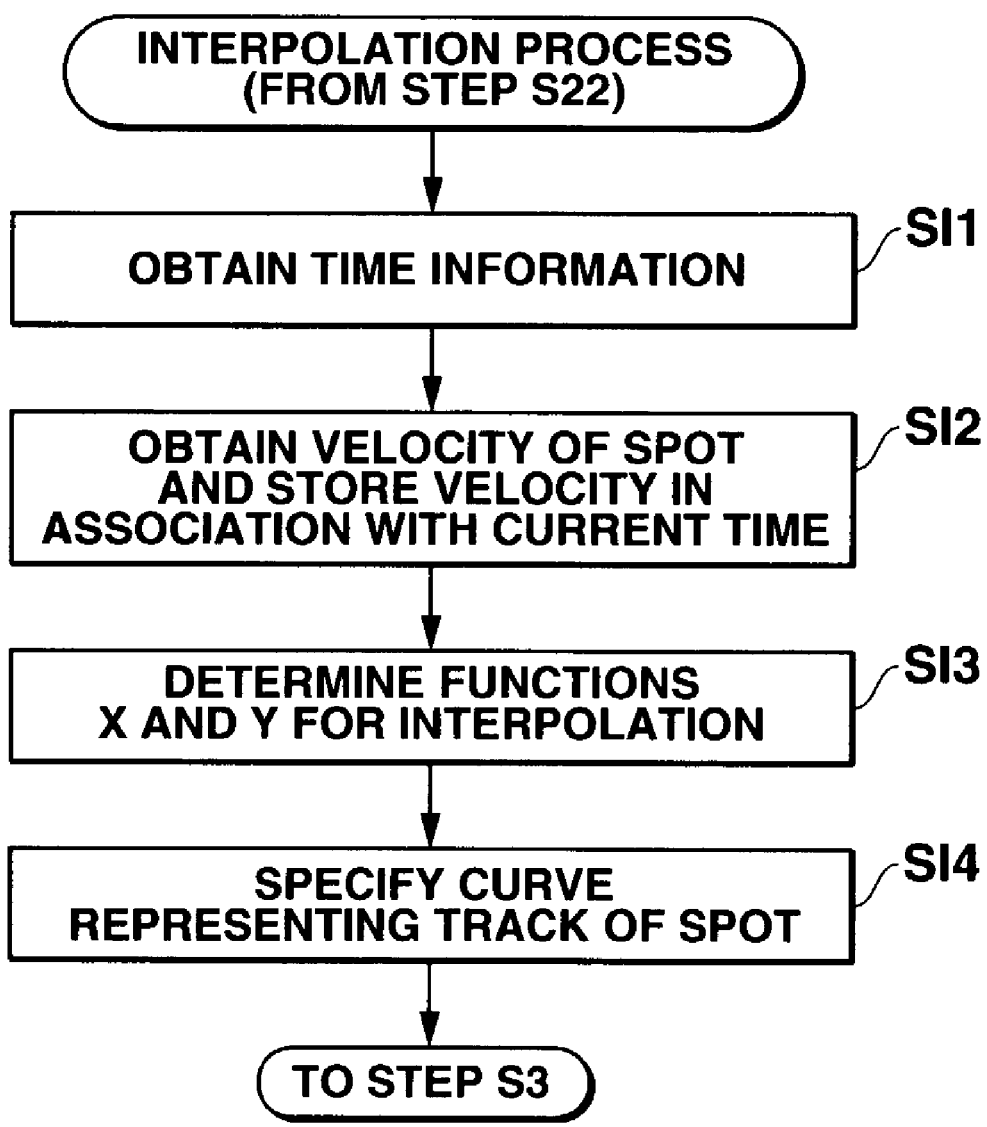
FIG. 33 is a flowchart showing an interpolation process.

When the drawing system obtains the coordinates ($x_{disp}$, $y_{disp}$) in step S22, the interpolation unit 12c obtains time information supplied from the timer T, before going to step S3 (FIG. 33, step S11). Then, the interpolation unit 12c stores the most lately obtained coordinates ($x_{disp}$, $y_{disp}$) in association with the most lately obtained time information in the RAM 13.

Then, the interpolation unit 12c reads out coordinates for two spots most lately extracted (hereinafter, these two spots are explained as n-th spot and (n+1)th spot, where n is a natural number), and n-th time information and (n+1)th time information associated with the coordinates of those two spots. The interpolation unit 12c obtains x axis direction component $vx_{n+1}$ and y axis direction component $vy_{n+1}$ of the velocity of the spot at a time represented by the (n+1)th time information, by calculating the right sides of an equation 15 and equation 16 based on the read coordinates and time information. Then, the interpolation unit 12c stores the obtained velocity $vx_{n+1}$ and $vy_{n+1}$ in the RAM 13 in association with the most lately obtained time information (step S12).

$$vx_{n+1}=(x_{n+1}-x_n)/(t_{n+1}-t_n) \qquad \text{[Equation 15]}$$

(where $x_{n+1}$ represents x axis direction component of the coordinates of the (n+1)th spot, $x_n$ represents x axis direction component of the coordinates of the n-th spot, $t_{n+1}$ represents the current time represented by the (n+1)th time information, and $t_n$ represents the current time represented by the n-th time information.)

$$vy_{n+1}=(y_{n+1}-y_n)/(t_{n+1}-t_n) \qquad \text{[Equation 16]}$$

(where $y_{n+1}$ represents y axis direction component of the coordinates of the (n+1)th spot, and $y_n$ represents y axis direction component of the coordinates of the n-th spot.)

Next, the interpolation unit 12c specifies a function for interpolation $X(t; t_n < t \leq t_{n+1})$ represented by an equation 17, and a function for interpolation $Y(t; t_n < t \leq t_{n+1})$ represented by an equation 18 (step S13).

The function $X(t)$ is an estimated value of an x axis direction component of the coordinates of the spot, when the spot moves during a time period from $t_n$ to $t_{n+1}$, and the function $Y(t)$ is an estimated value of a y axis direction component of the coordinates of the spot, when the spot moves during a time period from $t_n$ to $t_{n+1}$. Coordinates $(X(t_n), Y(t_n))$ represent the position of the spot at the time $t_n$, and coordinates $(X(t_{n+1}), Y(t_{n+1}))$ represent the position of the spot at the time $t_{n+1}$.

$$X(t; t_n < t \leq t_{n+1}) = \{-(t_{n+1}-t)^2 \cdot vx_n\}/\{2 \cdot (t_{n+1}-t_n)\} + \qquad \text{[Equation 17]}$$
$$\{(t_n-t)^2 \cdot vx_{n+1}\}/\{2 \cdot (t_{n+1}-t_n)\} +$$
$$x_{n+1} - \{vx_{n+1} \cdot (t_{n+1}-t_n)/2\}$$
$$(\text{where } vx_0 = 0)$$

$$Y(t; t_n < t \leq t_{n+1}) = \{-(t_{n+1}-t)^2 \cdot vy_n\}/\{2 \cdot (t_{n+1}-t_n)\} + \qquad \text{[Equation 18]}$$
$$\{(t_n-t)^2 \cdot vy_{n+1}\}/\{2 \cdot (t_{n+1}-t_n)\} +$$
$$y_{n+1} - \{vy_{n+1} \cdot (t_{n+1}-t_n)/2\}$$

(where $vy_0=0$)

Then, the interpolation unit 12c specifies a curve representing the track of the movement of a spot located at coordinates $(X(t), Y(t))$ during a time period from $t_n$ to $t_{n+1}$, generates data representing this curve, and stores the data in the RAM 13 (step S14). Thus, the interpolation process is completed, and the flow goes to step S3.

When the interpolation process is completed and the process of step S3 is started, the central control unit 11 reads out from the RAM 13 the data representing the curve stored in the RAM 13 in step SI4, instead of reading out the coordinates $(x_{disp}, y_{disp})$. Then, the central control unit 11 instructs the display unit 3 to display the curve represented by the read data on the display screen. In accordance with this instruction, the display unit 3 displays the curve on the display screen.

The functions $X(t)$ and $Y(t)$ are not limited to the above described ones. Any function may be used if it draws a continuous curve as a track.

Modified Version of Fourth Embodiment

The RAM 13 may store three pairs of coordinates representing the positions of the spot, which are most lately extracted in the spotlight extraction process.

The drawing system may extract the positions of the spot at a plurality of different timings, determine the position of the spot which is represented by the plurality of extracted positions, and use the coordinates of the determined position in place of the coordinates $(x_{spot}, y_{spot})$ in the processes after the coordinate conversion process. By doing so, it is possible to reduce influence caused by tremble of a hand when the operator operates the light emitting unit 4 and tries to fix the position of the spotlight.

Figure 34:
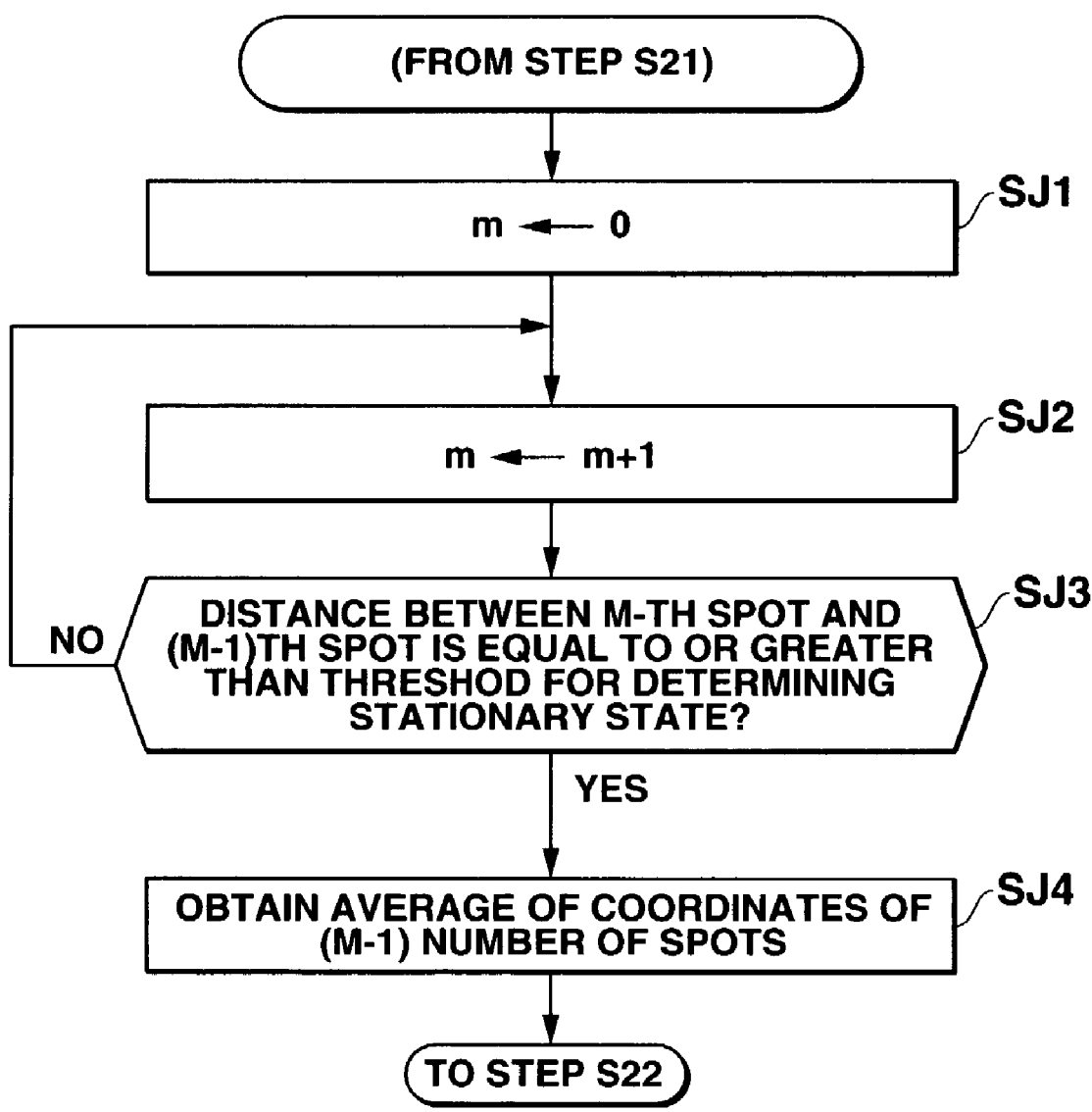
FIG. 34 is a flowchart showing a process for obtaining an average position of a spot.

Specifically, the spotlight extraction unit 12A may perform a process shown in FIG. 34, for example. (In this case, the RAM 13 of the drawing system stores p number of pairs of coordinates representing the positions of the spot, which are most lately extracted in the spotlight extraction process. p represents a sufficiently large positive integer.)

When obtaining the coordinates $(x_{spot}, y_{spot})$ in step S21, the spotlight extraction unit 12A reads out the coordinates of the p number of spots which are most lately extracted, before going to step S22. Further, the spotlight extraction unit 12A declares usage of a variable m, and substitutes a value 0 for the variable m (FIG. 34, step SJ1).

Next, the spotlight extraction unit 12A increments the variable m (step SJ2). Then, the spotlight extraction unit 12A determines whether or not a distance between a spot which is M-th most lately obtained in the coordinate conversion process (M represents the present value of the variable m) and a spot which is (M−1)th most lately obtained exceeds a predetermined threshold for determining stationary state (step SJ3).

When determining that the distance does not exceed the threshold for determining stationary state, the spotlight extraction unit 12A returns the flow to step SJ2. On the contrary, when determining that the distance exceeds the threshold for determining stationary state, the spotlight extraction unit 12A obtains an average $x_{ave}$ and an average $y_{ave}$ respectively of the x axis direction components and y axis direction components of the (M−1) number of pairs of coordinates of the spots which are most lately obtained by the coordinate conversion unit 12B (step SJ4).

When the spotlight extraction unit 12A obtains the averages $x_{ave}$ and $y_{ave}$, the coordinate conversion unit 12B regards the coordinates $(x_{ave}, y_{ave})$ as the coordinates of the spot obtained in the spotlight extraction process, and performs the coordinate conversion process.

The spotlight extraction unit 12A may rewrite the coordinates $(x_{spot}, y_{spot})$ most lately stored in the RAM 13 in step S21 to the coordinates $(x_{ave}, y_{ave})$ represented by the averages $x_{ave}$ and $y_{ave}$ most lately obtained in step SJ4.

Figure 35:
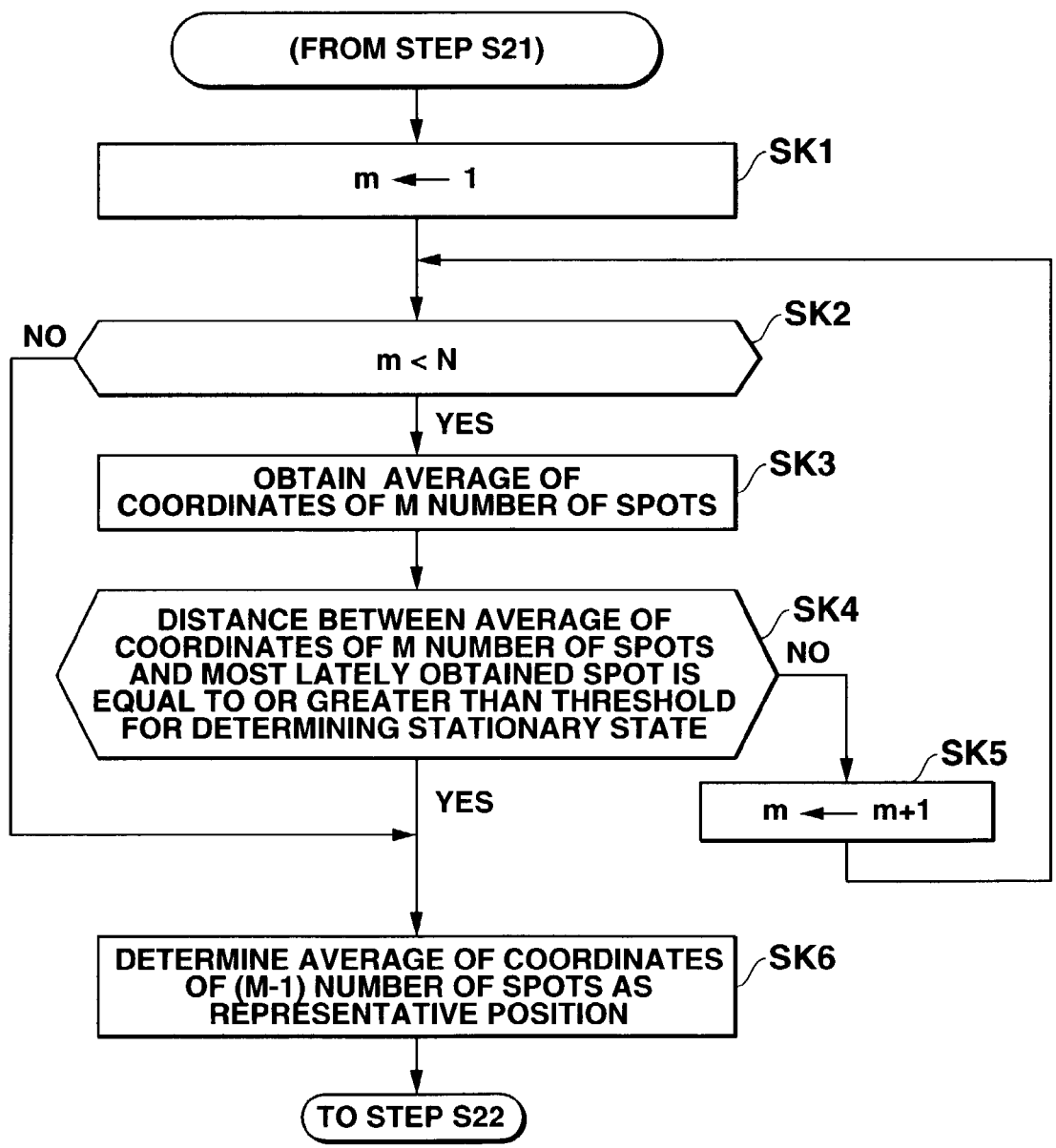
FIG. 35 is a flowchart showing a modified example of the process for obtaining an average position of a spot.

The spotlight extraction unit 12A may perform a process shown in FIG. 35, for example.

That is, when the spotlight extraction unit 12A obtains the coordinates $(x_{spot}, y_{spot})$ in step S21, the spotlight extraction unit 12A reads out coordinates of p number of spots which are most lately extracted, before going to step S22. Then, the spotlight extraction unit 12A declares usage of a variable m, and substitute a value 1 for the variable m (FIG. 35, step SK1).

Next, the spotlight extraction unit 12A determines whether or not the variable m is smaller than a predetermined value N (step SK2). When determining that the variable m is equal to or greater than N, the spotlight extraction unit 12A advances the flow to step SK6.

On the contrary, when determining that the variable m is smaller than N, the spotlight extraction unit 12A obtains an average $x_{ave(M)}$ and an average $y_{ave(M)}$ respectively of the x axis direction components and the y axis direction components of the coordinates of the M number of spots which are most lately obtained by the coordinate conversion unit 12B (M represents the present value of the variable m) (step SK3). Then, the spotlight extraction unit 12A determines whether or not a distance between the coordinates ($x_{ave(M)}$, $y_{ave(M)}$) represented by the pair of obtained averages and the coordinates of the spot most lately obtained exceeds a predetermined threshold for determining stationary state (step SK4).

When determining that the distance does not exceed the threshold for determining stationary state in step SK4, the spotlight extraction unit 12A increments the variable m (step SK5), and returns the flow to step SK2. On the contrary, when determining that the distance exceeds the threshold for determining stationary state, the spotlight extraction unit 12A determines coordinates ($x_{ave(M-1)}$, $y_{ave(M-1)}$) represented by an average $x_{ave(M-1)}$ and an average $y_{ave(M-1)}$ respectively of x axis direction components and y axis direction components of the coordinates of the (M−1) number of spots most lately obtained by the coordinate conversion unit 12B, as the coordinates obtained in the spotlight extraction process (step SK6). The coordinate conversion process is performed using the coordinates ($x_{ave(M-1)}$, $y_{ave(M-1)}$).

Figure 36:
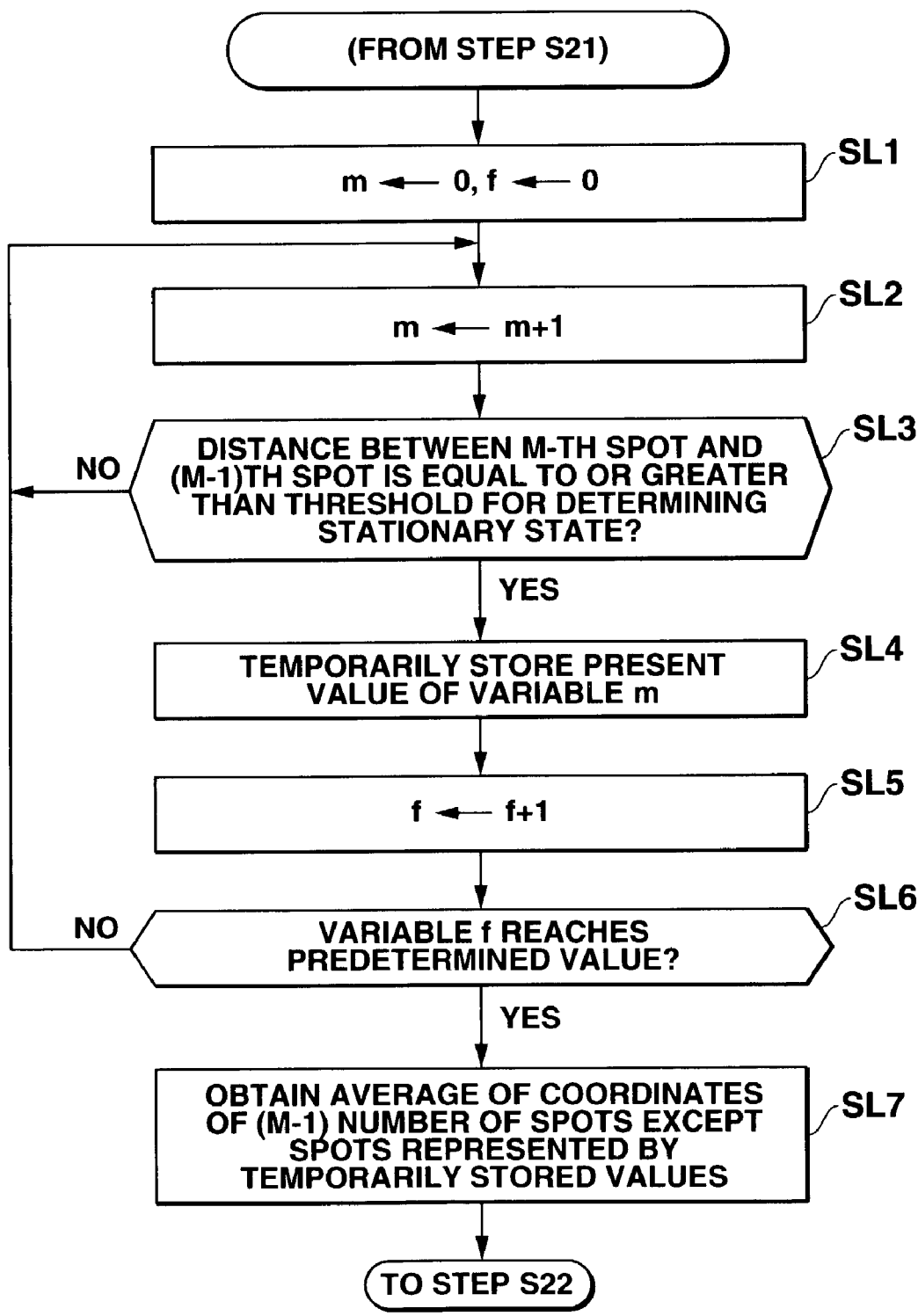
FIG. 36 is a flowchart showing a modified example of the process for obtaining an average position of a spot.

The spotlight extraction unit 12A may perform a process shown in FIG. 36, instead of the process of steps SJ1 to SJ4, or the process of steps SK1 to SK6.

That is, when obtaining the coordinates ($x_{spot}$, $y_{spot}$) in step S21, the spotlight extraction unit 12A reads out coordinates of p number of spots which are most lately obtained, before going to step S22. Then, the spotlight extraction unit 12A declares usage of a variable m and a variable f, and substitutes a value 0 for the variable m and the variable f (FIG. 36, step SL1).

Then, the spotlight extraction unit 12A increments the variable m (step SL2). Then, the spotlight extraction unit 12A determines whether or not a distance between a spot which is M-th most lately obtained in the coordinate conversion process (M represents the present value of the variable m) and a spot which is (M−1)th most lately obtained exceeds a predetermined threshold for determining stationary state (step SL3).

When determining that the distance does not exceed the threshold, the spotlight extraction unit 12A returns the flow to step SL2. On the contrary, when determining that the distance exceeds the threshold, the spotlight extraction unit 12A temporarily stores the present value M of the variable m in the RAM 13 (step SL4). Then, the spotlight extraction unit 12A increments the variable f (step SL5), and determines whether or not the variable f reaches a predetermined value (step SL6).

When determining that the variable f does not reach the predetermined value, the spotlight extraction unit 12A returns the flow to step SL2. When determining that the variable f reaches the predetermined value, the spotlight extraction unit 12A obtains an average $x_{ave}$ and an average $y_{ave}$ respectively of the x axis direction components and the y axis direction components of the coordinates of (M−1) number of spots which are most lately obtained by the coordinate conversion process 12B, except spots represented by the variable m temporarily stored in the RAM 13 in step SL4 (for example, if values temporarily stored are 3 and 7, coordinates of the third most lately obtained spot and the seventh most lately obtained spot are excluded when calculating the average) (step SL7).

When the spotlight extraction unit 12A obtains the averages $x_{ave}$ and $y_{ave}$, the coordinate conversion unit 12B regards the coordinates ($x_{ave}$, $y_{ave}$) as the coordinates obtained in the spotlight extraction process, and performs the coordinate conversion process.

Figure 37:
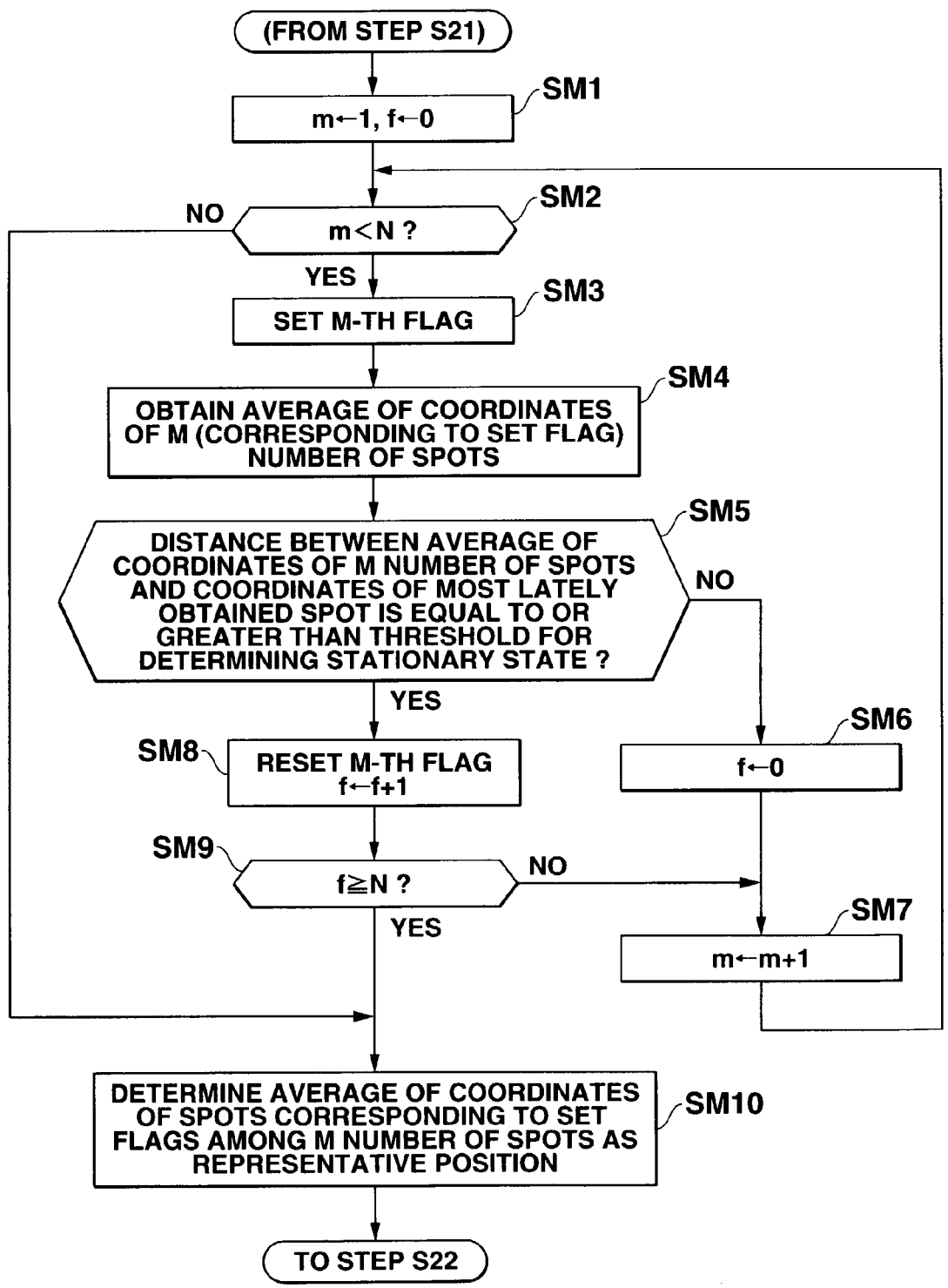
FIG. 37 is a flowchart showing a modified example of the process for obtaining an average position of a spot.

The spotlight extraction unit 12A may perform a process shown in FIG. 37, instead of the process of steps SL1 to SL7.

That is, when obtaining the coordinates ($x_{spot}$, $y_{spot}$) in step S21, the spotlight extraction unit 12A reads out coordinates of p number of spots which are most lately obtained, before going to step S22. Then, the spotlight extraction unit 12A declares usage of a variable ma and a variable f, and substitutes a value 1 for the variable m, and a value 0 for the variable f (FIG. 37, step SM1). Further, the spotlight extraction unit 12A declares usage of p number of flags.

Next, the spotlight extraction unit 12A determines whether or not the variable m is smaller than a predetermined value N (step SM2). When determining that the variable m is equal to or greater than N, the spotlight extraction unit 12A advances the flow to step SM10.

On the contrary, when determining that the variable m is smaller than N, the spotlight extraction unit 12A sets a M-th flag (M represents the present value of the variable m) (step SM3). Then, the spotlight extraction unit 12A obtains an average $x_{ave(M)}$ and an average $y_{ave(M)}$ respectively of the x axis direction components and the y axis direction components of the coordinates of M number of spots which are most lately obtained by the coordinate conversion unit 12B (step SM4).

Then, the spotlight extraction unit 12A determines whether or not a distance between coordinates ($x_{ave(M)}$, $y_{ave(M)}$) represented by the pair of averages obtained in step SM4 and coordinates of the most lately obtained spot exceeds a predetermined threshold for determining stationary state (step SM5).

When determining that the distance does not exceed the threshold for determining stationary state in step SM5, the spotlight extraction unit 12A substitutes a value 0 for the variable f (step SM6), increments the variable m (step SM7), and returns the flow to step SM2.

On the contrary, when determining that the distance exceeds the threshold for determining stationary state, the spotlight extraction unit 12A resets the M-th flag, and increments the variable f (step SM8). Then, the spotlight extraction unit 12A determines whether or not the variable f is equal to greater than the predetermined value N (step SM9). When determining that the variable f is smaller than N, the spotlight extraction unit 12A moves the flow to step SM7.

On the contrary, when determining that the variable f is equal to or greater than N in step SM9, the spotlight extraction unit 12A obtains an average $x_{ave}$ and an average $y_{ave}$ respectively of the x axis direction components and the y axis direction components of the coordinates of spots which correspond to set flags, among the M number of spots most lately obtained by the coordinate conversion unit 12B (that is, if the third flag and the seventh flag among M number of flags are reset, and the other flags are set, average of the coordinates of the spots other than the third most lately obtained spot and seventh most lately obtained spot is obtained). Then, the spotlight extraction unit 12A determines coordinates ($x_{ave}$, $y_{ave}$) represented by the obtained averages as the coordinates of the spot obtained in the spotlight extraction process (step SM10). Then, the coordinate conversion process is performed using the determined coordinates ($x_{ave}$, $y_{ave}$).

The light emitting unit 4 may comprise a structure for emitting spotlight having a color selected by the operator from among a plurality of colors. In this case, the drawing system may distinguish each color emitted from the light emitting unit 4, and may determine the content of the process to perform based on the result of distinguishing.

For example, it is assumed that the light emitting unit 4 has a structure for emitting light having a color selected by the user from among red, green and blue. In this case, in order to make the light emitting unit 4 function as a mouse, the drawing system may determine that move of a mouse cursor is instructed when extracting a red spot, determine that the left button of the mouse is clicked when extracting a green spot, and determine that the right button of the mouse is clicked when extracting a blue spot. Based on the determination result, the drawing system may determine the content of a process to be performed after this determination.

In the case where the light emitting unit 4 emits spotlight having a color selected from among a plurality of colors, if spotlights having different colors are emitted from different light emitting elements (such as light emitting diodes), the position on the display screen of the display unit 3 that is irradiated by the spotlight may vary in accordance with the selected color, even if the position of the light emitting unit 4 is fixed with respect to the display screen. In this case, a problem might be caused that the user cannot easily point a small point using this light emitting unit 4.

Figure 38:
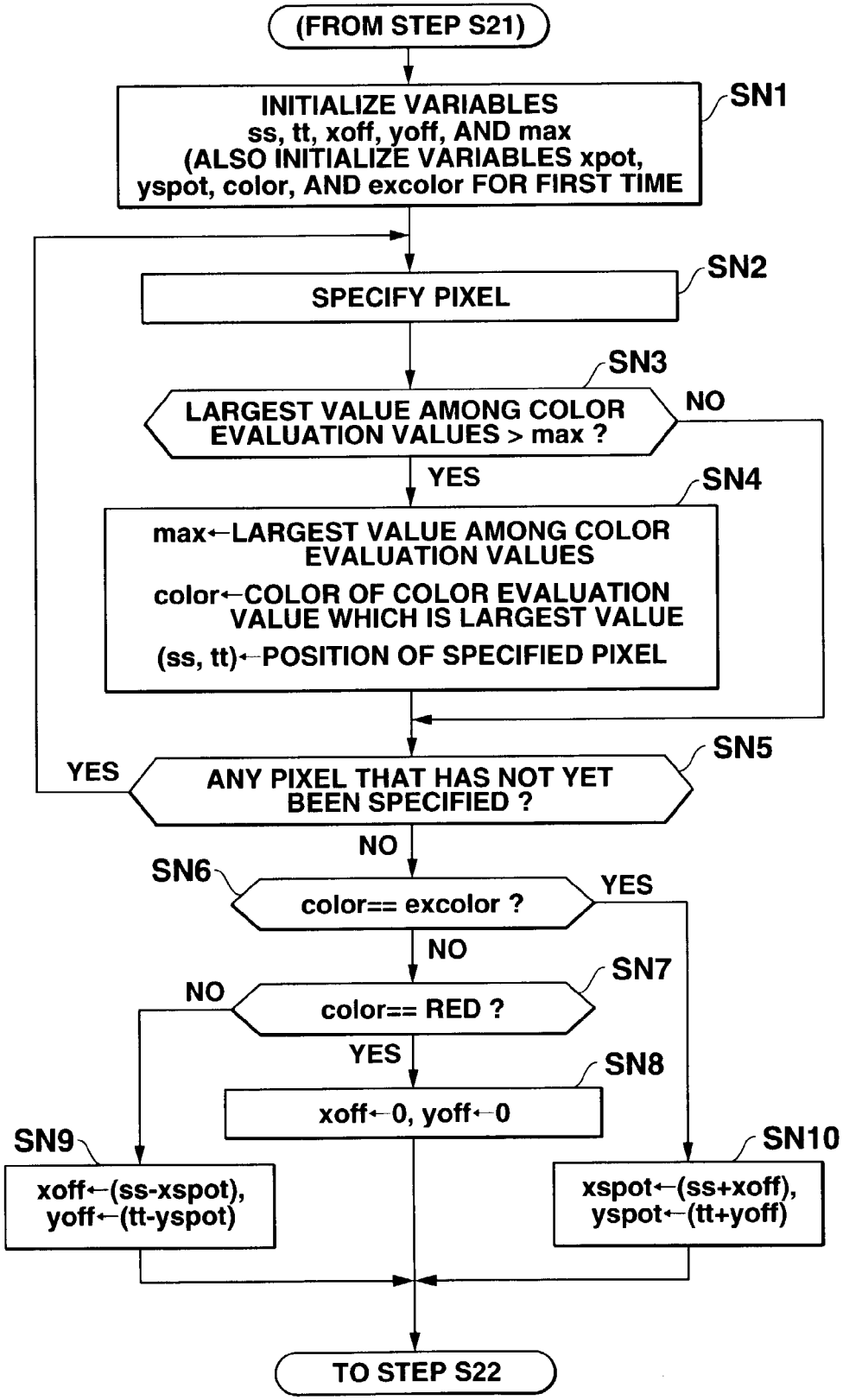
FIG. 38 is a flowchart showing a spotlight extraction process.

In the case where the position on the display screen of the display unit 3 that is irradiated by the spotlight emitted from the light emitting unit 4 varies in accordance with the selected color, the spotlight extraction unit 12A may perform a process shown in FIG. 38 as the spotlight extraction process, in order to correct the deviation of the position irradiated by the spotlight which is caused in accordance with colors. By performing this process, it is possible to avoid the above described problem caused by the deviation of the position irradiated by the spotlight caused in accordance with colors.

To facilitate understanding, it is assumed that the light emitting unit 4 has the structure for emitting spotlight having a color selected by the user from among red, green, and blue, in order to perform the process shown in FIG. 38. Further, it is assumed that the light emitting unit 4 does not emit blue spotlight directly after emitting green spotlight without emitting red spotlight, and does not emit green spotlight directly after emitting blue spotlight without emitting red spotlight (i.e., the order of emitting spotlights is green, red, and blue, or blue, red, and green).

When the spotlight extraction process shown in FIG. 38 is started, the spotlight extraction unit 12A declares usage of variables ss and tt which compose two-dimensional variable (ss, tt), a variable xoff, a variable yoff, and a variable max, and initializes those variables by substituting a value 0 for those variables (FIG. 38, step SN1).

Further, in the spotlight extraction process which is performed for the first time after the drawing system starts its operation, the spotlight extraction unit 12A further declares usage of variables $x_{spot}$ and $y_{spot}$ which compose two dimensional variable ($x_{spot}$, $y_{spot}$), a variable color, and a variable excolor, and initializes those variables in step SN1. Each of the variables color and excolor takes four values representing four colors, namely, black, red, green, and blue. The spotlight extraction unit 12A initializes the variables color and excolor by substituting a value representing black for the variables color and excolor.

Then, the spotlight extraction unit 12A specifies pixel data among pixel data composing the image data stored in the RAM 13, as pixel data representing a candidate of a spot (step SN2). However, in step SN2, a pixel which has once been specified as a candidate of a spot in step SN2 is not to be specified again.

Then, the spotlight extraction unit 12A obtains a red color evaluation value, a green color evaluation value, and a blue color evaluation value of the candidate of the spot represented by the specified pixel data. Then, the spotlight extraction unit 12A determines whether or not the largest value among the obtained red color evaluation value, green color evaluation value, and blue color evaluation value is greater than the present value of the variable max (step SN3). When determining that the largest value among the evaluation values is equal to or smaller than the variable max, the spotlight extraction unit 12A advances the flow to step SN5.

On the contrary, when determining that the largest value among the red color evaluation value, green color evaluation value, and blue color evaluation value is greater than the variable max, the spotlight extraction unit 12A updates the variable max to the largest value among the red color evaluation value, green color evaluation value, and blue color evaluation value which are newly obtained in step SN3 (step SN4).

Further, in step SN4, the spotlight extraction unit 12A updates the variable color to a value representing red if the largest value among the red color evaluation value, green color evaluation value, and blue color evaluation value is the red color evaluation value, updates the variable color to a value representing green if the largest value is the green color evaluation value, and updates the variable color to a value representing blue if the largest value is the blue color evaluation value.

Still further, in step SN4, the spotlight extraction unit 12A updates the variable ss to the value of the x axis direction component representing the position of the pixel most lately specified as the candidate of the spot in step SN2, and updates the variable tt to the value of the y axis direction component of this pixel.

Then, the spotlight extraction unit 12A determines whether or not there is any pixel that has not yet been specified as a candidate of the spot in step SN2 (step SN5). When determining that there is any such pixel, the spotlight extraction unit 12A returns the flow to step SN2. When determining that there is no such pixel, the spotlight extraction unit 12A advances the flow to step SN6.

In step SN6, the spotlight extraction unit 12A determines whether or not the variable color and the variable excolor represent the same color.

When determining that those variables represent different colors, the spotlight extraction unit 12A determines whether or not the variable color represents red (step SN7). When determining that the variable color represents red, the spotlight extraction unit 12A substitutes a value 0 for the variables xoff and yoff (step SN8), and advances the flow to step S22. On the contrary, when determining that the variable color does not represent red, the spotlight extraction unit 12A substitutes for the variable xoff, a value obtained by subtracting the variable $x_{spot}$ from the variable ss, and substitutes for the variable yoff, a value obtained by subtracting the variable $y_{spot}$ from the variable tt (step SN9), and advances the flow to step S22.

On the other hand, when determining in step SN6 that the variable color and the variable excolor represent the same color, the spotlight extraction unit 12A substitutes for the variable $x_{spot}$, the sum of the variable xoff and the variable ss, and substitutes for the variable $y_{spot}$, the sum of the variable yoff and the variable tt (step SN10), and advances the flow to step S22.

If both of the variable color and the variable excolor represent red, the variable xoff and the variable yoff are both 0. Therefore, in step SN10, the variable $x_{spot}$ becomes equal to the variable ss, and the variable $y_{spot}$ becomes equal to the variable tt.

The coordinates ($x_{spot}$, $y_{spot}$) represented by the variables $x_{spot}$ and $y_{spot}$ at the time the process of step S22 is started, represent the coordinates of the position of a pixel having the largest red color evaluation value, if the color of the spot extracted in the spotlight extraction process is red. If the color of the extracted spot is green (or blue), the variable $x_{spot}$ (or $y_{spot}$) represents a value obtained by adding the x axis direction component (or y axis direction component) of the coordinates of the position of a pixel having the largest green (or blue) color evaluation value, to an amount of deviation (caused when the color of the spotlight changes from red to green (or blue)) of the x axis direction component (or y axis direction component) of this pixel from the x axis direction component (or y axis direction component) of a red spot.

Fifth Embodiment

The position of the spot to be displayed on the display screen of the display unit 3 may not necessarily be determined based on the relative position of the extracted spot. A drawing system according to a fifth embodiment of the present invention where the position of the spot to be displayed is determined based on the latest position where a spot is displayed and velocity of a point irradiated by the spotlight, will now be explained.

Figure 39:
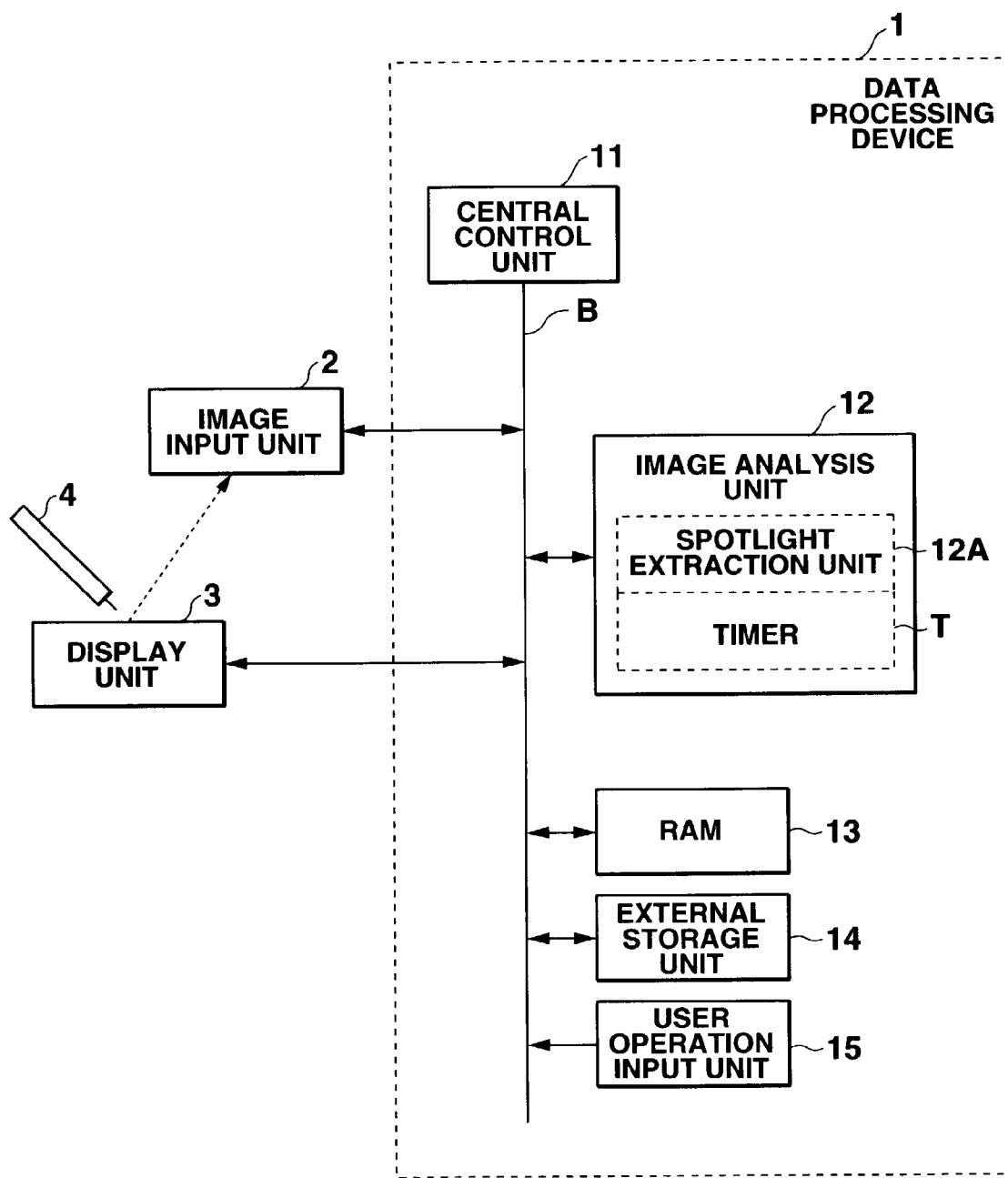
FIG. 39 is a diagram showing a structure of a drawing system according to a fifth embodiment of the present invention.

This drawing system has a structure shown in FIG. 39. That is, this drawing system has substantially the same physical structure as that shown in FIG. 2, except that it does not comprise the coordinate conversion unit 12B, but comprises a timer T constituted by a crystal oscillator, or the like. The timer T shown in FIG. 39 generates time information representing a current time, and successively supplies the time information to the spotlight extraction unit 12A.

The RAM 13 of this drawing system stores a variable locx, a variable locy, and variables xb and yb which compose two-dimensional variable (xb, yb). When the drawing system starts its operation, the central control unit 11 initializes those four variables by substituting a value 0 for those variables.

Figure 40:
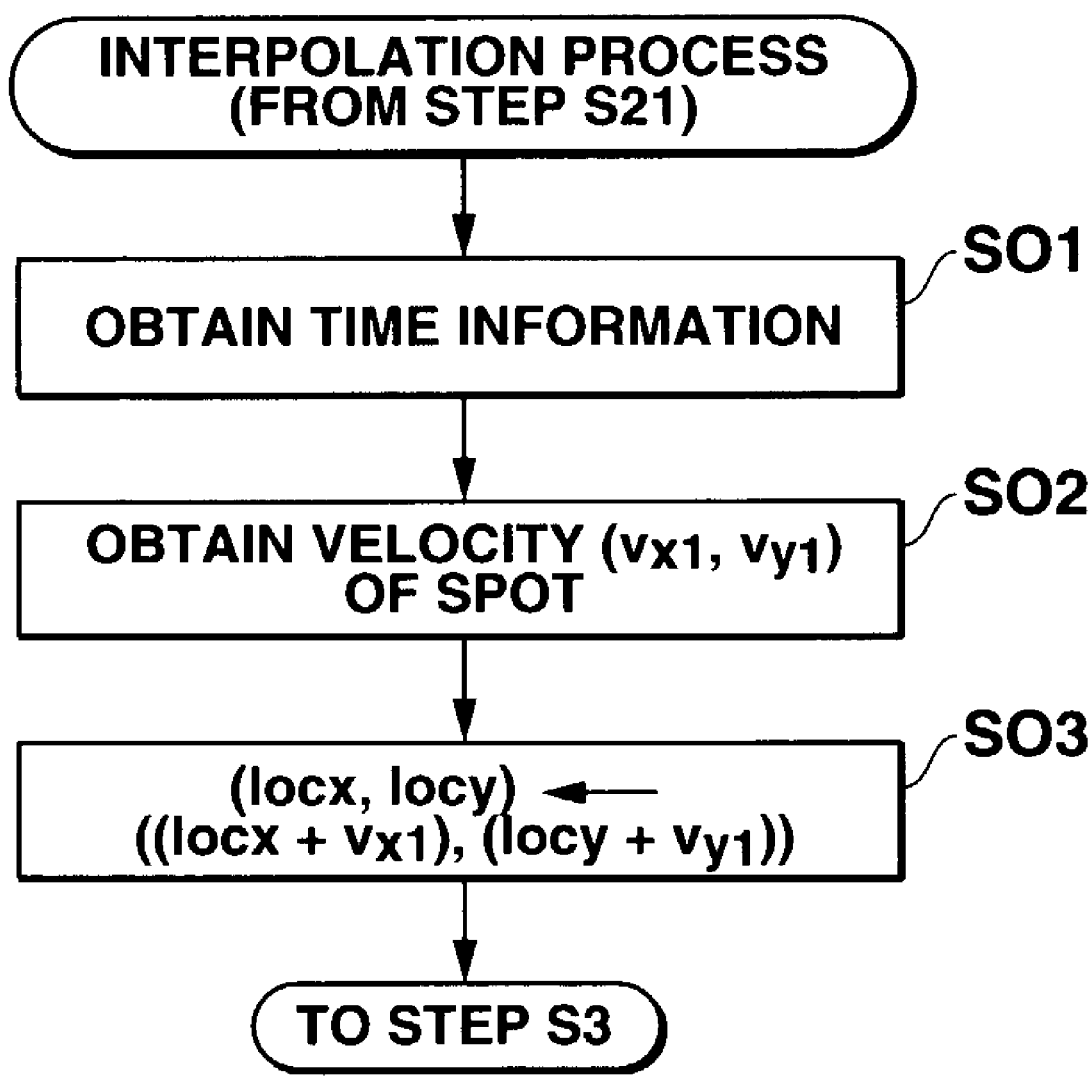
FIG. 40 is a flowchart showing an interpolation process.

When the spotlight extraction unit 12A completes the spotlight extraction process and thus obtains the coordinates ($x_{spot}$, $y_{spot}$), it performs an interpolation process shown in FIG. 40, before going to step S3. This drawing system does not perform the process of step S22, but directly goes to step S3, after completing the spotlight extraction process.

After obtaining the coordinates ($x_{spot}$, $y_{spot}$) in step S21, the spotlight extraction unit 12A obtains time information supplied from the timer T, before going to step S3 (step SO1). Then, spotlight extraction unit 12A stores the most lately obtained coordinates ($x_{spot}$, $y_{spot}$) and the most lately obtained time information in association with each other in the RAM 13.

Then, the spotlight extraction unit 12A reads out the variable $x_{spot}$, the variable $y_{spot}$, the variable xb, and the variable yb, calculates the right sides of equations 19 and 20 based on the read variables to obtain values $vx_1$ and $vy_1$ and stores the obtained values in the RAM 13 (step SO2). The values $vx_1$ and $vy_1$ represent an x axis direction component and y axis direction component of the velocity of the spot, at a current time at which a spot is most lately extracted.

$$vx_1 = N \cdot \{(x_{spot} - xb)/(t_1 - t_0)\} \quad \text{[Equation 19]}$$

(where N represents a predetermined invariable, $t_1$ represents a current time at which a spot is most lately extracted, and $t_0$ represents a current time at which a spot is second most lately extracted.)

$$vy_1 = N \cdot \{(y_{spot} - yb)/(t_1 - t_0)\} \quad \text{[Equation 20]}$$

Then, the spotlight extraction unit 12A increases the variable locx by an amount corresponding to the variable $vx_1$, and increases the variable locy by an amount corresponding to the variable $vy_1$ (step SO3) (However, if the values $vx_1$ and $vy_1$ are negative, the variables locx and locy are decreased.)

Further, in step SO3, the spotlight extraction unit 12A substitutes the coordinates ($x_{spot}$, $y_{spot}$) most lately extracted in step S21 for the two-dimensional variable (xb, yb). And if there is any time information that is associated with the two-dimensional variable (xb, yb), the spotlight extraction unit 12A updates this time information to time information which is associated with the newly substituted coordinates ($x_{spot}$, $y_{spot}$). If there is no time information associated with the two-dimensional variable (xb, yb), the spotlight extraction unit 12A newly associates the time information which is associated with the newly substituted coordinates ($x_{spot}$, $y_{spot}$), with the two-dimensional variable (xb, yb).

Then, the spotlight extraction unit 12A determines coordinates (locx, locy) represented by the variables locx and locy which have been increased or decreased, as the coordinates of the position on the display screen of the display unit 3 where the spot is to be displayed. By determining the coordinates of the display position of the spot in this way, it becomes unnecessary to perform calibration at the absolute position of the spot.

Figure 41:
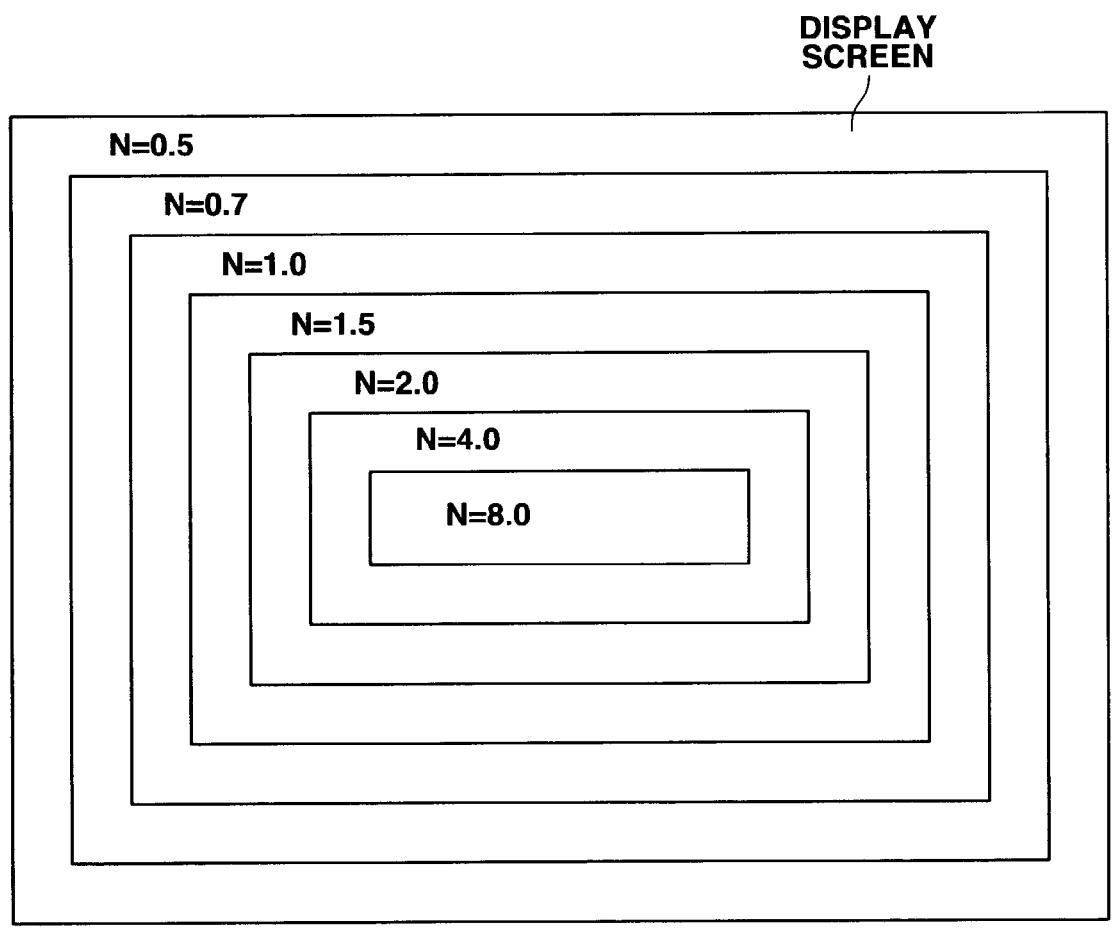
FIG. 41 is a diagram showing relationship between a position on a display screen and a value of a function N.

The aforementioned value N may not necessarily be an invariable, but may be a function of at least one of the variable $x_{spot}$ and the variable $y_{spot}$. Accordingly, in a case where the value N represents a function N($x_{spot}$, $y_{spot}$) of the variables $x_{spot}$ and $y_{spot}$, the value of the function N($x_{spot}$, $y_{spot}$) may become larger, as the position represented by the coordinates ($x_{spot}$, $y_{spot}$) becomes closer to the center of the display screen whose image is to be taken by the image input unit 2, as shown in FIG. 41.

Modified Version of Fifth Embodiment

The position and shape of the spot to be displayed on the display screen of the display unit 3 may be determined based on the position occupied by the light emitting portion of the light emitting unit 4 in the space. By doing so, it is possible to display a track of spots which imitatively reproduces the touch of a writing brush (or other writing implements whose tip changes its shape in accordance with the change of strength of brushstroke), on the display screen of the display unit 3.

Figure 42:
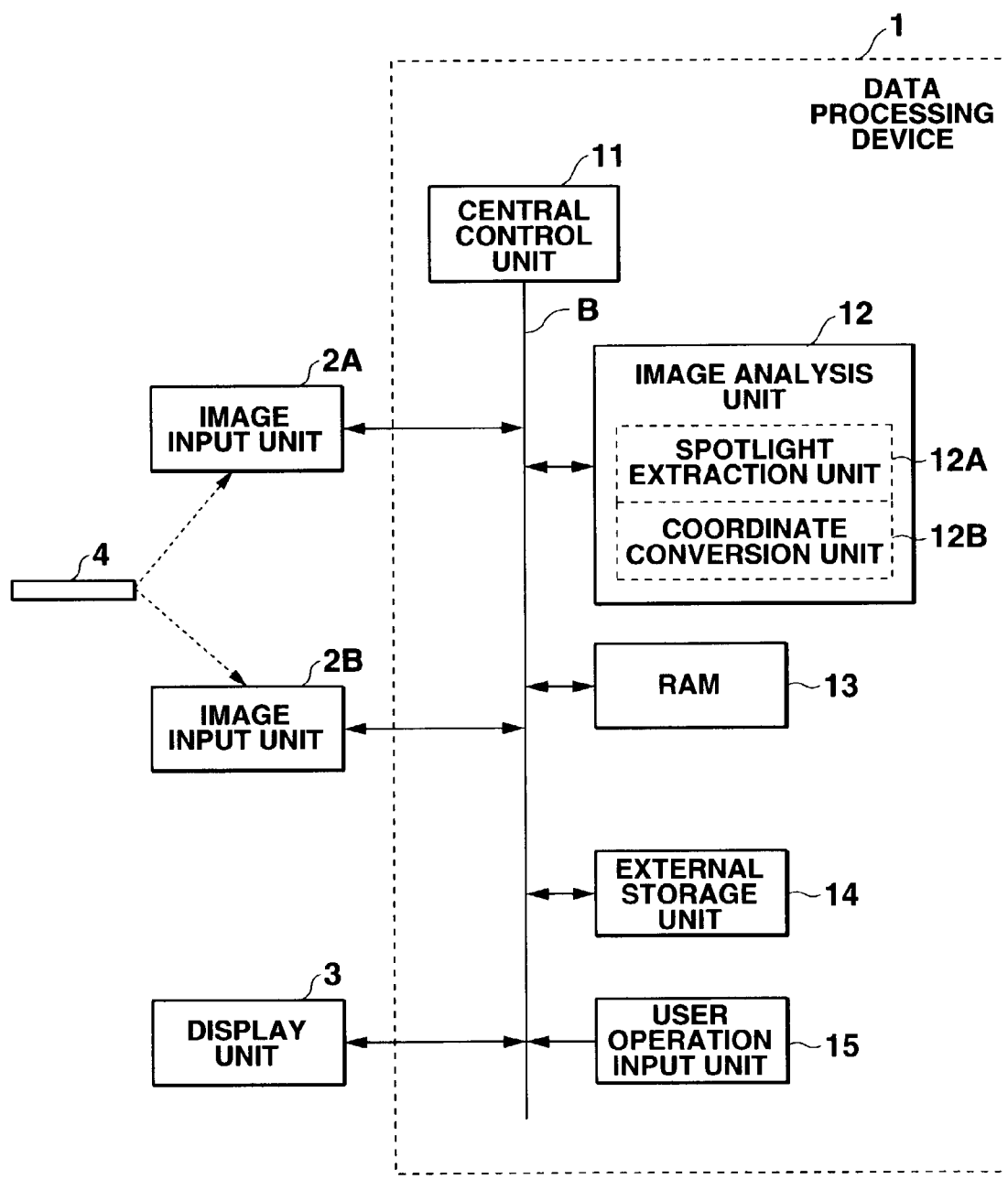
FIG. 42 is a diagram showing a structure of a modified example of the drawing system according to the fifth embodiment of the present invention.
Figure 43:
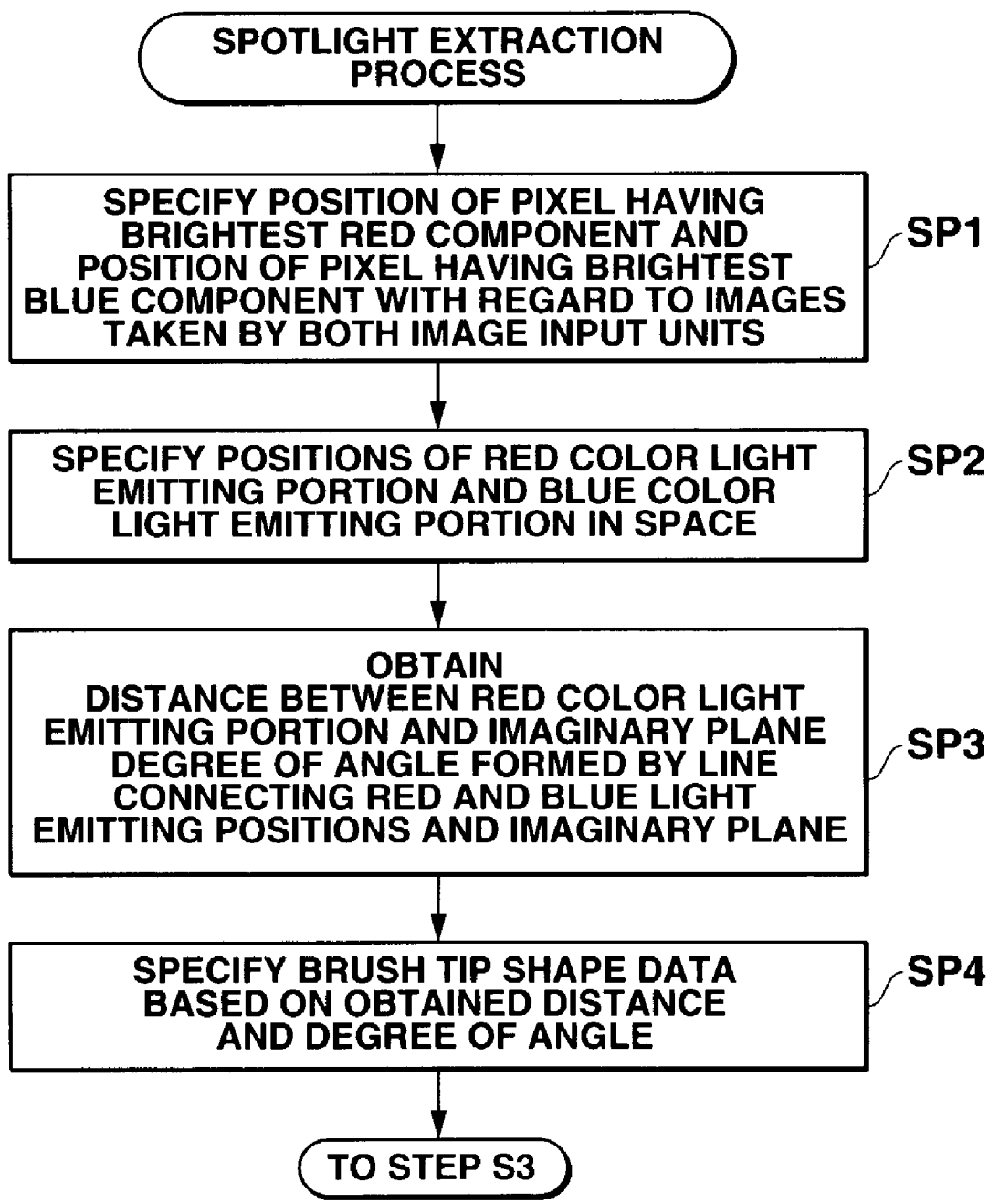
FIG. 43 is a flowchart showing a spotlight extraction process.

In order to display a track of spots imitatively reproducing the touch of a writing brush on the display screen of the display unit 3, the drawing system may comprise a structure shown in FIG. 42, and may perform a process shown in FIG. 43 as the spotlight extraction process.

Figure 44:
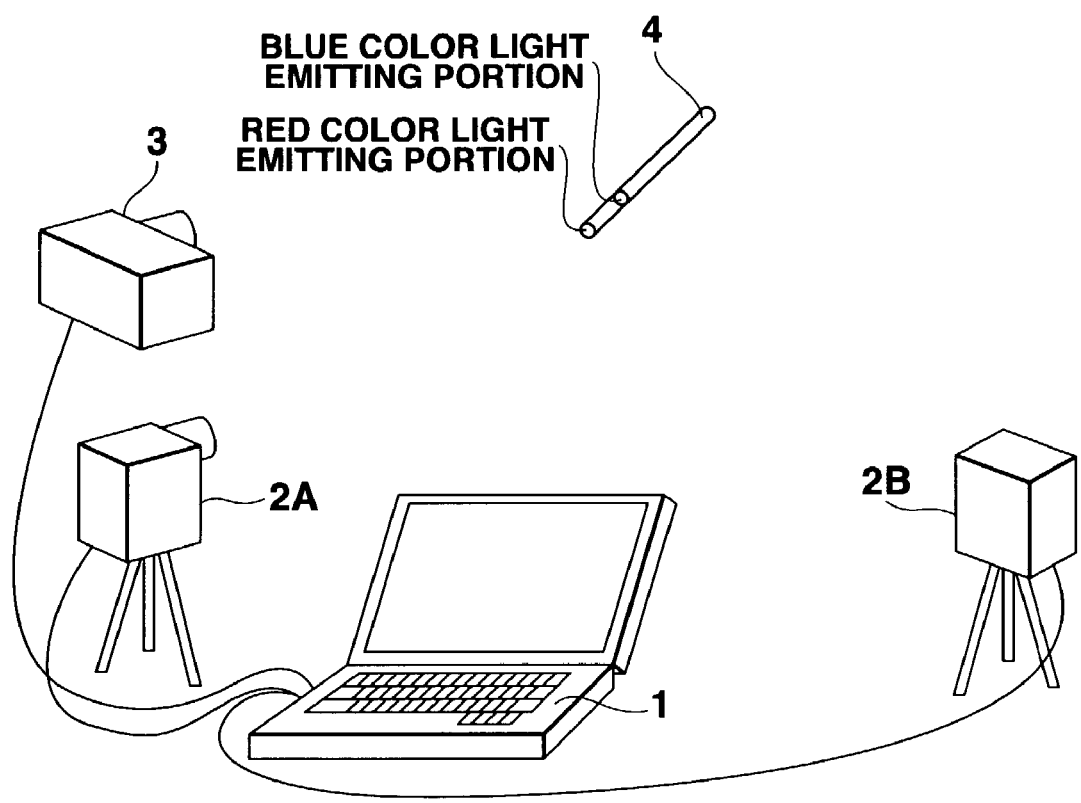
FIG. 44 is a diagram exemplarily showing configuration of the elements included in the drawing system shown in FIG. 42.

As shown in FIG. 42, the drawing system comprises an image input unit 2A and image input unit 2B which have substantially the same structure as each other, instead of the image input unit 2. Both of the image input unit 2A and image input unit 2B have substantially the same structure as that of the image input unit 2, and are positioned so as to share view, as shown in FIG. 44.

In the process of step S1, the image input units 2A and B take images of the same view, generate image data representing the taken images, and supply the image data to the central control unit 11 of the data processing device 1. The central control unit 11 receives the two image data respectively from the image input unit 2A and the image input unit 2B, and stores the two image data in the RAM 13.

The light emitting unit 4 comprises a red color light emitting portion which is made of a red color light emitting diode, etc., and emits red color light, and a blue color light emitting portion which is made of a blue color light emitting diode, etc., and emits blue color light. A line that connects the red color light emitting portion and the blue color light emitting portion represents an axis of a virtual writing implements.

The external storage unit 14 pre-stores data representing shape of a tip of a writing brush (referred to as brush tip shape data). The brush tip shape data is data representing a shape of a spot to be displayed on the display screen of the display unit 3.

Figures 45, 46:
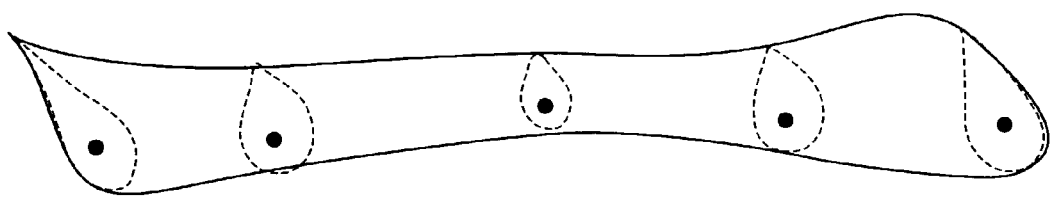
FIG. 45 is a diagram exemplarily showing data structure of brush tip shape data.
FIG. 46 is a diagram exemplarily showing a track of spots displayed by the drawing system shown in FIG. 42.

FIG. 45 is a diagram showing examples of data structures of the brush tip shape data. As shown in FIG. 45, the brush tip shape data is associated with a distance between the red color light emitting portion of the light emitting unit 4 and an imaginary plane in the space, and degree of an angle formed by the line connecting the red color light emitting portion and the blue color light emitting portion and this imaginary plane. Only one shape of a spot can be specified by specifying the distance and degree of angle.

When the spotlight extraction process is started, the spotlight extraction unit 12A of the drawing system shown in FIG. 42 applies substantially the same processes as the aforementioned steps SG1 to SG12 to both of the image data supplied form the image input unit 2A and the image data supplied from the image input unit 2B (FIG. 43, step SP1).

However, in step SP1, the spotlight extraction unit 12A need not to use the variable Gm and the variable Gx, and need not to perform processes corresponding to steps SG6 to SG8.

When the spotlight extraction unit 12A applies processes corresponding to steps SG1 to SG12 to the image data supplied from the image input unit 2A, it uses a variable RxA, a variable RyA, and a variable RmA in place of the variable Rx, the variable Ry, and the variable Rm, and uses a variable BxA, a variable ByA, and a variable BmA in place of the variable Bx, the variable By, and the variable Bm.

When the spotlight extraction unit 12A applies processes corresponding to steps SG1 to SG12 to the image data supplied from the image input unit 2B, it uses a variable RxB, a variable RyB, a variable RmB, a variable BxB, a variable ByB, and a variable BmB in place of the variable Rx, the variable Ry, the variable Rm, the variable Bx, the variable By, and the variable Bm.

The variables RxA and RyA obtained at the time the process of step SP1 is completed represent the x axis direction component and y axis direction component representing the position of a pixel having the brightest red component among pixels included in the image data supplied from the image input unit 2A, and the variable RmA represents the red color evaluation value of this pixel. The variables BxA and ByA represent the x axis direction component and y axis direction component representing the position of a pixel having the brightest blue component among pixels included in the image data supplied from the image input unit 2A, and the variable BmA represents the blue color evaluation value of this pixel.

The variables RxB and RyB obtained at the time the process of step SP1 is completed represent the x axis direction component and y axis direction component representing the position of a pixel having the brightest red component among pixels included in the image data supplied from the image input unit 2B, and the variable RmB represents the red color evaluation value of this pixel. The variables BxB and ByB represent the x axis direction component and y axis direction component representing the position of a pixel having the brightest blue component among pixels included in the image data supplied from the image input unit 2B, and the variable BmB represents the blue color evaluation value of this pixel.

Next, the spotlight extraction unit 12A specifies the position of the red color light emitting portion of the light emitting unit 4 in the space, at the time the image input units 2A and 2B take the images, based on the variables RxA, RyA, RxB, and RyB (step SP2). Further, in step SP2, the spotlight extraction unit 12A specifies the position of the blue color light emitting portion of the light emitting unit 4 in the space, at the time the image input units 2A and 2B take the images, based on the variables BxA, ByA, BxB, and ByB.

Then, the spotlight extraction unit 12A obtains a distance between an imaginary plane in the space and the red color light emitting portion, and degree of an angle formed by this imaginary plane and the line connecting the red color light emitting portion and the blue color light emitting portion, based on the positions of the red color light emitting portion and the blue color light emitting portion specified in step SP2 (step SP3).

Then, the spotlight extraction unit 12A specifies brush tip shape data which is associated with the distance and degree of angle obtained in step SP3, among brush tip shape data stored in the external storage unit 14 (step SP4).

The brush tip shape data specified in step SP4 represents the shape of the virtual brush tip of the light emitting unit 4 at the time the image input units 2A and 2B takes the images. In step S3, the central control unit 11 displays a spot having a shape represented by the brush tip shape data specified in step SP4 at the display position of the spot. As a result, for example, a track of spots reproducing the touch of the brush shown in FIG. 46 is displayed on the display screen of the display unit 3.

Sixth Embodiment

In the drawing system according to the sixth embodiment of the present invention, the light emitting unit 4 may send data representing whether or not it is emitting light, and the data processing device 1 may receive this data and detect whether or not a spot is formed based on the received data. In the drawing system performing such an operation, the spotlight extracting action and the spot displaying action may not incorrectly be performed, when the light emitting unit 4 does not emit light. The drawing system according to the sixth embodiment where such an operation is performed will now be explained.

Figure 47:
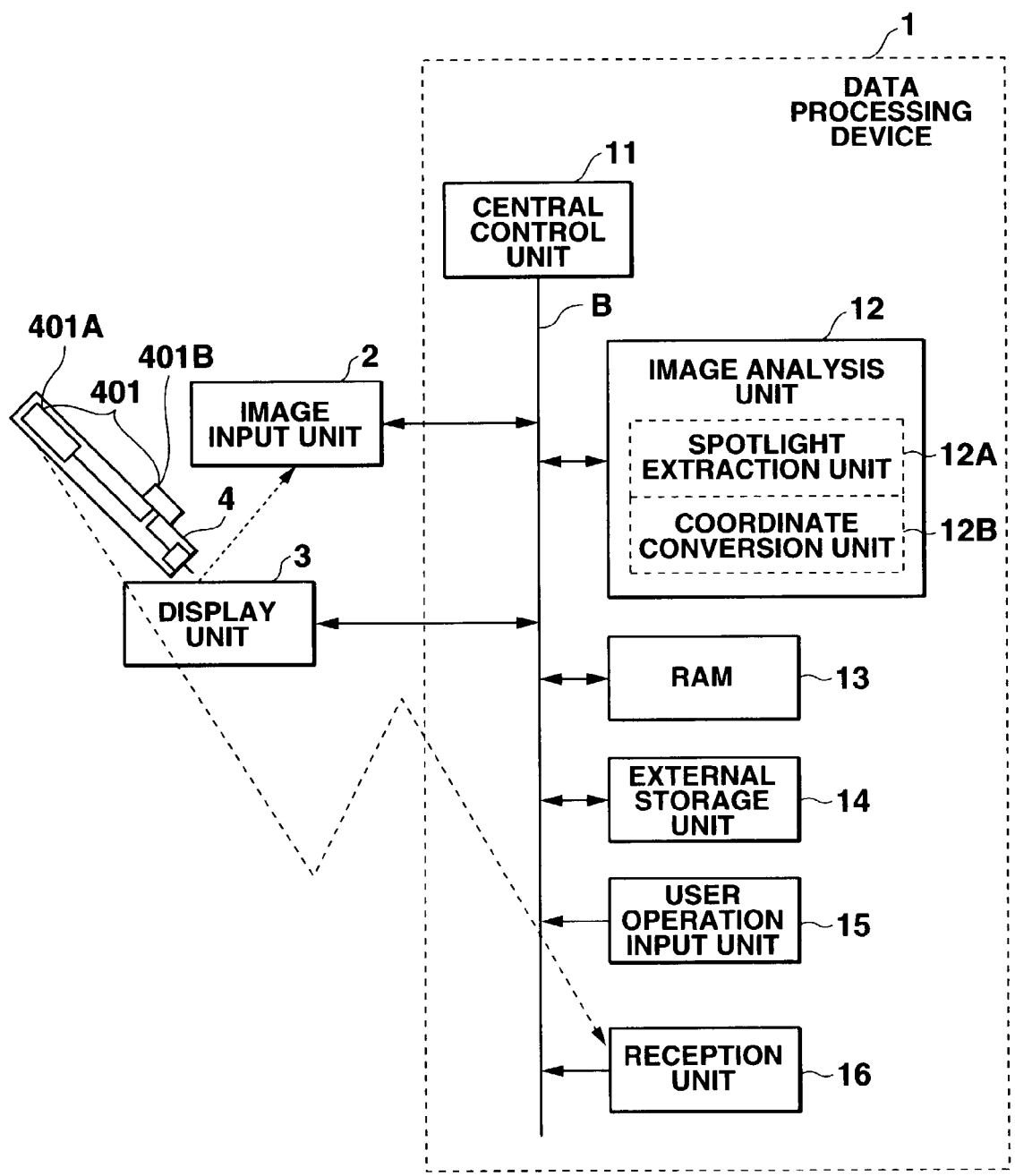
FIG. 47 is a diagram showing a structure of a drawing system according to a sixth embodiment of the present invention.

This drawing system has a structure shown in FIG. 47. That is, this drawing system has substantially the same physical structure as that shown in FIG. 2. Further, the light emitting unit 4 comprises a sending unit 401, and the data processing device 1 comprises a reception unit 16. The light emitting portion of the light emitting unit 4 turns on or off the light in accordance with an operation of the user.

As illustrated, the sending unit 401 of the light emitting unit 4 comprises a wireless sending unit 401A and a switch 401B for switching on/off the light emitting portion of the light emitting unit 4. When the user operates the switch 401B and switches on (or off) the light emitting portion, the wireless sending unit 401A sends data representing that the light emitting portion is switched on (or off) by radio, in response to the user's operation. However, the wireless sending unit 401A may not send one of data representing that the light emitting portion is switched on and data representing that the light emitting portion is switched off.

The reception unit 16 of the data processing device 1 comprises a wireless receiver, for example, and receives data representing that the light emitting portion is switched on (or off) from the sending unit 401 of the light emitting unit 4, and supplies the received data to the central control unit 11.

While the reception unit 16 is not receiving data representing the light emitting portion is switched on (or off), it may supply data representing that the light emitting portion is switched off (or on) to the central control unit 11. Or, while the central control unit 11 is not receiving data representing that the light emitting portion is switched on (or off) from the reception unit 16, it may determine that the light emitting portion is switched off (or on).

The operation of the drawing system shown in FIG. 47 is substantially the same as that of the drawing system according to the first embodiment. However, the central control unit 11 according to the present embodiment supplies information representing whether or not the light emitting unit 4 is emitting light to the spotlight extraction unit 12A, based on the data supplied from the reception unit 16. The spotlight extraction unit 12A determines whether or not the information supplied from the central control unit 11 represents that the light emitting unit 4 is emitting light. When the information does not represent so, the spotlight extraction unit 12A does not perform extraction of the coordinates ($x_{spot}$, $y_{spot}$).

The coordinate conversion unit 12B does not perform determination of the coordinates ($x_{disp}$, $y_{disp}$) while the coordinates ($x_{spot}$, $y_{spot}$) is not extracted. In the case where the coordinates ($x_{disp}$, $y_{disp}$) are not determined, the central control unit 11 controls the display unit 3 not to display a spot.

Seventh Embodiment

Next, the drawing system according to the seventh embodiment of the present invention will be explained.

Figure 48:
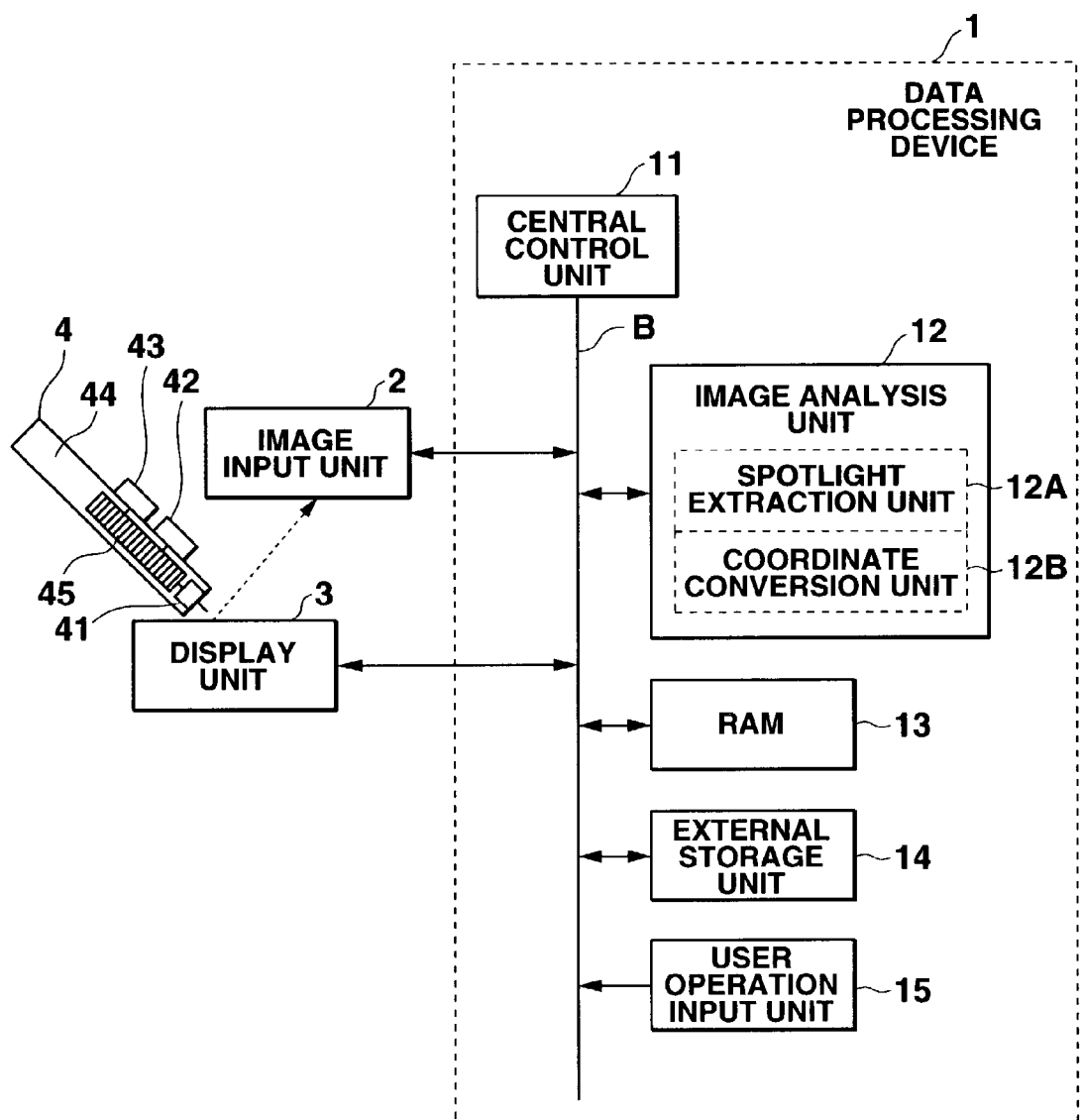
FIG. 48 is a diagram showing a structure of a drawing system according to a seventh embodiment of the present invention.

As shown in FIG. 48, this drawing system has substantially the same physical structure as that shown in FIG. 2, except the light emitting unit 4.

The light emitting unit 4 of the drawing system shown in FIG. 48 comprises a light emitting element 41 made of a light emitting diode, etc., a lighting switch 42, a brightness increasing switch 43, a main body 44, and a light emitting element drive circuit 45.

The main body 44 is formed like a stick having both ends. The light emitting element 41 is fixed on one end of the main body 44. The lighting switch 42 and the brightness increasing switch 43 are fixed on the side of the main body 44. The light emitting element drive circuit 45 is embedded inside the main body 44. The light emitting element 41, the lighting switch 42, and the brightness increasing switch 43 are connected to the light emitting element drive circuit 45.

The light emitting element 42 goes into one of three states, namely, a "non-lighting state", a "lighting-in-high-brightness state", and a "lighting-in-low-brightness state", in accordance with a user's operation of the lighting switch 42 and the brightness increasing switch 43.

Specifically, when the user operates the lighting switch 42 and instructs switch-on of the light emitting element 41, the light emitting element drive circuit 45 drives the light emitting element 41 to emit light in response to this instruction. When the user operates the brightness increasing switch 43 and gives an instruction to switch on the light emitting element 41 in high brightness, the light emitting element drive circuit 45 drives the light emitting element 41 in response to this instruction, so as to cause the light emitting element 41 to emit light having brightness higher than when light emission in high brightness is not instructed. When the user operates the lighting switch 42 and the brightness increasing switch 43 at a same time, the light emitting element drive circuit 45 keeps the state of the light emitting element 41 as it has been before the time the user's operation to the both switches are started.

Further, when the user operates the brightness increasing switch 43 to give an instruction to switch on the light emitting element 41 in high brightness while the light emitting element 41 is already emitting light in accordance with a user's prior operation, the light emitting element drive circuit 45 may drive the light emitting element 41 to emit light in higher brightness than when light emission in high brightness is not instructed.

Figure 49:
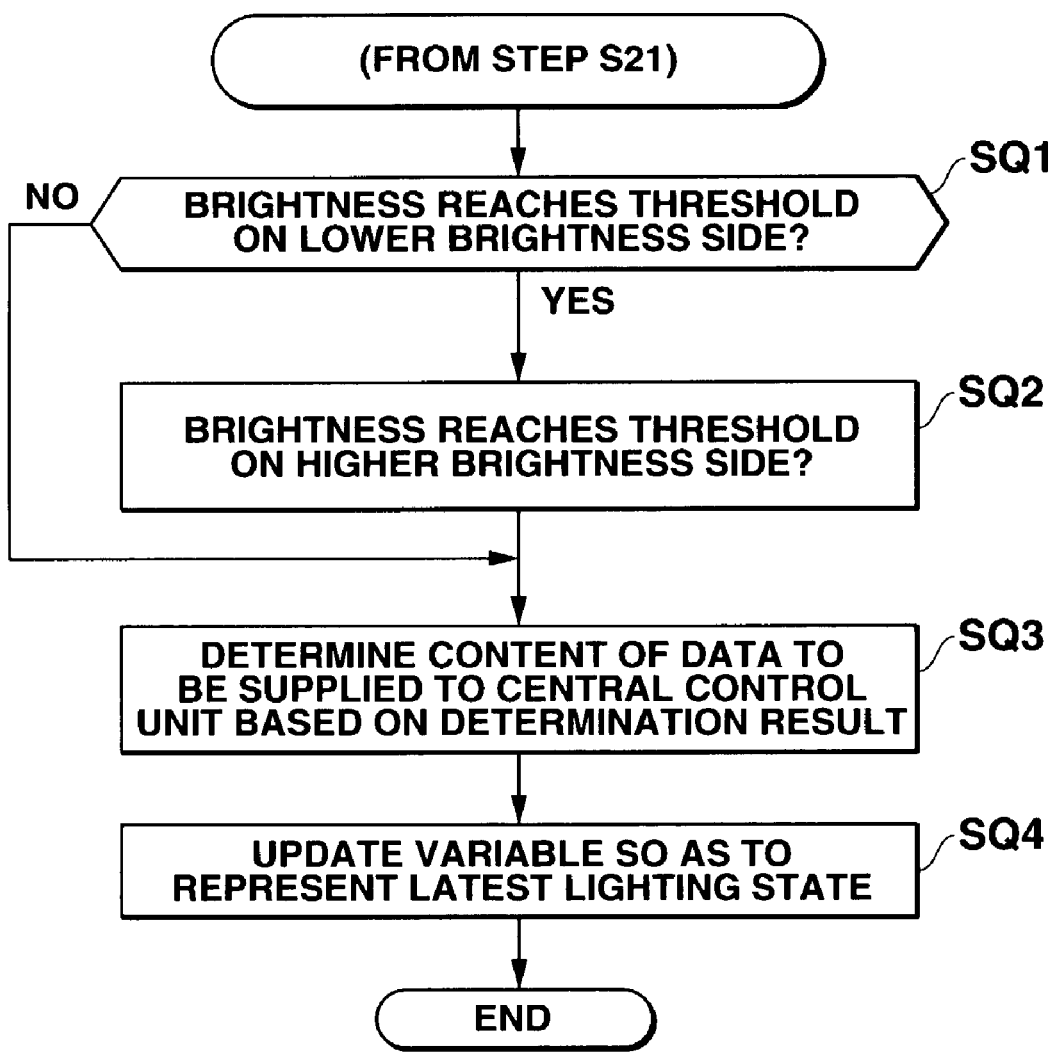
FIG. 49 is a flowchart showing a process performed by the drawing system shown in FIG. 48.

The drawing system shown in FIG. 48 (or any drawing system having the structure shown in FIG. 48 except the light emitting unit 4, and its light emitting unit 4 has a structure for emitting light having two stages of brightness) may perform a process shown in FIG. 49, after completing the process of step S21 and before performing the process of step S3.

Specifically, after the brightness $R_{max}$ of the spot is obtained in step S21, the spotlight extraction unit 12A determines whether or not the brightness $R_{max}$ reaches a predetermined threshold on the lower brightness side for determining switch on or switch off of the light emitting element 4 (FIG. 49, step SQ1).

Further, in the spotlight extraction process performed for the first time after the drawing system starts its operation, the spotlight extraction unit 12A declares usage of a variable STAT, and initializes this variable in step SQ1. The variable STAT takes three values representing three lighting states (namely, the "non-lighting state", the "lighting-in-high-brightness state", and the "lighting-in-low brightness state"). The spotlight extraction unit 12A initializes the variable STAT by substituting a value representing the non-lighting state of the light emitting unit 4 for the variable STAT.

When determining in step SQ1 that the brightness $R_{max}$ does not reach the threshold on the lower brightness side, the spotlight extraction unit 12A determines that the light emitting unit 4 is not switched on, and advances the flow to step SQ3.

On the contrary, when determining that the brightness $R_{max}$ reaches the threshold on the lower brightness side, the spotlight extraction unit 12A determines whether or not the brightness Rmax reaches a threshold on the higher brightness side for determining level (high/low) of the brightness of the light emitting unit 4 (step SQ2). When determining that the brightness $R_{max}$ does not reach the threshold on the higher brightness side, the spotlight extraction unit 12A determines that the light emitting unit 4 emits light in lower brightness and advances the flow to step SQ3. When determining that the brightness $R_{max}$ reaches the threshold on the higher brightness side, the spotlight extraction unit 12A determines that the light emitting unit 4 emits light in high brightness and advances the flow to step SQ3.

In step SQ3, the spotlight extraction unit 12A determines a content of data to be supplied to the central control unit 11, based on the latest lighting state of the light emitting unit 4 determined in step SQ1 or SQ2 (that is, whether or not it is switched on, or whether it is emitting light in low or high brightness) and the closest prior lighting state of the light emitting unit 4 which is represented by the variable STAT. Then, the spotlight extraction unit 12A supplies data including the determined content to the central control unit 11.

Specifically, in a case where the prior lighting state represented by the variable STAT is the non-lighting state, if the latest lighting state is the non-lighting state or the lighting-in-low-brightness state, the spotlight extraction unit 12A determines not to supply data to the central control unit 11. In a case where the prior lighting state is the non-lighting state and the latest lighting state is the lighting-in-higher-brightness state, the spotlight extraction unit 12A supplies data representing the light emitting unit 4 starts emitting light in high brightness, to the central control unit 11.

In a case where the prior lighting state is the lighting-in-low-brightness state and the latest lighting state is the non-lighting state, the spotlight extraction unit 12A determines not to supply data to the central control unit 11. In a case where both the prior and latest lighting states are the lighting-in-low-brightness state, the spotlight extraction unit 12A performs the aforementioned processes of steps SO1 to SO3. Then, the spotlight extraction unit 12A determines the coordinates (locx, locy) obtained as the result of steps SO1 to SO3 as the coordinates of the display position of the spot on the display screen of the display unit 3, and supplies the obtained coordinates to the central control unit 11.

In a case where the prior lighting state is the lighting-in-high-brightness state and the latest lighting state is the non-lighting state or the lighting-in-low-state, the spotlight extraction unit 12A supplies data representing that the light emitting unit 4 finishes emitting light in high brightness to the central control unit 11. In a case where both of the prior and latest lighting states are the lighting-in-high-brightness state, the spotlight extraction unit 12A performs the processes of steps SO1 to SO3, and supplies the obtained coordinates (locx, locy) to the central control unit 11.

When supplied with the coordinates (locx, locy), the central control unit 11 controls the display unit 3 to display a spot at the position represented by the coordinates (locx, locy) in step S3.

When supplied with the data representing that the light emitting unit 4 starts (or finishes) emitting light in, high brightness, the central control unit 11 may determine the content of a process to be performed, based on the lighting state represented by the supplied data.

For example, in order to make the light emitting unit 4 function as a mouse, the central control unit 11 may determine that a button of the mouse is depressed when it is supplied with data representing that the light emitting unit 4 starts emitting light in high brightness, and may determine that the button of the mouse is released from depression when it is supplied with data representing that the light emitting unit 4 finishes emitting light in high brightness. The central control unit 11 may determine the content of a process to be performed after this determination, based on the determination result.

When the process of step SQ3 is completed, the spotlight extraction unit 12A updates the variable STAT so that it represents the latest lighting state (step SQ4).

Figure 50:
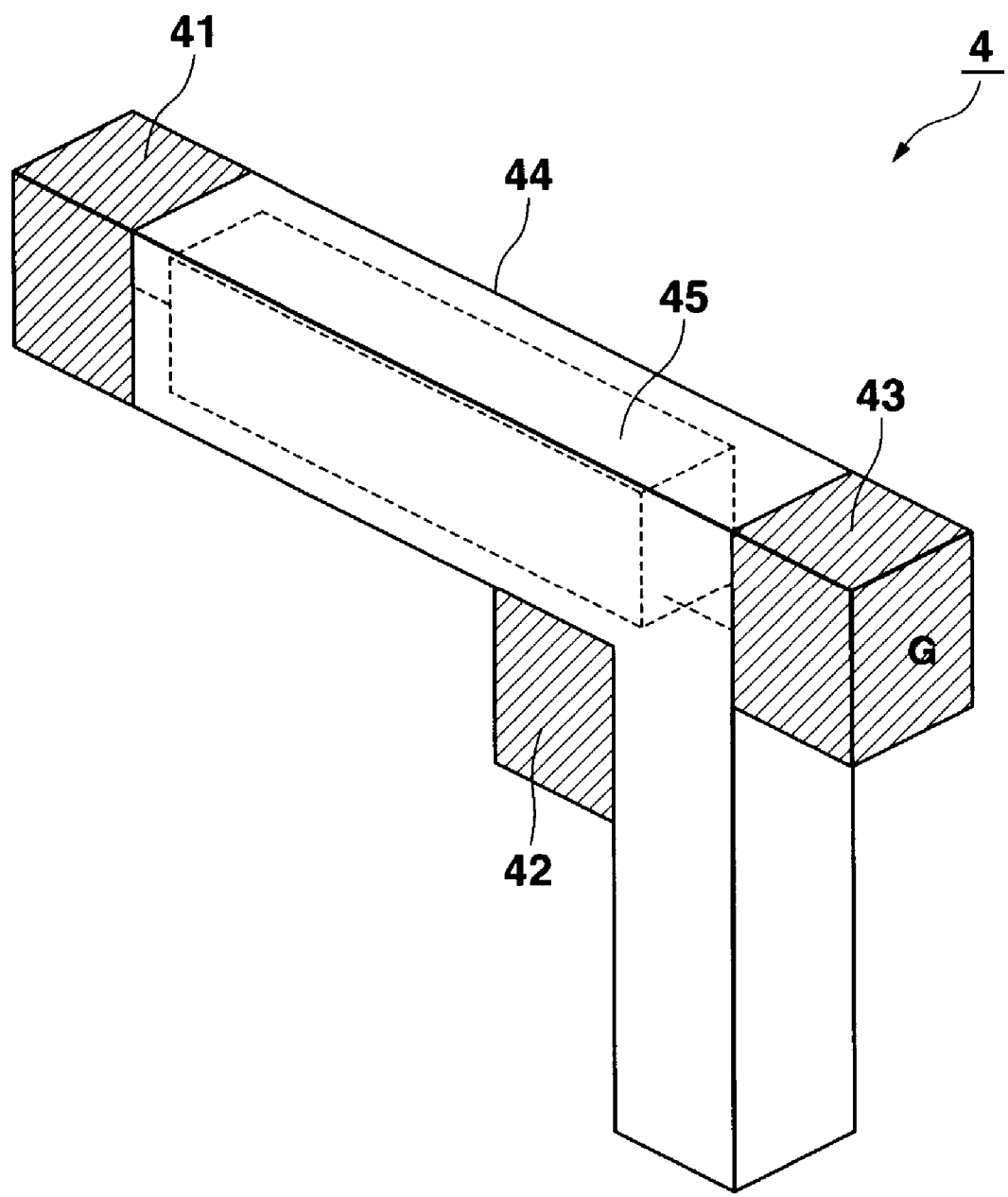
FIG. 50 is a diagram exemplarily showing a modified example of the light emitting unit.

The shape of the light emitting unit 4 is arbitrary. Accordingly, the light emitting unit 4 may have a pistol shape, as shown in FIG. 50. In this case, the light emitting element 41 may be positioned at the muzzle portion, as illustrated. The lighting switch 42 may be positioned at the trigger portion of the pistol. The brightness increasing switch 43 may be positioned at the hammer portion of the pistol. The light emitting element drive circuit 45 may be positioned inside the barrel of the pistol as illustrated, or may be positioned inside the grip of the pistol.

The light emitting unit 4 shown in FIG. 50 may be operated smoothly if the operator holds the grip of this pistol-shaped object, operates the lighting switch 42 with his/her index finger or middle finger, and operates the brightness increasing switch 43 with his/her thumb.

Figure 51:
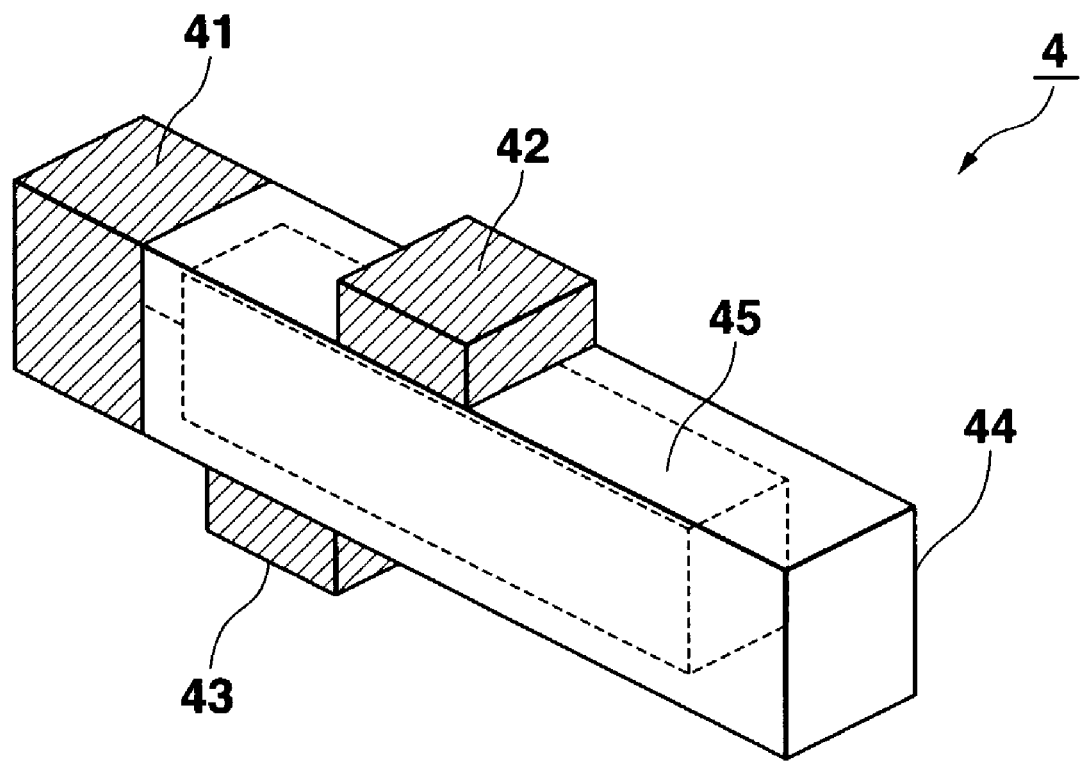
FIG. 51 is a diagram exemplarily showing a modified example of the light emitting unit.

The light emitting portion 4 may have a shape shown in FIG. 51. As illustrated, the light emitting element 41 may be positioned at one end of the stick-like main body 44, and the lighting switch 42 and the brightness increasing switch 43 may be positioned on the sides of the main body 44 so as to sandwich the main body 44.

Figure 52:
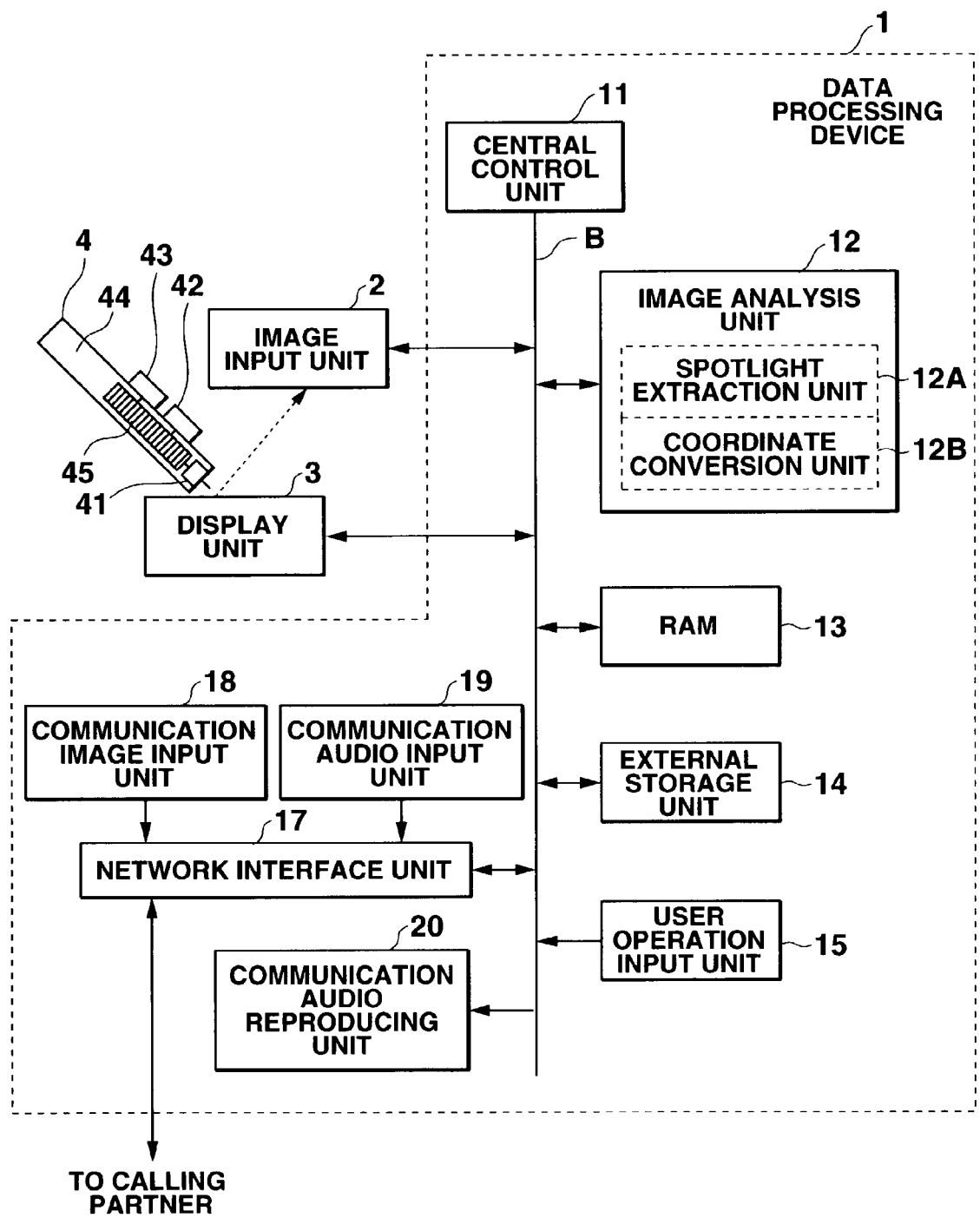
FIG. 52 is a diagram showing a structure of a modified example of the drawing system according to the seventh embodiment of the present invention.

As shown in FIG. 52, the drawing system shown in FIG. 48 may further comprise a network interface unit 17, a communication image input unit 18, a communication audio input unit 19, and a communication audio reproducing unit 20, in order to function as a television phone.

The network interface unit 17, the communication image input unit 18, the communication audio input unit 19, and the communication audio reproducing unit 20 perform later-described processes. The network interface unit 17 is constituted by a modem, a terminal adapter, or the like which gains connection to an external calling partner, through an external communication line, such as a telephone line. The communication image input unit 18 is constituted by a CCD (Charge Coupled Device) camera, or the like. The communication audio input unit 19 is constituted by a microphone, and AF (Audio Frequency) amplifier, etc. The communication audio reproducing unit 20 is constituted by a speaker and an AF amplifier, etc.

The drawing system shown in FIG. 52 performs processes shown in FIGS. 53A to 53D, in order to function as a television phone.

The central control unit 11 obtains image data supplied from the communication image input unit 18 (FIG. 53A, step SR1), and compresses the obtained image data to send the data to the calling partner through the network interface unit 17 (step SR2). Then, the central control unit 11 controls the display unit 3 to display a smaller-sized image (an image of the user's side) which is obtained by size-reducing the image represented by the image data which is sent to the calling partner, as shown in FIG. 54 (step SR3).

Figure 53A:
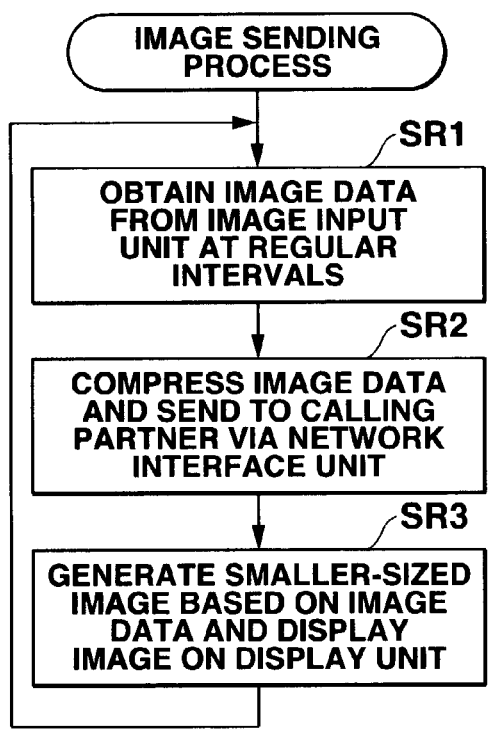
FIGS. 53A to 53D are flowcharts showing processes performed by the drawing system shown in FIG. 52.
Figure 53B:
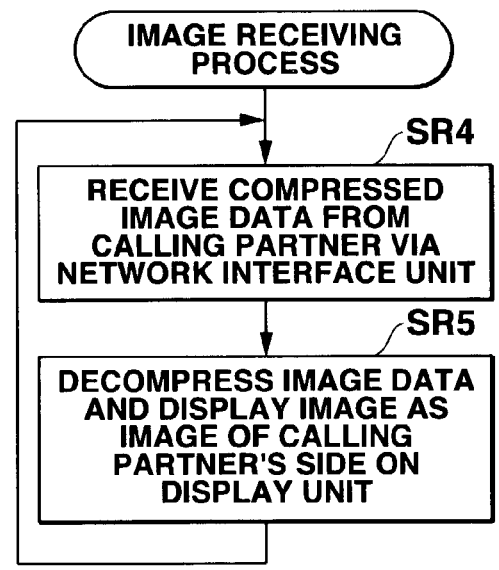
Figure 53C:
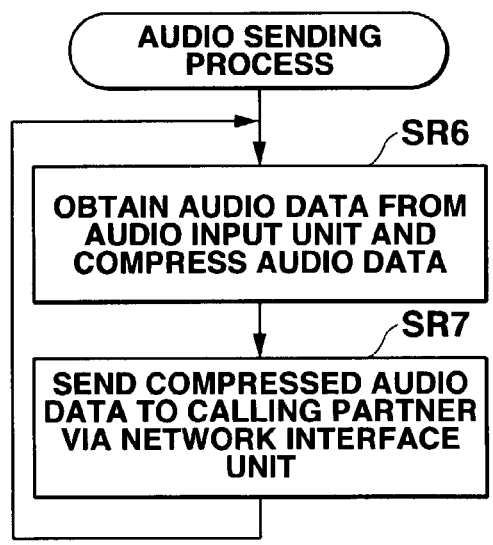

When compressed image data is supplied to the central control unit 11 from the calling partner through the network interface unit 17, the central control unit 11 obtains this image data (FIG. 53B, step SR4). Then, the central control unit 11 decompresses the obtained image data, and controls the display unit 3 to display an image (an image of the calling partner's side) represented by the decompressed image data, as shown in FIG. 54 (step SR5).

Further, the central control unit 11 obtains audio data supplied from the communication audio input unit 19 (FIG. 53C, step SR 6), compresses the obtained audio data, and sends it to the calling partner via the network interface unit 17 (step SR7).

Figure 53D:
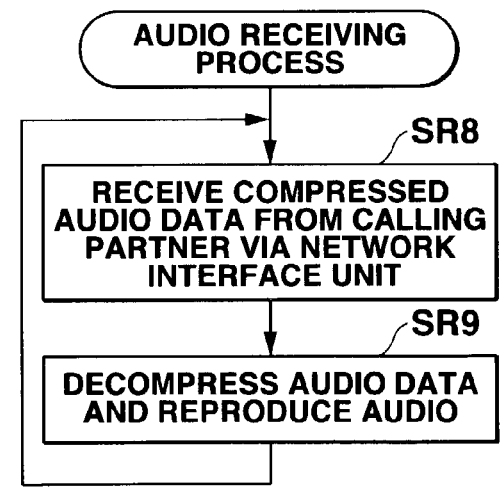

When compressed audio data is supplied to the central control unit 11 from the calling partner via the network interface unit 17, the central control unit 11 obtains this audio data (FIG. 53D, step SR8). Then, the central control unit 11 decompresses the obtained audio data, and controls the communication audio reproducing unit 20 to reproduce the audio represented by the decompressed audio data (step SR9).

The central control unit 11 controls the display unit 3 to further display a mike volume turning up button, a mike volume turning down button, a calling partner's volume turning up button, a calling partner's volume turning down button, an image recording button, and a phone-call finishing button, as shown in FIG. 54.

Figure 55:
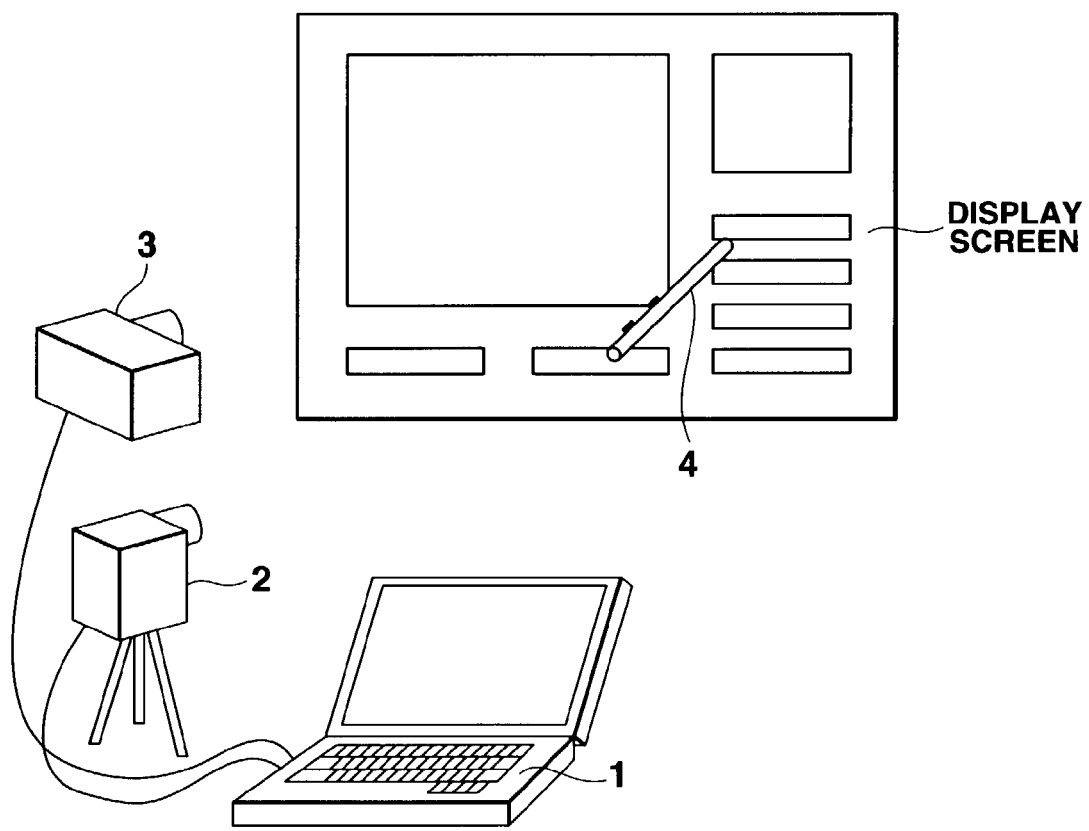
FIG. 55 is a diagram exemplarily showing how to click a button within the displayed image shown in FIG. 54.

When the user points the mike volume turning up button using the light emitting unit 4 to light up this button in high brightness as shown in FIG. 55, the central control unit 11 controls the AF amplifier of the communication audio input unit 19 in order to increase the gain of this AF amplifier. When the user points the mike volume turning down button and lights up this button in high brightness likewise as shown in FIG. 55, the central control unit 11 reduces the gain of the AF amplifier.

When the user points the calling partner's volume turning up button using the light emitting unit 4 to light up this button in high brightness, the central control unit 11 controls the AF amplifier of the communication audio reproducing unit 20 in order to increase the gain of this AF amplifier. When the user points the calling partner's volume turning down button and lights up this button in high brightness, the central control unit 11 reduces the gain of the AF amplifier.

When the user points the image recording button using the light emitting unit 4 to light up this button in high brightness, the central control unit 11 stores the image data which is obtained in step S4 and then decompressed, in the external storage unit 14.

When the user points the phone-call finishing button using the light emitting unit 4 to light up this button in high brightness, the central control unit 11 controls the network interface unit 17 to terminate the data interchange with the calling partner.

Eighth Embodiment

The present invention can be applied to character inputting operation using spotlight. In cellular phones and PHS (Personal Handyphone System), a method of depressing ten keys several times and thus entering characters associated with the combination of the depressed buttons, is employed. However, such a method of depressing ten keys several times is bothersome and inefficient in inputting characters. If a character input device according to the present invention is used, simple and efficient character input can be realized using a cellular phone, etc. A character input device according to the eighth embodiment of the present invention where such simple and efficient character input is realized, will be explained below.

Figure 56:
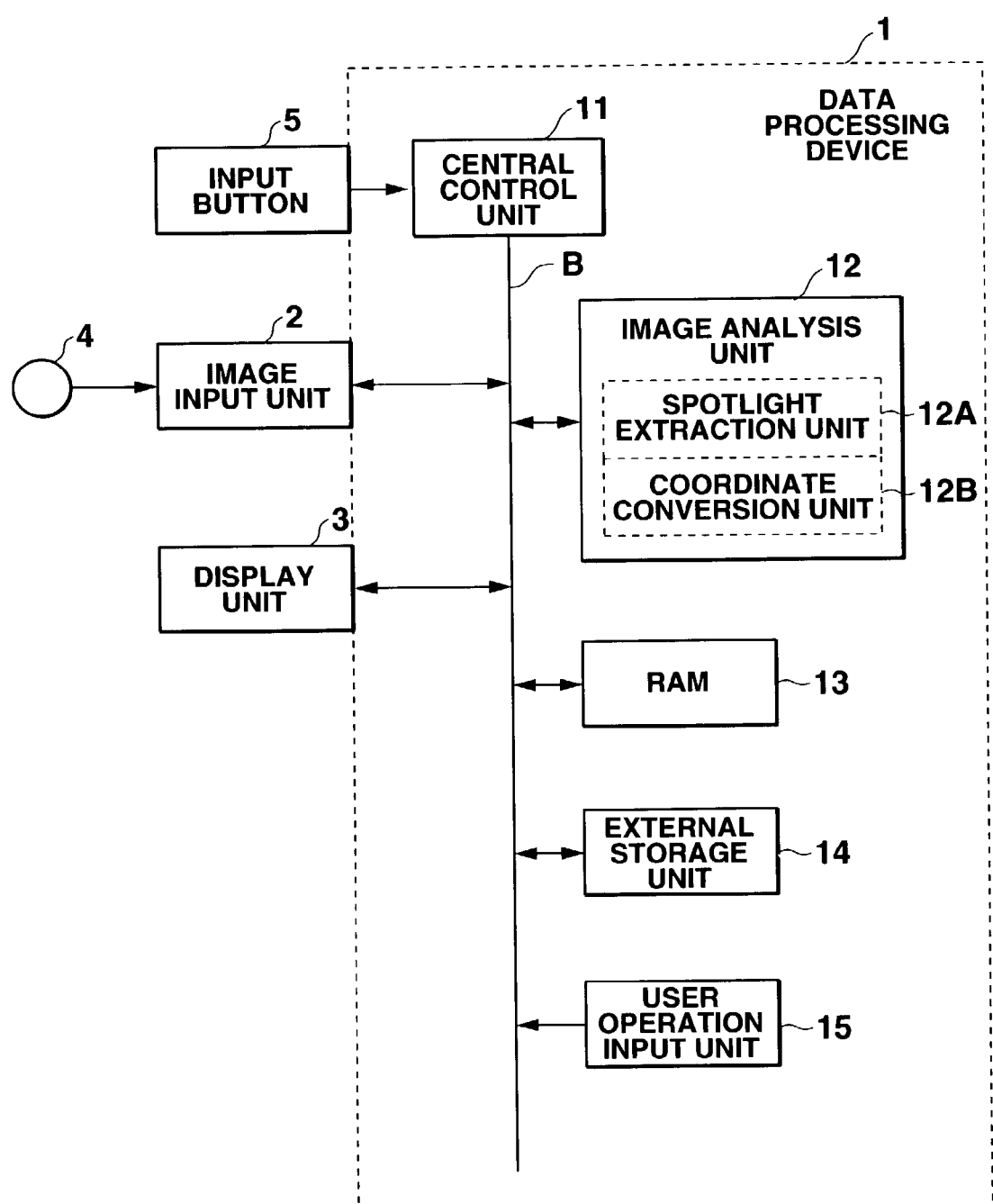
FIG. 56 is a diagram showing a structure of a character input device according to an eighth embodiment of the present invention.

This character input device has a structure shown in FIG. 56. That is, this character input device comprises a data processing device 1, an image input unit 2, a display unit 3, and a light emitting unit 4 which are substantially the same in function as those included in the drawing system shown in FIG. 2, and further comprises an input button 5 which is connected to the central control unit 11.

The input button 5 is constituted by a push button switch, or the like, and supplies information which is in accordance with an operation of the operator, into the central control unit 11 of the data processing device 1.

Figure 57:
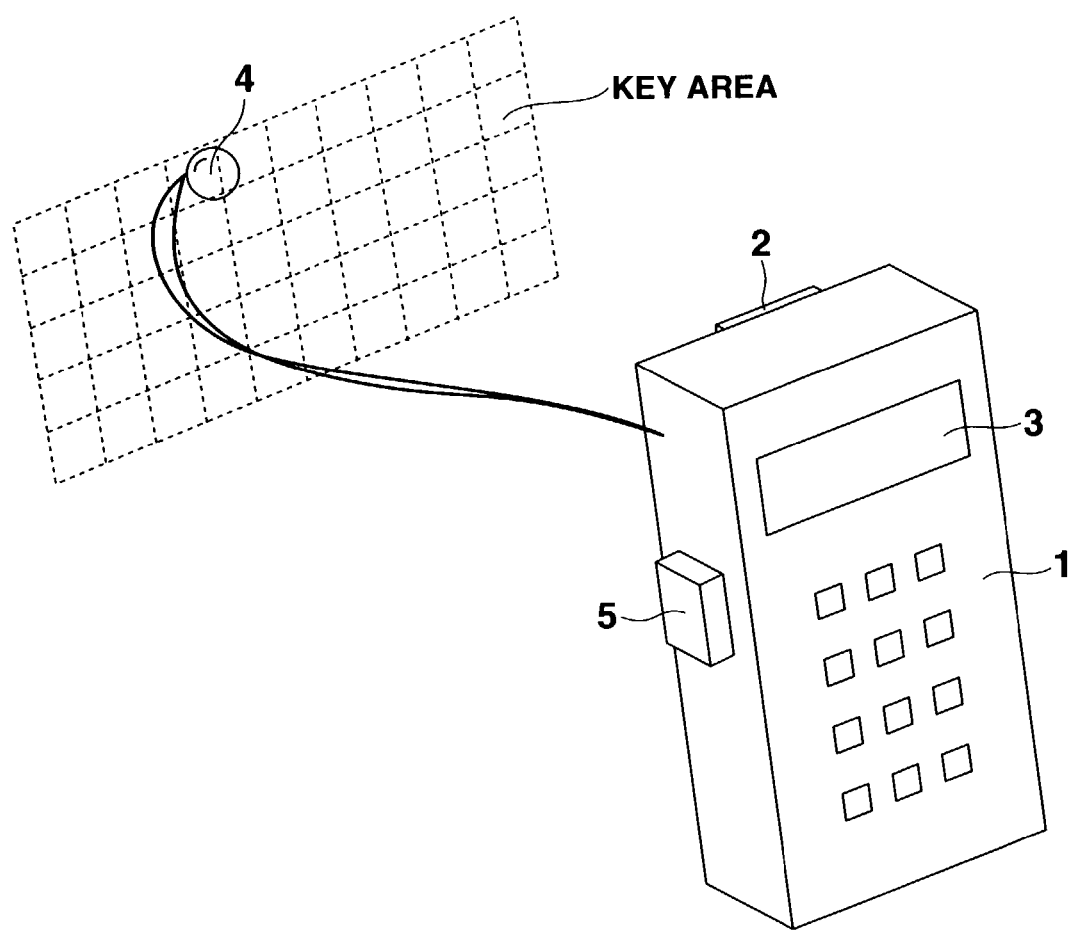
FIG. 57 is a diagram exemplarily showing how the elements of the character input device shown in FIG. 56 are integrally formed.

The data processing device 1, the image input unit 2, the display unit 3, and the input button 5 of this character input device integrally form a main body, as shown in FIG. 57. The main body may function as a mobile phone (cellular phone, PHS, etc.). The light emitting unit 4 is carried with the main body with a strap, etc.

The external storage unit 14 of the data processing device 1 of this character input device stores a plurality of key area data each representing an area (key area) on the display screen of the display unit 3 which is occupied by the key top of each virtual key constituting a virtual keyboard, in association with a character represented by each key.

An image input process (step S1), a spotlight extraction process (step S21), and an interpolation process (steps SO1 to SO3) to be performed by this character input device are substantially the same as those performed by the drawing system according to the fifth embodiment of the present invention which is shown in FIG. 39. This character input device also performs a process shown in FIG. 58.

Figure 58:
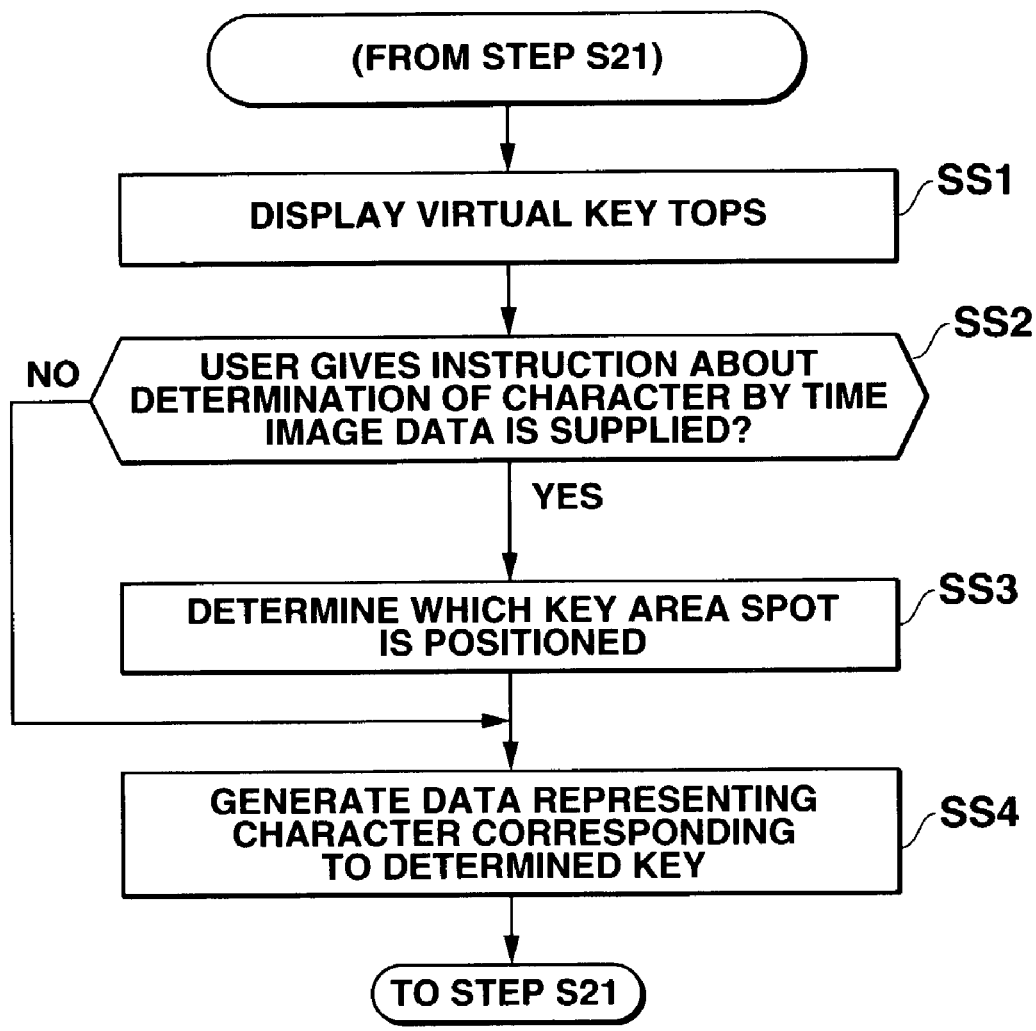
FIG. 58 is a flowchart showing a process performed by the character input device shown in FIG. 56.
Figure 59:
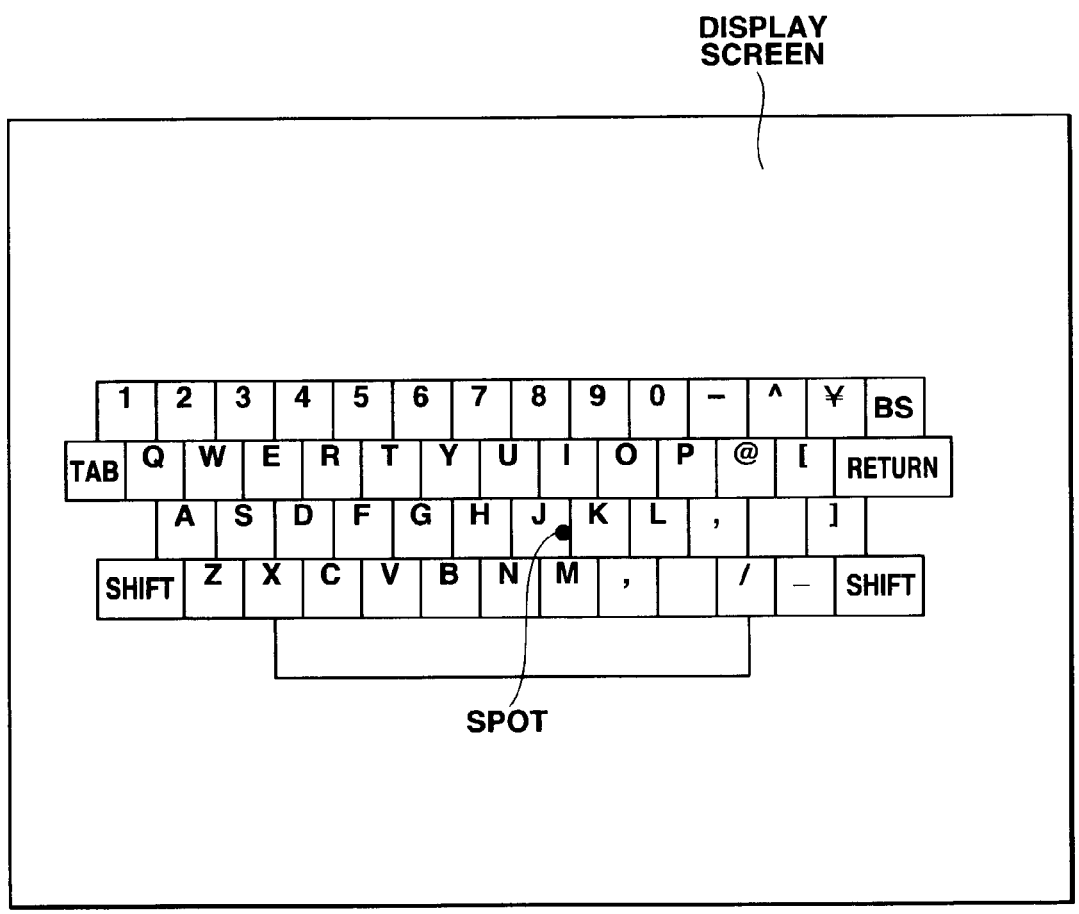
FIG. 59 is a diagram exemplarily showing an image of key tops displayed by the character input device shown in FIG. 56.

That is, when the image analysis unit 12 of this character input device completes the process of step SO3, the central control unit 11 controls the display unit 3 to display a spot on the display screen in step S3, and also reads out the key area data from the external storage unit 14, and stores the data in the RAM 13 temporarily. Then, the central control unit 11 controls the display unit 3 to display the key tops of the aforementioned virtual keys in their corresponding key areas on the display screen which are represented by the key area data, as shown in FIG. 59 (FIG. 58, step SS1). In a case where the RAM 13 already temporarily stores the key area data, the central control unit 11 needs not to newly read out the key area data from the external storage unit 14.

As the result of performing the process of step SS1, the user can see and recognize on which key top the spot is overlaid. In order to display the key tops of the virtual keys, the user, etc. may previously store key top image data representing shapes of the key tops in the external storage unit 14, and the central control unit 11 may read out the key top image data from the external storage unit 14, and control the display unit 3 to display the shapes represented by the read key top image data.

Then, when the spot and virtual key tops are displayed in step SS1, the central control unit 11 waits for the user to operate the input button 5 to give an instruction about determination of a character, until the image input unit 2 supplies new image data. The central control unit 11 determines whether or not an instruction about determination of a character has been given by the user, by the time new image data is supplied thereto (step SS2). When determining that there has been given no instruction, the central control unit 11 returns the flow to step S21.

On the contrary, when determining that the user has given an instruction about determination of a character, the central control unit 11 determines to which key area of a key representing what character the position of the displayed spot belongs, based on the coordinates (locx, locy) of the spot which are most lately obtained in step SO3 (step SS3). Then, the image analysis unit 12 generates data which represents the character determined in step SS3 (i.e., the character input by the user), and stores the generated data in the RAM 13 (step SS4).

When the process of step SS4 is completed, the central control unit 11 waits for the image input unit 2 to supply new image data, and when actually supplied with new image data, returns the flow to step S21.

By repeating the process of step SS4, data representing a character is stored one after another in the RAM 13. The central control unit 11 analyses those data sequentially stored in the RAM 13, and specifies the command represented by the character string those data represent as a whole. Then, the central control unit 11 performs a process instructed by the specified command.

In order for the user to easily guess the position to be irradiated by the light emitting unit 4 when inputting a character, a sheet on which key tops are printed so as to correspond to the areas represented by the key area data, may be posed within the view of the image input unit 2. Or, instead of posing the sheet having key top printing, an image representing key tops may be projected.

The embodiments of the present invention have been explained as above. The image display device, the image display method, and the projection system of the present invention can be realized by an ordinary computer system, not by a specially-made system. For example, the drawing system and image input device performing the above described processes can be realized by installing a program for performing the operations of the above described data processing device in a computer which is connected to a display device for displaying an image, and to an image pickup device for taking an image and generating image data representing the taken image, from a recording medium (a magnetic tape, a CD-ROM, etc.) carrying this program.

Further, for example, this program may be posted on a bulletin board (BBS) on a communications network, and distributed through this network. Or, this program may be distributed by transmitting a modulated wave obtained by modulating a carrier wave by this program.

The above described processes can be performed by starting this program and executing this program under the control of an OS (Operating System), likewise executing other application programs.

In a case where the OS performs some part of the processes, or the OS constitutes a part of an element of the present invention, the recording medium may store a program from which such part is excluded. Even in this case, this recording medium stores a program for executing each function and steps to be performed by a computer, according to the present invention.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2001-222377 filed on Jul. 24, 2001 and including specification, claims, drawings and summary. The disclosure of the above Japanese Patent Application is incorporated herein by reference in its entirety.

What is claimed is:

1. An image display device comprising:
an image pickup section which picks up a spot and an area including said spot from an arbitrary position;
a generation section which generates image data of said area picked up by said image pickup section;
a display section which displays an image based on said image data generated by said generation section;
a processing section which processes said image data in such a way that said image data is adequately displayed on a display screen of said display section;
a measuring section which measures positional coordinates of said spot in said area; and
a coordinate conversion section which converts said positional coordinates of said spot measured by said measuring section to positional coordinates that are reflected on image data after the processing acquired as a result of a process performed by said processing section;
wherein the area before processing, represented by the image data before processing by the processing section, is a quadrangle, and the area after processing, represented by the image data after the processing by the processing section, is a rectangle; and
wherein said processing section: (i) acquires a first pair of lines, each of which passes through the spot in said area after processing and perpendicularly intersects two opposite sides of said rectangle that defines said area after processing, (ii) acquires a second pair of lines that internally divide two opposite sides of said quadrangle that defines said area before processing, by an interior division ratio by which said first pair of lines internally divide said two opposite sides of said rectangle, and (iii) processes said image data in such a way that the spot at a point of intersection of said second pair of lines is positioned at a point of intersection of said first pair of lines after processing.

2. The image display device according to claim 1, wherein said picked-up area is part of a projected image, said spot is a dot of light on said projected image, and said light has a specific wavelength and a luminance that is set equal to or higher than a luminance of another portion of said projected image.

3. The image display device according to claim 1, wherein said image pickup section picks up said display screen from an arbitrary position.

4. The image display device according to claim 1, wherein said area is an area surrounded by at least tour points whose positional coordinates have been set beforehand.

5. The image display device according to claim 4, wherein said processing section comprises an area setting section which inputs information designating said at least four points surrounding said area and sets a region surrounded by said points indicated by said input information as said area.

6. The image display device according to claim 4, wherein said processing section comprises an area setting section which specifies at least four spots included in an image represented by image data before processing and sets said specified spots as said points surrounding said area.

7. The image display device according to claim 4, wherein said display section comprises a section which displays a figure for extracting an area surrounded by at least four points in an area to be picked up by said image pickup section, and
wherein said processing section comprises an area setting section which extracts at least four points from said figure for extracting said area represented by the image data before processing and sets said extracted points as said points surrounding said area.

8. The image display device according to claim 1, wherein said area comprises a plurality of regions, and
wherein said measuring section specifies a region in which said spot is included, and measures said positional coordinates of said spot in said area by measuring positional coordinates of said spot in said specified region.

9. The image display device according to claim 1, wherein said display section comprises a section which displays a curve indicating a track along which the spot has moved, over an image based on the image data after processing.

10. The image display device according to claim 1, wherein said processing section comprises a section which specifies one of a plurality of levels to which a luminance of the spot represented by the image data before processing corresponds, and wherein said display section displays the spot to have said luminance level specified by said processing section.

11. The image display device according to claim 1, wherein said measuring section detects a spot identification pattern comprising a plurality of spots from the image data before processing and measures positional coordinates of said detected spot identification pattern as the positional coordinates of the spot.

12. The image display device according to claim 1, wherein said measuring section comprises a section which specifies positions and velocity of the spot at two times based on a plurality of pieces of the image data before processing, and wherein said processing section determines an estimated position of said spot between said two times based on said positions and velocity of said spot at said two times specified by said measuring section, and processes the image data before processing in such a way that an image having said spot positioned at said determined estimated position.

13. The image display device according to claim 1, wherein said measuring section specifies positions of the spot at a plurality of times based on a plurality of pieces of image data before processing, determines a representative position representing a position of said spot in a time zone including said plurality of times based on said specified positions, and treats positional coordinates of said determined representative position as results of measuring the positional coordinates of said spot.

14. The image display device according to claim 1, further comprising a color change detection section which detects a change in color of the spot represented by a plurality of pieces of the image data before processing based on said plurality of pieces of the image data.

15. The image display device according to claim 1, wherein said measuring section comprises a section which specifies a velocity of the spot based on a plurality of pieces of the image data before processing, and wherein said processing section determines a position in an image indicated by the image data after processing which said spot is to occupy next, based on said velocity specified by said measuring section and a latest position in said image indicated by the image data after processing which said spot has occupied, and processes the image data in such a way that said spot is positioned at said determined position.

16. The image display device according to claim 1, further comprising a spot-shape determining section which determines a shape of the spot to be represented by the image data after processing, based on said positional coordinates of said spot measured by said measuring section.

17. The image display device according to claim 1, wherein said processing section comprises a section which externally receives a signal indicating that a light source of said spot is emitting light and processes image data in response to said received signal.

18. An image display device comprising:
an image pickup section which picks up a spot and an area including said spot from an arbitrary position;
a generation section which generates image data of said area picked up by said image pickup section;
a display section which displays an image based on said image data generated by said generation section;
a processing section which processes said image data in such a way that said image data is adequately displayed on a display screen of said display section;
a measuring section which measures positional coordinates of said spot in said area; and
a coordinate conversion section which converts said positional coordinates of said spot measured by said measuring section to positional coordinates that are reflected on image data after the processing acquired as a result of a process performed by said processing section;

wherein the area before processing, represented by the image data before processing by the processing section, is a quadrangle, and the area after processing, represented by image data after the processing performed by said processing section, is a rectangle;

wherein said processing section performs a process of: (i) determining in which one of four quadrangles said spot is included, said four quadrangles being obtained by quadrisecting said quadrangle that defines said area before processing by two lines, each of which connects a point of intersection of one of two sets of two opposite sides of said quadrangle to a point of intersection of diagonal lines of said quadrangle, and then (ii) moving by a predetermined amount a point lying in said rectangle that defines said area after processing in a direction of a vertex equivalent to a vertex of the one of the four quadrangles determined as including said spot that also serves as a vertex of said quadrangle defining said area before processing;

wherein the processing section repeats said process, by regarding the one of the four quadrangles determined as including said spot as a quadrangle defining said area before processing for a next repetition of the process, until said point lying in said rectangle that defines said area after processing substantially converges to a given position, and a position of said point which reaches convergence becomes a position of the spot in the area after processing; and wherein when said process is repeated, said predetermined amount by which the point in the rectangle is moved becomes smaller as a number of times the quadrisecting of said quadrangle is performed becomes larger.

19. An image display method comprising:
picking up a spot and an area including said spot from an arbitrary position;
generating image data of said picked-up area;
displaying an image based on said generated image data on a display screen;
processing said image data in such a way that said image data is adequately displayed on said display screen;
measuring positional coordinates of said spot in said area; and
converting said measured positional coordinates of said spot to positional coordinates that are reflected on image data after the processing acquired as a result of the processing;

wherein the area before the processing represented by image data before processing, is a quadrangle, and the area after processing, represented by the image data after the processing, is a rectangle; and wherein said processing comprises: (i) acquiring a first pair of lines, each of which passes through the spot in said area after processing and perpendicularly intersect two opposite sides of said rectangle that defines said area after processing, (ii) acquiring a second pair of lines that internally divide two opposite sides of said quadrangle that defines said area before processing, by an interior division ratio by which said first pair of lines internally divide said opposite two sides of said rectangle, and (iii) processing said image data in such a way that the spot at a point of intersection of said second pair of lines is positioned at a point of intersection of said first pair of lines after processing.

20. The image display method according to claim 19, wherein said picked-up area is part of a projected image, said spot is a dot of light on said projected image, and said light has a specific wavelength and a luminance that is set equal to or higher than a luminance of another portion of said projected image.

21. The image display method according to claim 19, wherein said image pickup step picks up said display screen from an arbitrary position.

22. The image display method according to claim 19, wherein said area is an area surrounded by at least four points whose positional coordinates have been set beforehand.

23. The image display method according to claim 22, further comprising setting the area by inputting information designating said at least four points surrounding said area and setting a region surrounded by said points indicated by said input information as said area.

24. The image display method according to claim 22, further comprising setting the area by setting at least four spots included in an image represented by the image data before processing and setting said specified spots as said points surrounding said area.

25. The image display method according to claim 22, further comprising displaying a figure for extracting an area surrounded by at least four points in an area to be picked up in said image pickup step, and
wherein said image display method further comprises setting the area by extracting at least four points from said figure for extracting said area represented by the image data before processing and setting said extracted points as said points surrounding said area.

26. The image display method according to claim 19, wherein said area comprises a plurality of regions, and
wherein said measuring the positional coordinates comprises specifying a region in which said spot is included, and measuring said positional coordinates of said spot in said area by measuring positional coordinates of said spot in said specified region.

27. The image display method according to claim 19, further comprising displaying a curve indicating a track along which the spot has moved, over an image based on the image data after processing.

28. The image display method according to claim 19, further comprising specifying one of a plurality of levels to which a luminance of the spot represented by the image data before processing corresponds, and
wherein the spot is displayed to have said specified luminance level.

29. The image display method according to claim 19, wherein said measuring the positional coordinates comprises detecting a spot identification pattern comprising a plurality of spots from the image data before processing, and measuring positional coordinates of said detected spot identification pattern as the positional coordinates of the spot.

30. The image display method according to claim 19, further comprising specifying positions and velocity of the spot at two times based on a plurality of pieces of the image data before processing, and
wherein said processing comprises determining an estimated position of said spot between said two times based on said positions and velocity of said spot at said two times, and processing the image data before processing in such a way that an image having said spot positioned at said determined estimated position is shown.

31. The image display method according to claim 19, said measuring the positional coordinates comprises specifying positions of the spot at a plurality of times based on a plurality of pieces of the image data before processing, determining a representative position representing a position of said spot in a time zone including said plurality of times based on said specified positions, and treating positional coordinates of said determined representative position as results of measuring the positional coordinates of said spot.

32. The image display method according to claim 19, further comprising detecting a change in color of the spot represented by a plurality of pieces of the image data before processing based on said plurality of pieces of the image data.

33. The image display method according to claim 19, further comprising specifying a velocity of the spot based on a plurality of pieces of the image data before processing, and
wherein said processing comprises determining a position in an image indicated by the image data after processing which said spot is to occupy next, based on said specified velocity and a latest position in said image indicated by the image data after processing which said spot has occupied, and processing the image data in such a way that said spot is positioned at said determined position.

34. The image display method according to claim 19, further comprising determining a shape of the spot to be represented by the image data after processing, based on said measured positional coordinates of said spot.

35. The image display method according to claim 19, further comprising receiving a signal indicating that a light source of said spot is emitting light, wherein said processing is performed in response to said received signal.

36. An image display method comprising:
picking up a spot and an area including said spot from an arbitrary position;
generating image data of said pickedup area;
displaying an image based on said generated image data on a display screen;
processing said image data in such a way that said image data is adequately displayed on said display screen;
measuring positional coordinates of said spot in said area; and
converting said measured positional coordinates of said spot to positional coordinates that are reflected on image data after the processing acquired as a result of the processing;
wherein the area before processing, represented by the image data before processing, is a quadrangle, and the area after processing, represented by the image data after the processing, is a rectangle;
wherein said processing comprises performing a process of: (i) determining in which one of four quadrangles said spot is included, said four quadrangles being obtained by quadrisecting said quadrangle that defines said area before processing by two lines, each of which connects a point of intersection of one of two sets of two opposite sides of said quadrangle to a point of intersection of diagonal lines of said quadrangle, and then (ii) moving by a predetermined amount a point lying in said rectangle that defines said area after processing in a direction of a vertex equivalent to a vertex of the one of the four quadrangles determined as including said spot that also serves as a vertex of said quadrangle;

wherein said processing comprises repeating said process, by regarding the one of the four quadrangles determined as including said spot as a quadrangle defining said area before processing for a next iteration of the process, until said point lying in said rectangle that defines said area after processing substantially converges to a given position, and a position of said point which reaches convergence becomes a position of the spot represented in the area after processing; and wherein when said process is repeated, said predetermined amount by which the point in the rectangle is moved becomes smaller as a number of times the quadrisecting of said quadrangle is performed becomes larger.

37. A computer readable storage medium having program stored thereon that is executable by a computer connected to an image display device and an image pickup section to cause the computer to function as:

an image pickup control section which causes said image pickup section to pick up a spot and an area including said spot from an arbitrary position;

a generation section which generates image data of said area picked up by said image pickup control section;

a display control section which displays an image based on said image data generated by said generation section on a display screen of said image display device;

a processing section which processes said image data in such a way that said image data is adequately displayed on said display screen;

a measuring section which measures positional coordinates of said spot in said area; and a coordinate conversion section which converts said positional coordinates of said spot measured by said measuring section to positional coordinates that are reflected on image data after the processing acquired as a result of a process performed by said processing section;

wherein the area before processing, represented by the image data before processing by the processing section, is a quadrangle, and the area after processing, represented by the image data after the processing by the processing section, is a rectangle; and wherein said processing section; (i) acquires a first pair of lines, each of which passes through the spot in said area after processing and perpendicularly intersects two opposite sides of said rectangle that defines said area after processing, (ii) acquires a second pair of lines that internally divide two opposite sides of said quadrangle that defines said area before processing, by an interior division ratio by which said first pair of lines internally divide said two opposite sides of said rectangle, and (iii) processes said image data in such a way that the spot at a point of intersection of said second pair of lines is positioned at a point of intersection of said first pair of lines after processing.

38. A computer readable storage medium having program stored thereon that is executable by a computer connected to an image display device and a plurality of image pickup sections to cause the computer to function as;

an image pickup control section which causes said plurality of image pickup sections to pick up a spot and an area including said spot from a plurality of arbitrary positions;

a generation section which generates image data of a plane in space picked up by said image pickup control section;

a display control section which displays an image based on said image data generated by said generation section on said image display device;

a processing section which processes said image data generated by said generation section in such a way that said image data is adequately displayed on a display screen of said image display device;

a measuring section which measures positional coordinates of said spot in said space;

a spot-shape determining section which determines a shape of a spot to be represented by image data after processing performed by said processing section, based on said positional coordinates of said spot measured by said measuring section; and a coordinate conversion section which converts said positional coordinates of said spot measured by said measuring section to positional coordinates that are reflected on the image data after the processing by the processing section;

wherein the area before processing, represented by the image data before processing by the processing section, is a quadrangle, and the area after processing, represented by the image data after the processing by the processing section, is a rectangle; and wherein said processing section: (i) acquires a first pair of lines, each of which passes through the spot in said area after processing and perpendicularly intersects two opposite sides of said rectangle that defines said area after processing, (ii) acquires a second pair of lines that internally divide two opposite sides of said quadrangle that defines said area before processing, by an interior division ratio by which said first pair of lines internally divide said two opposite sides of said rectangle, and (iii) processes said image data in such a way that the spot at a point of intersection of said second pair of lines is positioned at a point of intersection of said first pair of lines after processing.

39. A projection system including a projector, said system comprising:

an image pickup section which picks up an area of an image projected by said projector from an arbitrary position;

a generation section which generates image data of said area picked up by said image pickup section;

a processing section which processes said image data generated by said generation section in such a way that the image data is adequate for display on a display screen;

a detection section which detects a spot area which emits light having a specific wavelength from said picked-up area;

a measuring section which measures positional coordinates of said spot area detected by said detection section; and a coordinate conversion section which converts said positional coordinates measured by said measuring section to positional coordinates that are reflected on image data processed by said processing section;

wherein the area before processing, represented by the image data before processing by the processing section, is a quadrangle, and the area after processing, represented by the image data after the processing by the processing section, is a rectangle; and wherein said processing section: (i) acquires a first pair of lines, each of which passes through the spot area in said area after processing and perpendicularly intersects two opposite sides of said rectangle that defines said area after processing, (ii) acquires a second pair of lines that internally divide two opposite sides of said quadrangle that defines said area before processing, by an interior division ratio by which said first pair of lines internally divide said two opposite sides of said rectangle, and (iii) processes said image data in such a way that the spot area at a point of intersection of said second pair of lines is positioned at a point of intersection of said first pair of lines after processing.

40. A computer readable storage medium having program stored thereon that is executable by a computer connected to an image display device and an image pickup section to cause the computer to function as:

an image pickup control section which causes said image pickup section to pick up a spot and an area including said spot from an arbitrary position;

a generation section which generates image data of said area picked up by said image pickup control section;

a display control section which displays an image based on said image data generated by said generation section on a display screen of said image display device;

a processing section which processes said image data in such a way that said image data is adequately displayed on said display screen;

a measuring section which measures positional coordinates of said spot in said area; and a coordinate conversion section which converts said positional coordinates of said spot measured by said measuring section to positional coordinates that are reflected on image data after the processing acquired as a result of a process performed by said processing section;

wherein the area before processing, represented by the image data before processing by the processing section, is a quadrangle, and the area after processing, represented by image data after the processing performed by said processing section, is a rectangle;

wherein said processing section performs a process of: (i) determining in which one of four quadrangles said spot is included, said four quadrangles being obtained by quadrisecting said quadrangle that defines said area before processing by two lines, each of which connects a point of intersection of one of two sets of two opposite sides of said quadrangle to a point of intersection of diagonal lines of said quadrangle, and then (ii) moving by a predetermined amount a point lying in said rectangle that defines said area after processing in a direction of a vertex equivalent to a vertex of the one of the four quadrangles determined as including said spot that also serves as a vertex of said quadrangle defining said area before processing;

wherein the processing section repeats said process, by regarding the one of the four quadrangles determined as including said spot as a quadrangle defining said area before processing for a next repetition of the process, until said point lying in said rectangle that defines said area after processing substantially converges to a given position, and a position of said point which reaches convergence becomes a position of the spot in the area after processing; and wherein when said process is repeated, said predetermined amount by which the point in the rectangle is moved becomes smaller as a number of times the quadrisecting of said quadrangle is performed becomes larger.

41. A projection system including a projector, said system comprising:

an image pickup section which picks up an area of an image projected by said projector from an arbitrary position;

a generation section which generates image data of said area picked up by said image pickup section;

a processing section which processes said image data generated by said generation section in such a way that the image data is adequate for display on a display screen;

a detection section which detects a spot area which emits light having a specific wavelength from said pickedup area;

a measuring section which measures positional coordinates of said spot area detected by said detection section; and a coordinate conversion section which converts said positional coordinates measured by said measuring section to positional coordinates that are reflected on image data processed by said processing section;

wherein the area before processing, represented by the image data before processing by the processing section, is a quadrangle, and the area after processing, represented by image data after the processing performed by said processing section, is a rectangle;

wherein said processing section performs a process of: (i) determining in which one of tour quadrangles said spot is included, said four quadrangles being obtained by quadrisecting said quadrangle that defines said area before processing by two lines, each of which connects a point of intersection of one of two sets of two opposite sides of said quadrangle to a point of intersection of diagonal lines of said quadrangle, and then (ii) moving by a predetermined amount a point lying in said rectangle that defines said area after processing in a direction of a vertex equivalent to a vertex of the one of the four quadrangles determined as including said spot that also serves as a vertex of said quadrangle defining said area before processing;

wherein the processing section repeats said process, by regarding the one of the four quadrangles determined as including said spot as a quadrangle defining said area before processing for a next repetition of the process, until said point lying in said rectangle that defines said area after processing substantially converges to a given position, and a position of said point which reaches convergence becomes a position of the spot in the area after processing; and wherein when said process is repeated, said predetermined amount by which the point in the rectangle is moved becomes smaller as a number of times the quadrisecting of said quadrangle is performed becomes larger.

* * * * *